United States Patent
Burns

(10) Patent No.: US 10,460,134 B2
(45) Date of Patent: Oct. 29, 2019

(54) SMARTCARD AND COMPUTER QUICK CONNECT AND RELEASE SYSTEM

(71) Applicant: IALL-TECH LLC, Philadelphia, PA (US)

(72) Inventor: Christopher J. Burns, Philadelphia, PA (US)

(73) Assignee: IALL-TECH LLC, Philadelphia, PA (US)

(*) Notice: Subject to any disclaimer, the term of this patent is extended or adjusted under 35 U.S.C. 154(b) by 0 days.

(21) Appl. No.: 14/819,587

(22) Filed: Aug. 6, 2015

(65) Prior Publication Data

US 2015/0356325 A1   Dec. 10, 2015

Related U.S. Application Data

(62) Division of application No. 13/787,196, filed on Mar. 6, 2013, now Pat. No. 9,135,478.

(Continued)

(51) Int. Cl.
*G06K 7/00* (2006.01)
*G06K 7/015* (2006.01)
(Continued)

(52) U.S. Cl.
CPC ......... *G06K 7/0056* (2013.01); *G06K 7/0021* (2013.01); *G06K 7/015* (2013.01);
(Continued)

(58) Field of Classification Search
CPC . G06K 7/0056; G06K 7/0021; G06K 7/10366
See application file for complete search history.

(56) References Cited

U.S. PATENT DOCUMENTS

| 3,786,391 A | 1/1974 | Mathauser |
| 3,808,577 A | 4/1974 | Mathauser |

(Continued)

FOREIGN PATENT DOCUMENTS

| JP | 3118000 U | 1/2006 |
| JP | 2008264296 A | 11/2008 |

OTHER PUBLICATIONS

International Search Report for PCT/US2013/029338, dated Jun. 26, 2013.

(Continued)

*Primary Examiner* — Christopher Stanford
*Assistant Examiner* — Asifa Habib
(74) *Attorney, Agent, or Firm* — Drinker Biddle & Reath LLP

(57) ABSTRACT

A smartcard unit includes at least a smartcard and an attachment enabling the smartcard unit to be worn by a user. The smartcard is accessible to an external reader. A reader unit interfaces with the smartcard to enable an external computer to communicate with the smartcard. The smartcard unit or the reader unit has structure to align the reader unit relative to the smartcard unit in an alignment for communicative interfacing while the smartcard unit is being worn. The smartcard unit or the reader unit has a retainer to secure the reader unit in alignment relative to the smartcard so that the smartcard unit is reversibly separable from the reader unit without damage, in response to a force less than is necessary to detach or damage another part of said system, other than along a longitudinal axis of the smartcard or of a pair of components being separated.

11 Claims, 40 Drawing Sheets

Related U.S. Application Data

(60) Provisional application No. 61/607,119, filed on Mar. 6, 2012.

(51) Int. Cl.
*G06K 19/077* (2006.01)
*G06K 19/00* (2006.01)
*G06K 7/10* (2006.01)

(52) U.S. Cl.
CPC ....... *G06K 7/10366* (2013.01); *G06K 19/005* (2013.01); *G06K 19/07739* (2013.01); *G06K 19/07741* (2013.01); *G06K 19/07743* (2013.01); *G06K 19/07762* (2013.01)

(56) References Cited

U.S. PATENT DOCUMENTS

| | | |
|---|---|---|
| 4,236,331 A | 12/1980 | Mattson |
| 4,390,232 A | 6/1983 | Jamgotchian |
| 5,337,813 A | 8/1994 | Ritter |
| 5,559,317 A | 9/1996 | Wong et al. |
| 5,821,516 A | 10/1998 | Vandenengel |
| 6,002,605 A | 12/1999 | Iwasaki et al. |
| 6,015,092 A | 1/2000 | Postlewaite et al. |
| 6,282,760 B1 | 9/2001 | Mars |
| 6,471,131 B2 | 10/2002 | Okada et al. |
| 6,671,986 B2 | 1/2004 | Reeves |
| 6,672,514 B1 | 1/2004 | Brennan et al. |
| D511,355 S | 11/2005 | Hunter, Jr. et al. |
| 7,311,526 B2 | 12/2007 | Rohrbach et al. |
| 7,377,448 B2 | 5/2008 | Dan et al. |
| 7,467,948 B2 | 12/2008 | Lindberg et al. |
| 7,517,222 B2 | 4/2009 | Rohrbach et al. |
| 7,645,143 B2 | 1/2010 | Rohrbach et al. |
| 7,874,844 B1 | 1/2011 | Fitts, Jr. |
| 7,901,216 B2 | 3/2011 | Rohrbach et al. |
| 7,963,773 B2 | 6/2011 | Palli et al. |
| 8,087,939 B2 | 1/2012 | Rohrbach et al. |
| 2002/0014535 A1* | 2/2002 | Okada ................. G06K 7/0013 235/492 |
| 2004/0224539 A1 | 11/2004 | Boyd et al. |
| 2005/0077348 A1 | 4/2005 | Hendrick |
| 2006/0180674 A1 | 7/2006 | Margalit et al. |
| 2007/0040017 A1 | 2/2007 | Kozlay |
| 2009/0014105 A1 | 1/2009 | Shattuck |
| 2010/0265084 A1* | 10/2010 | Augustinowicz .... G06K 19/005 340/686.6 |
| 2011/0113158 A1* | 5/2011 | Cedar ................. G06F 12/0653 710/3 |
| 2011/0200601 A1 | 8/2011 | Stanley et al. |
| 2013/0306738 A1 | 11/2013 | Peterson et al. |

OTHER PUBLICATIONS

International Written Opinion for PCT/US2013/029338, dated Jun. 26, 2013.

* cited by examiner

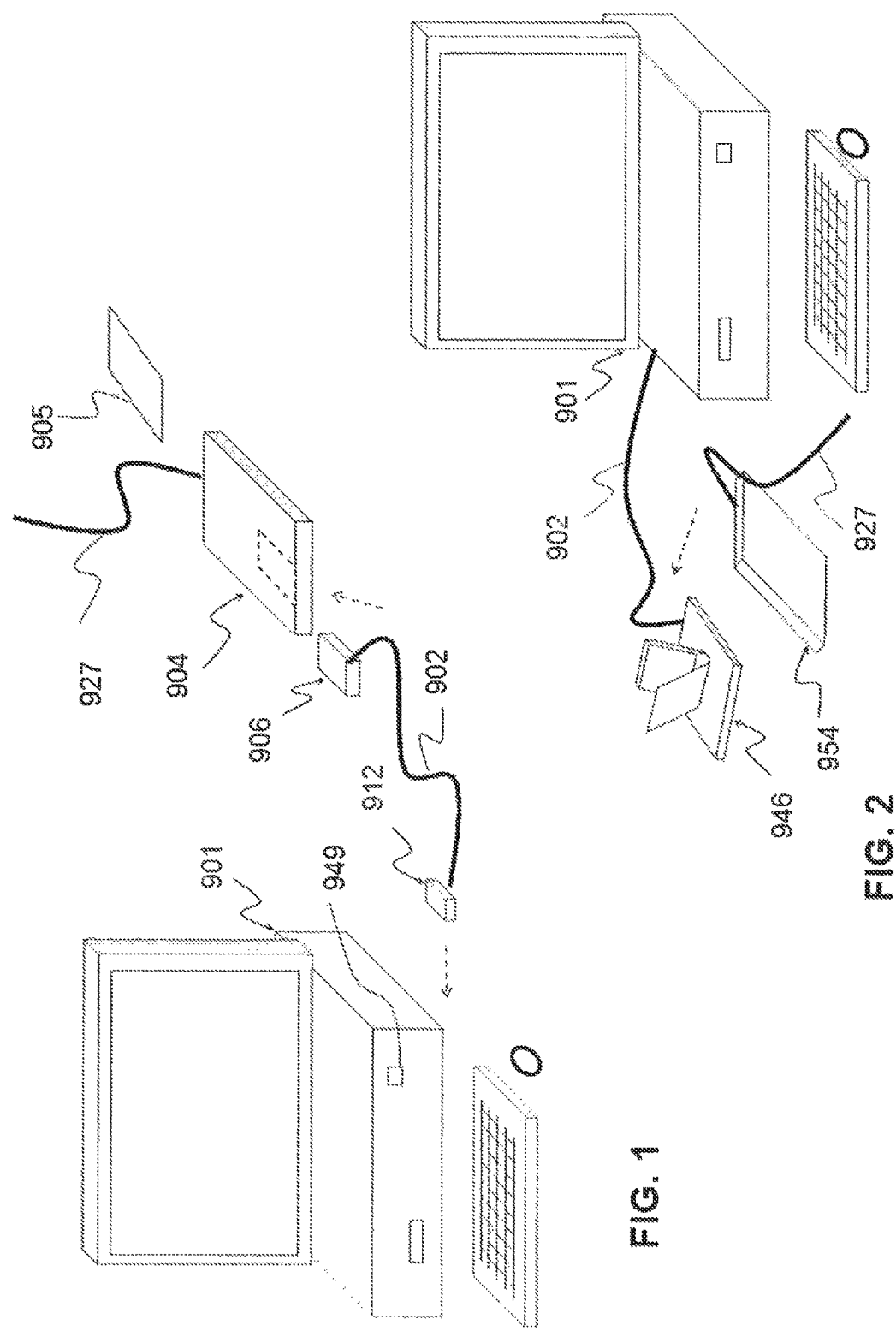

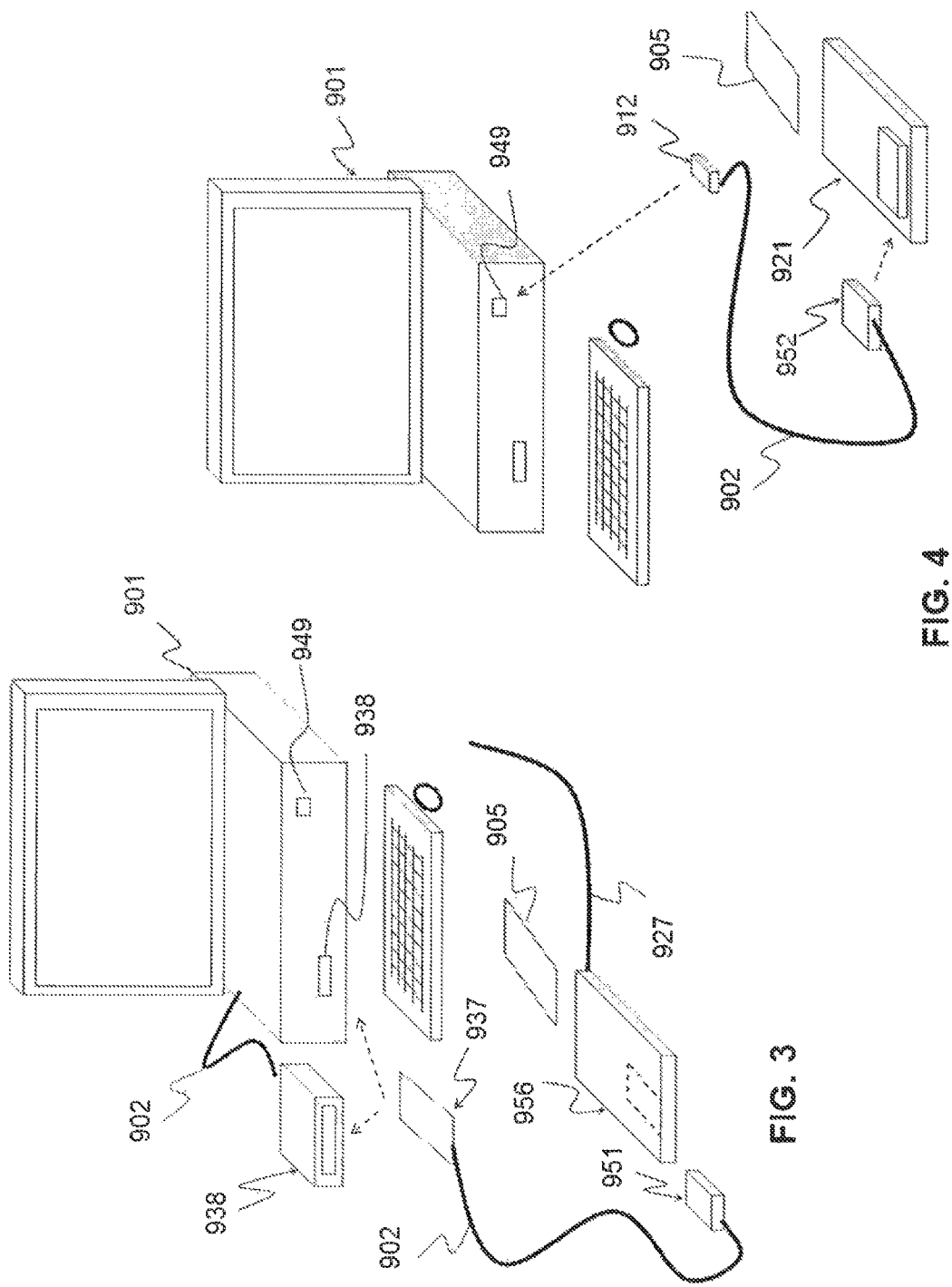

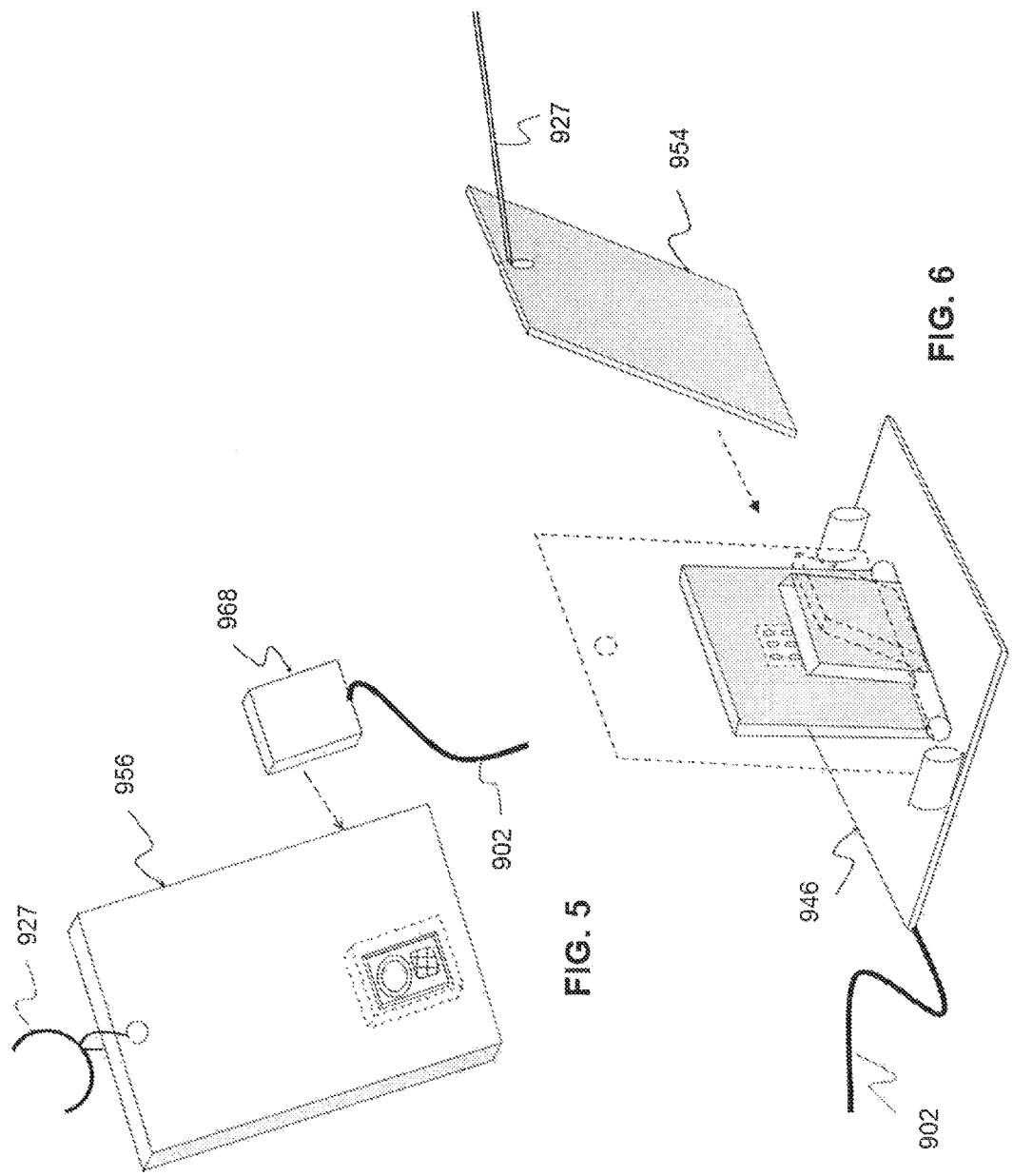

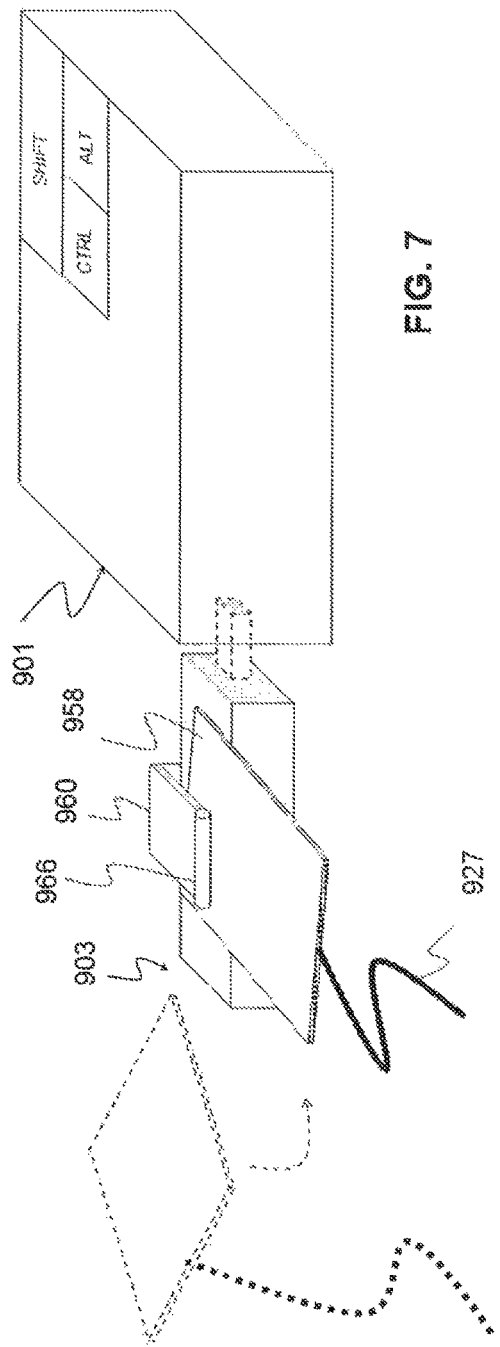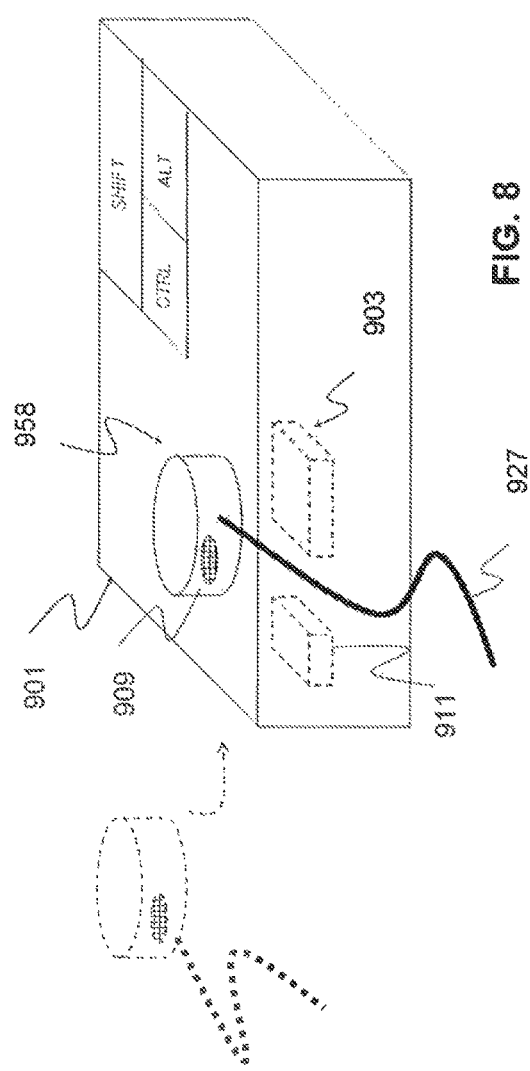

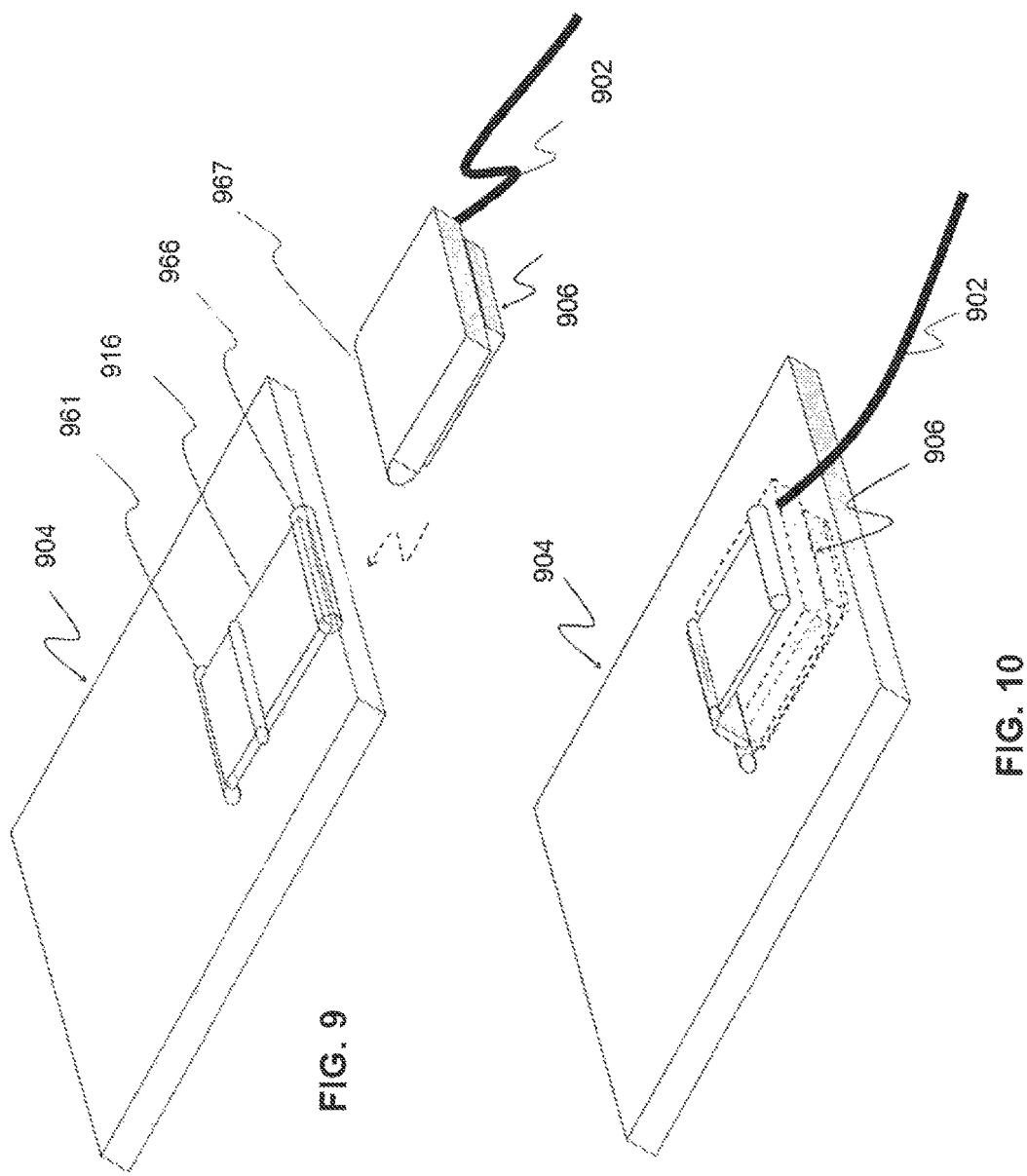

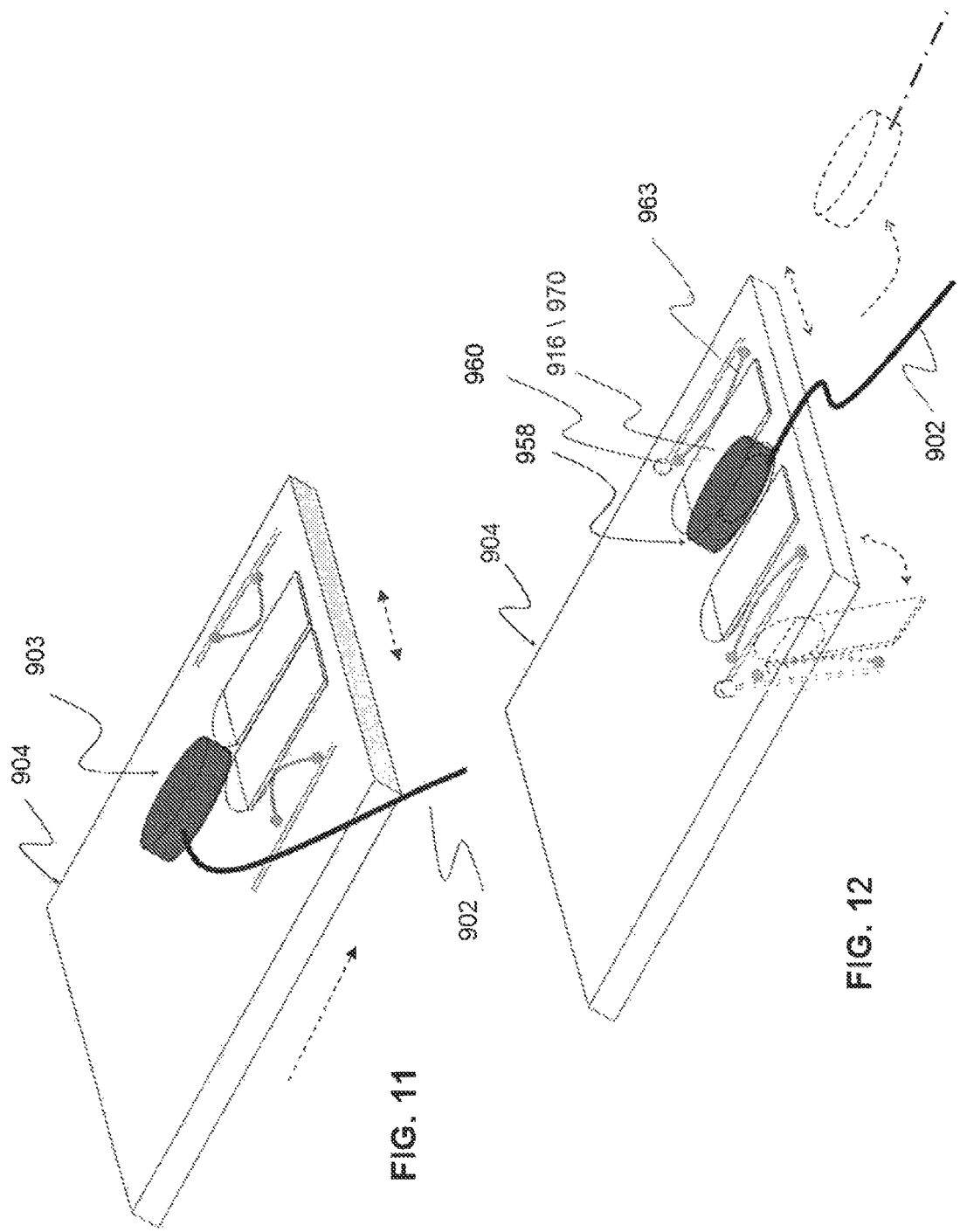

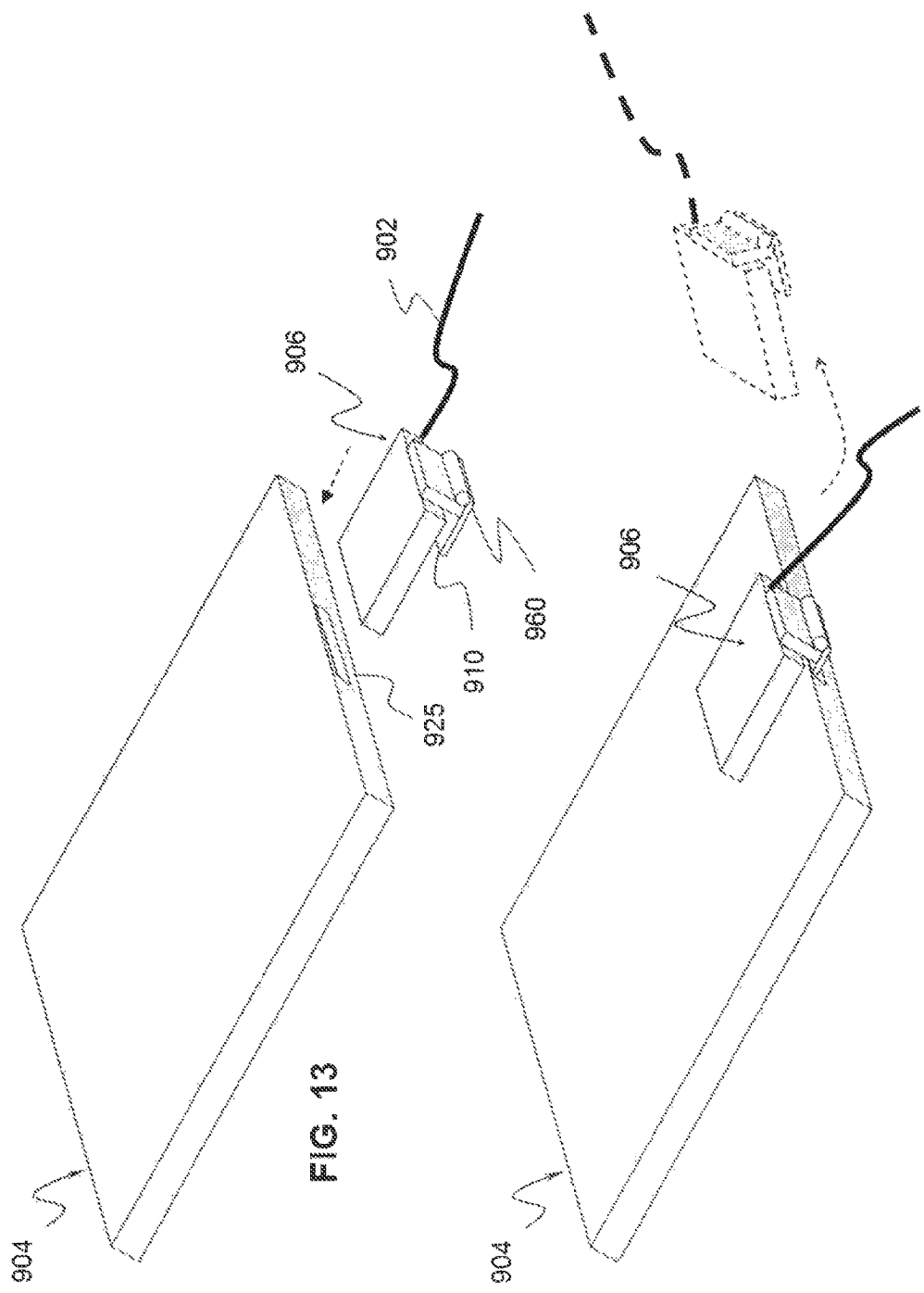

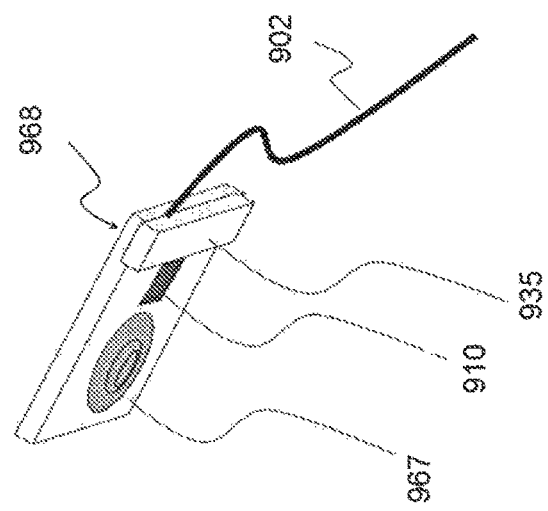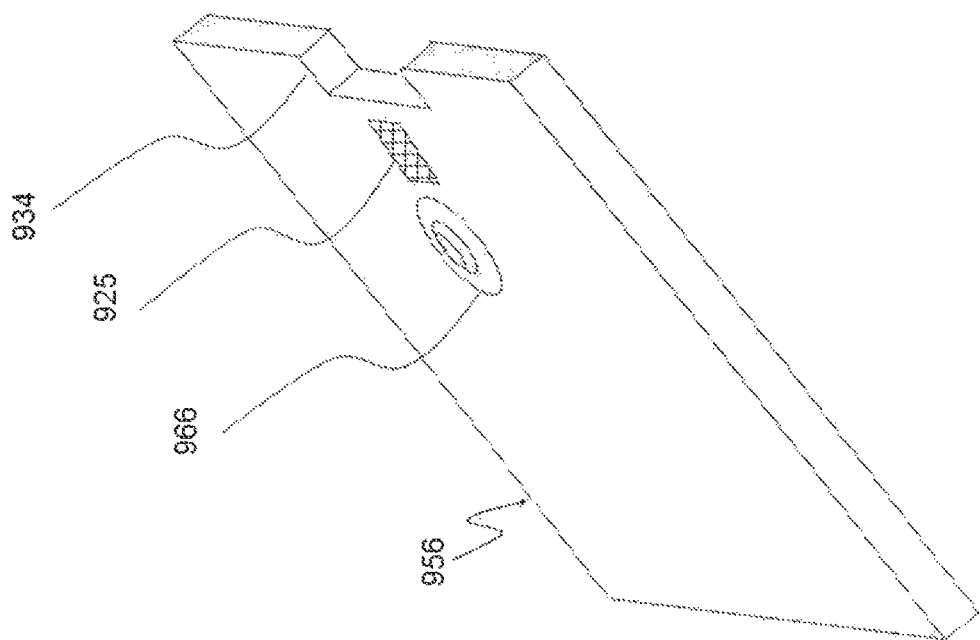
FIG. 15

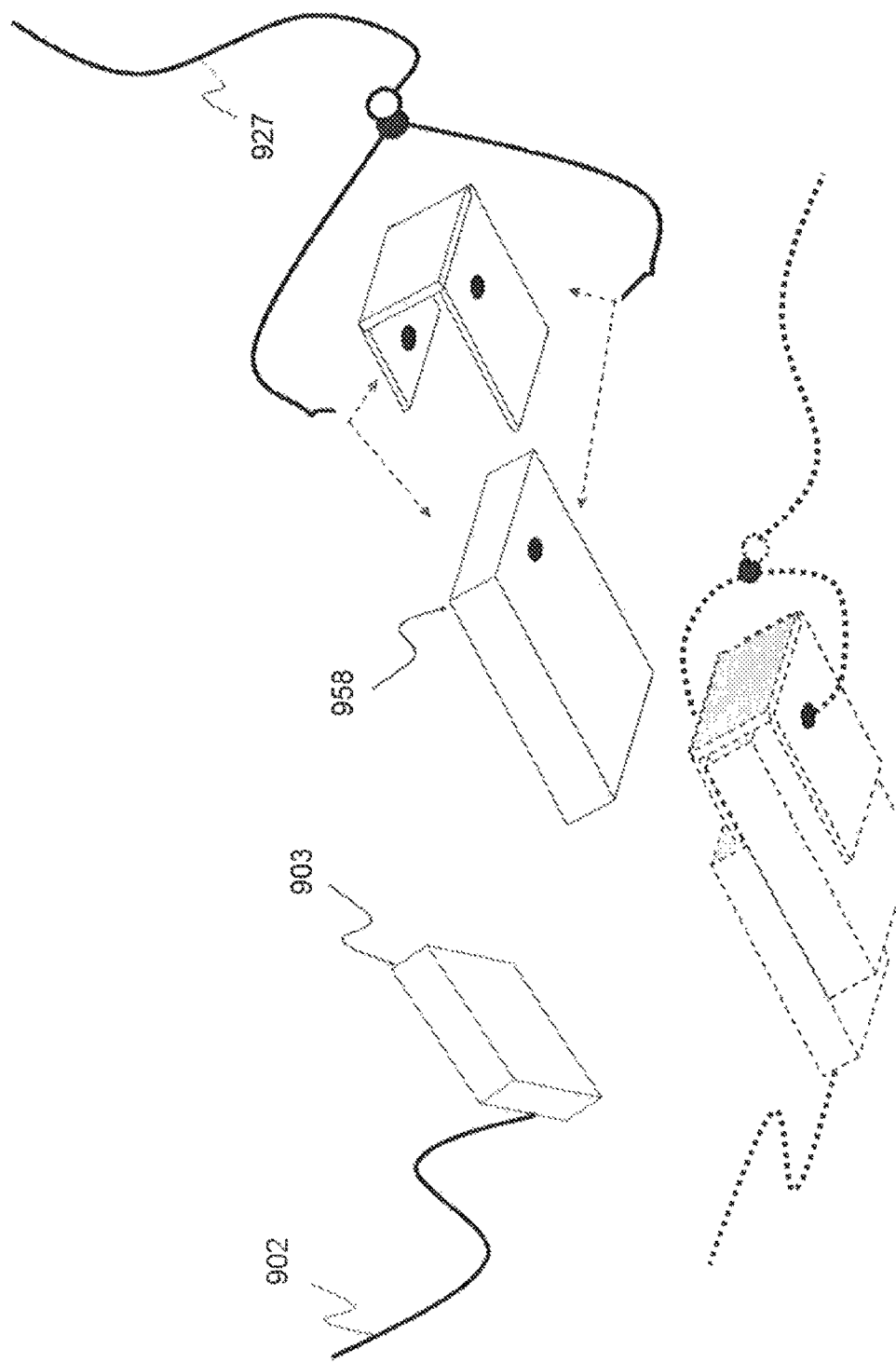

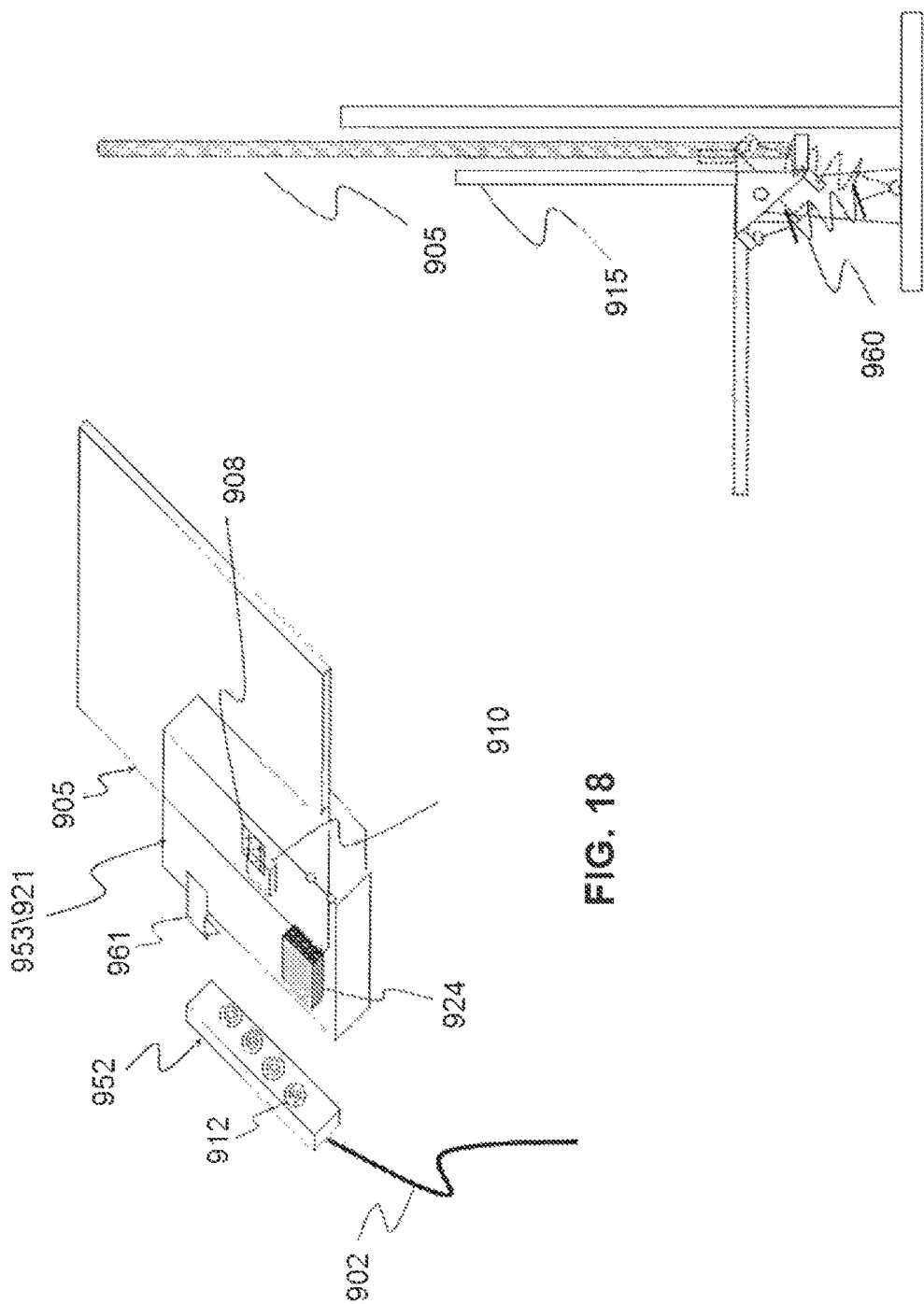

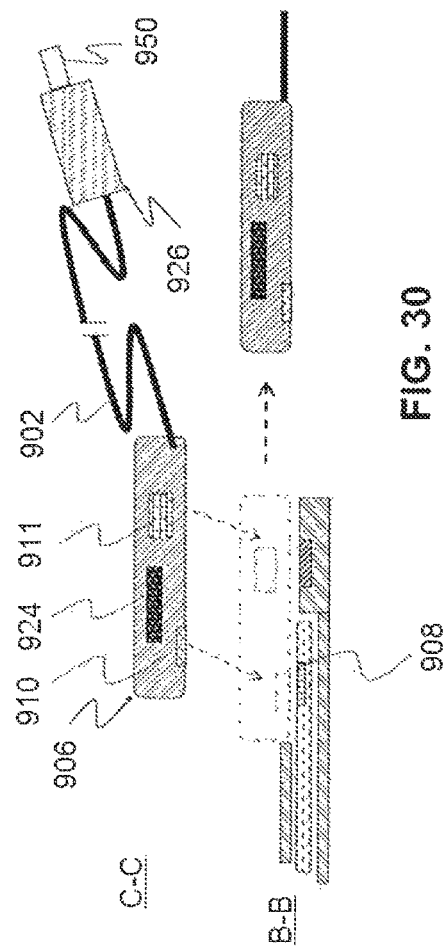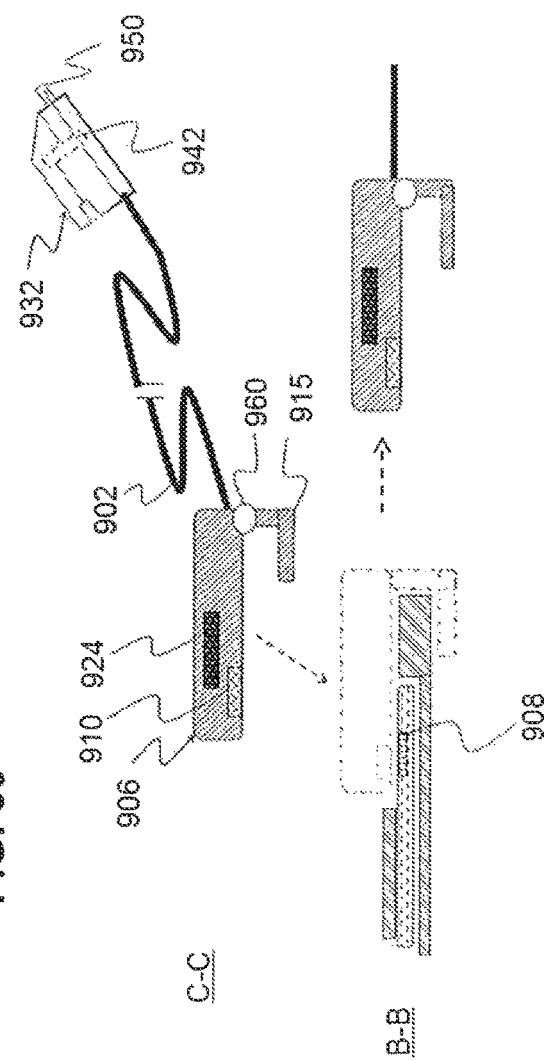

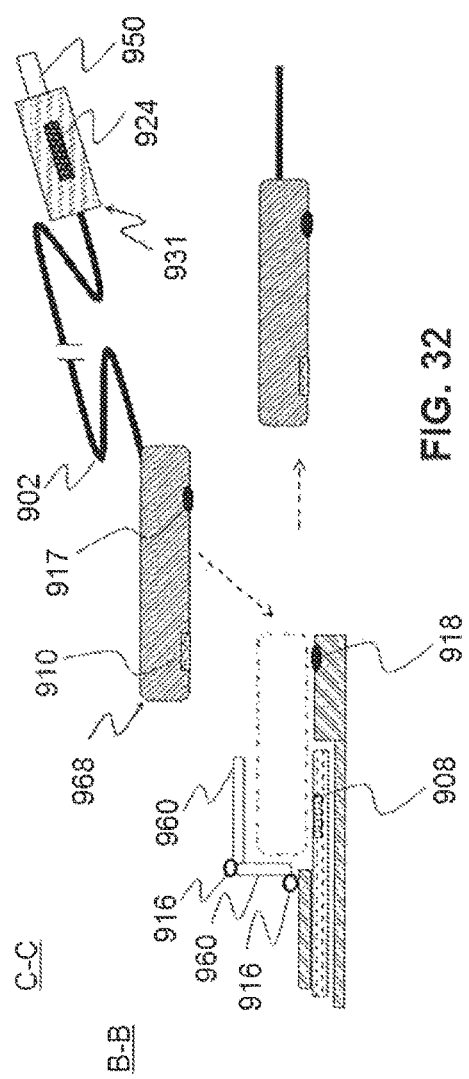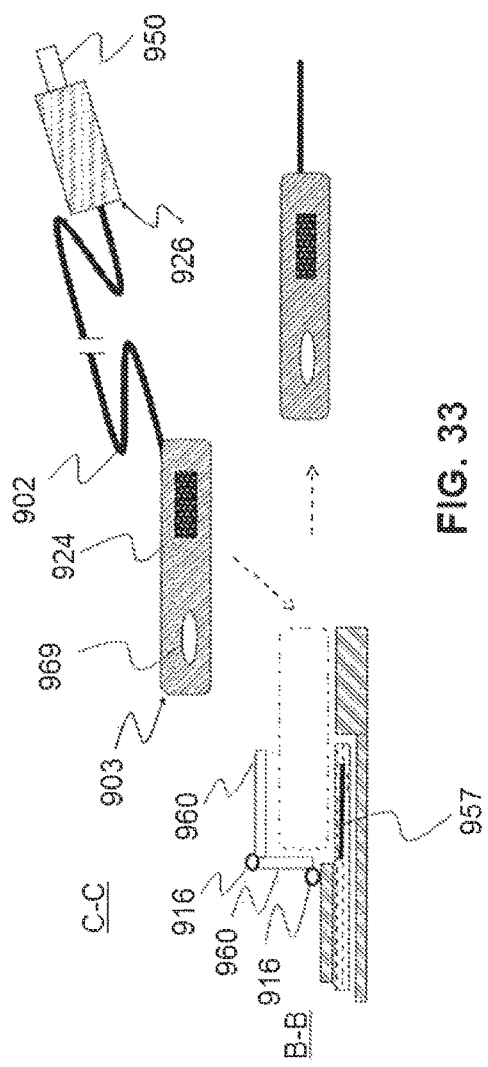

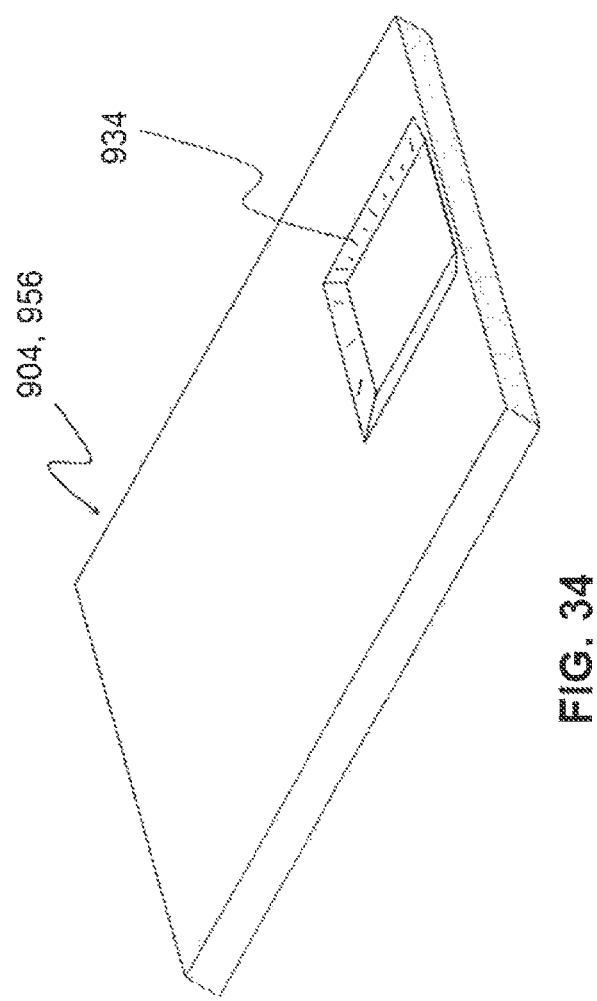

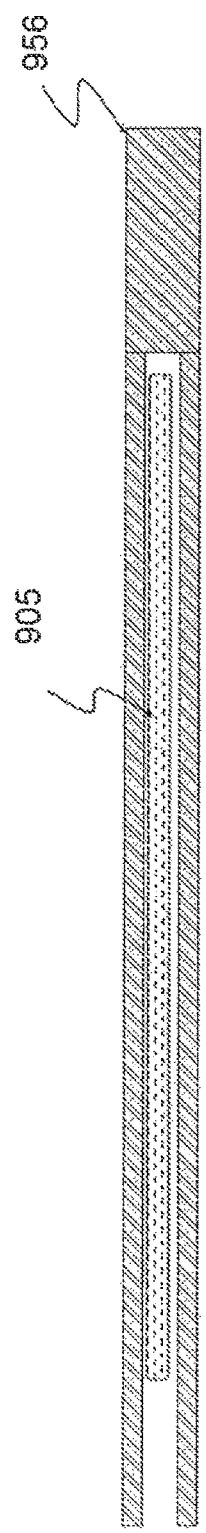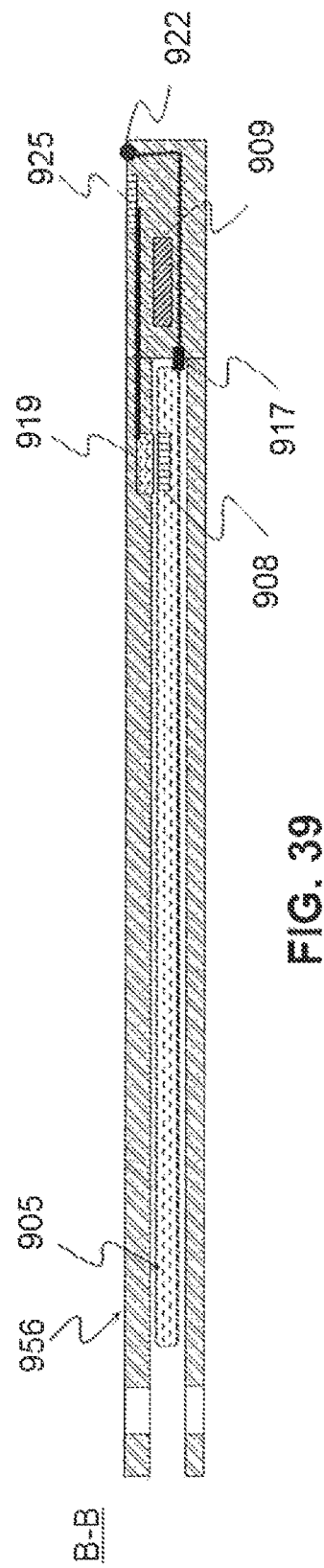
FIG. 38
FIG. 39

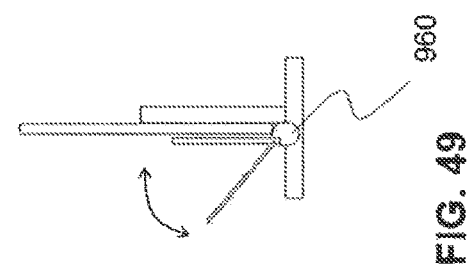
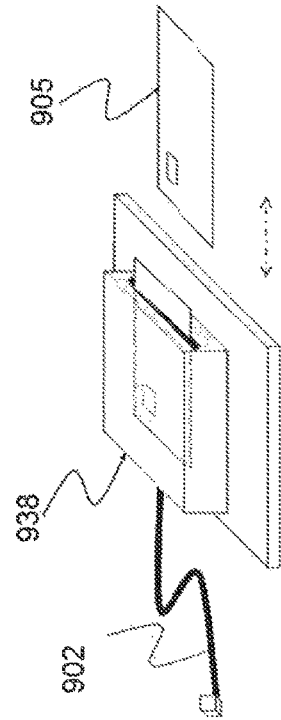
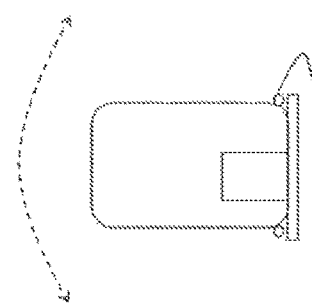
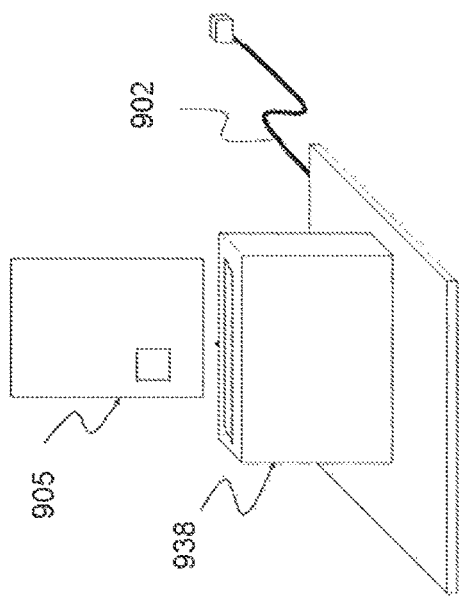
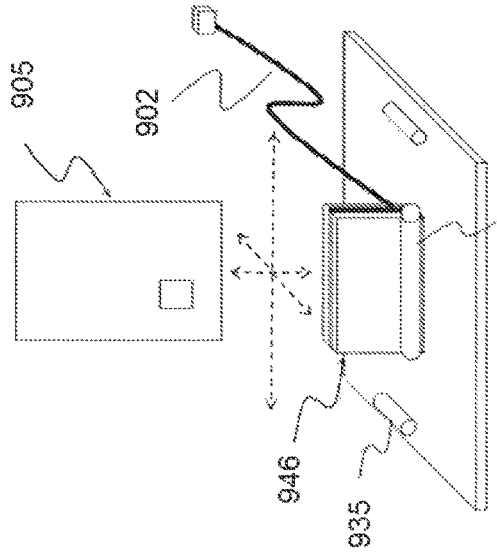

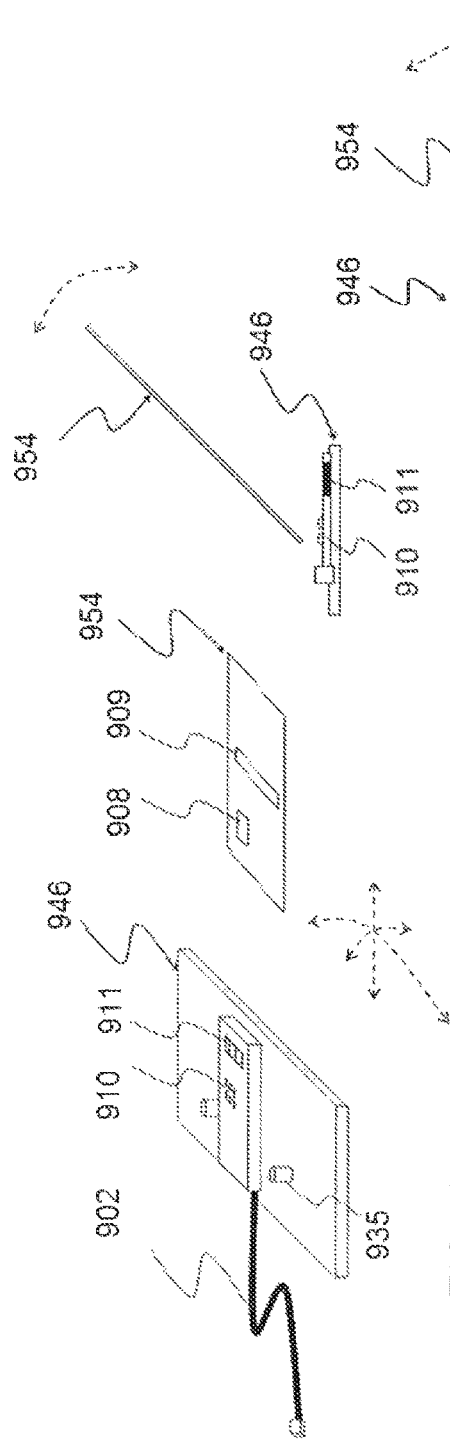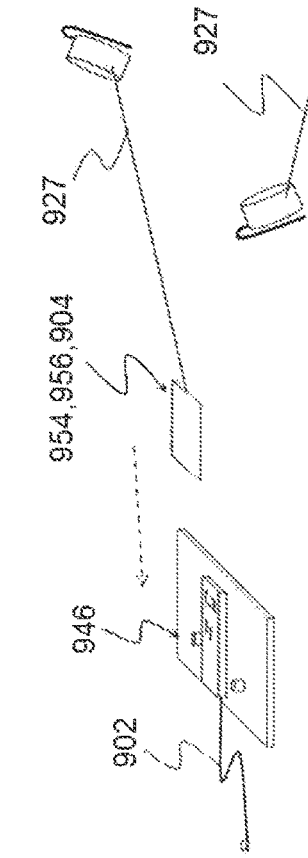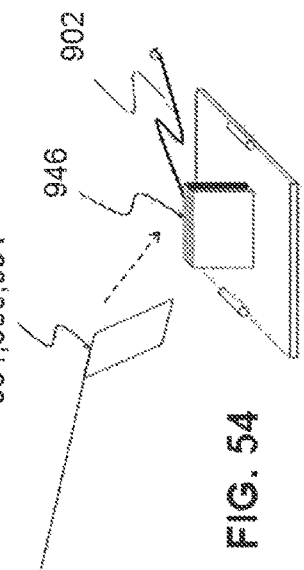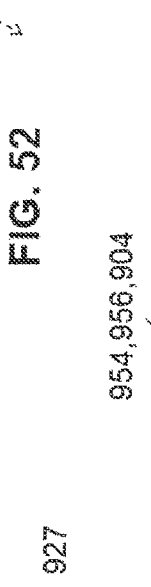

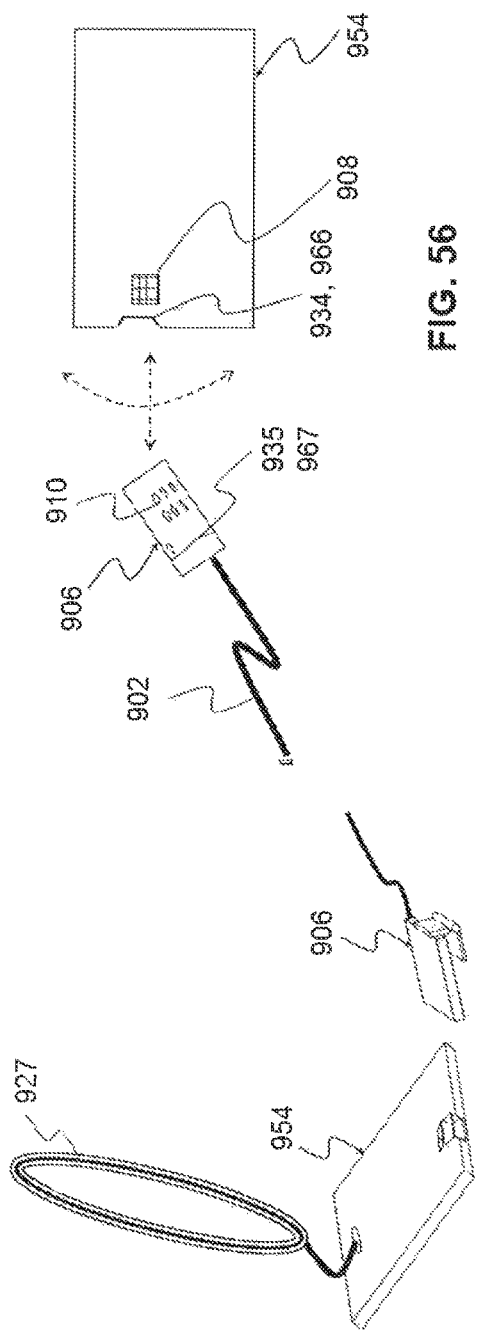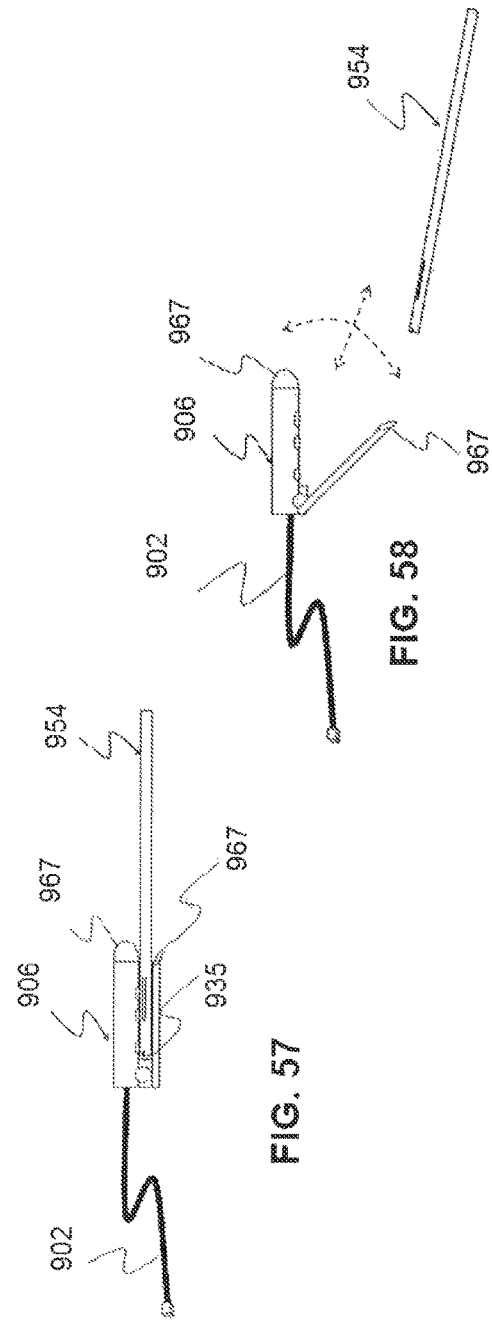

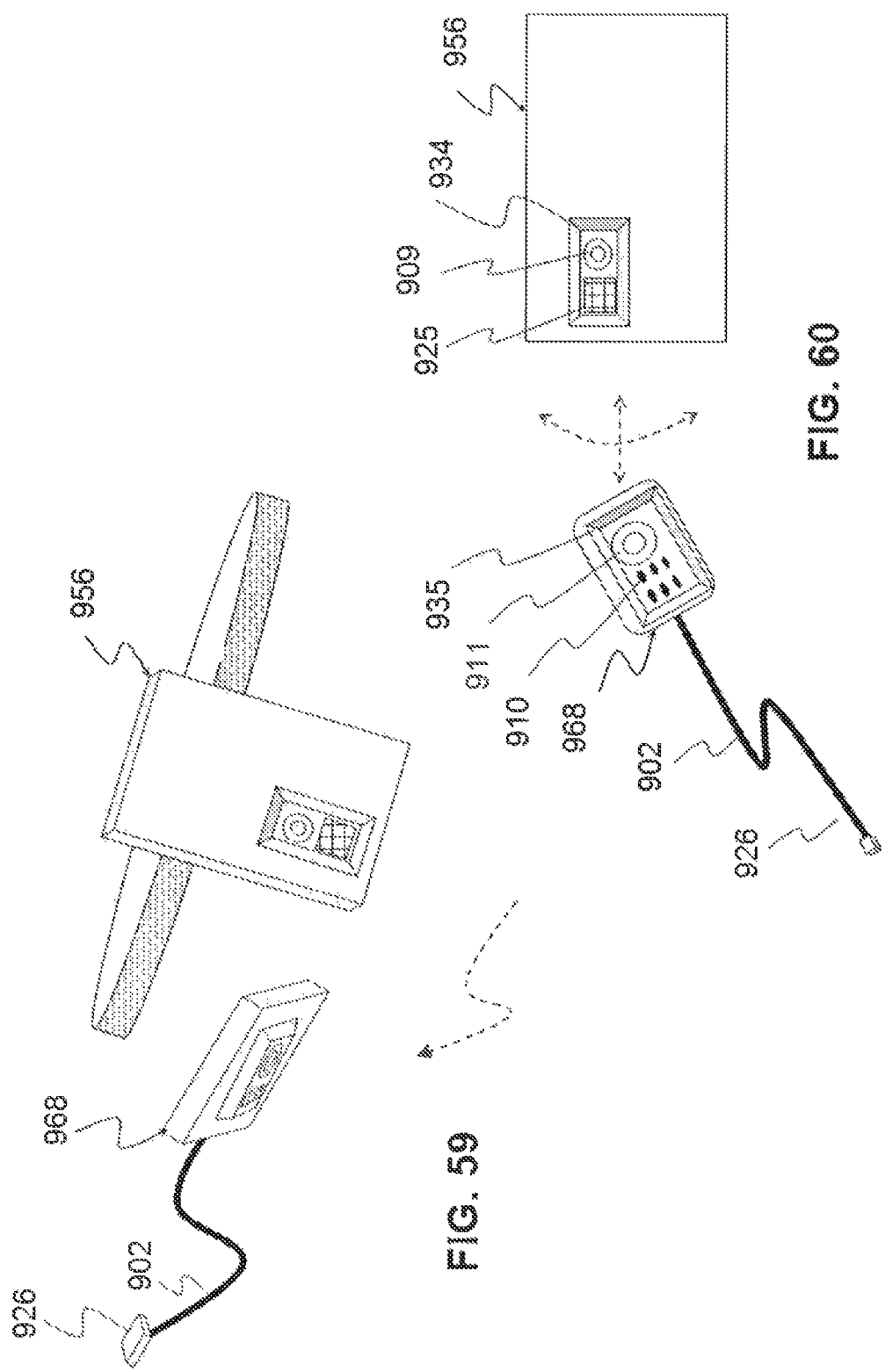

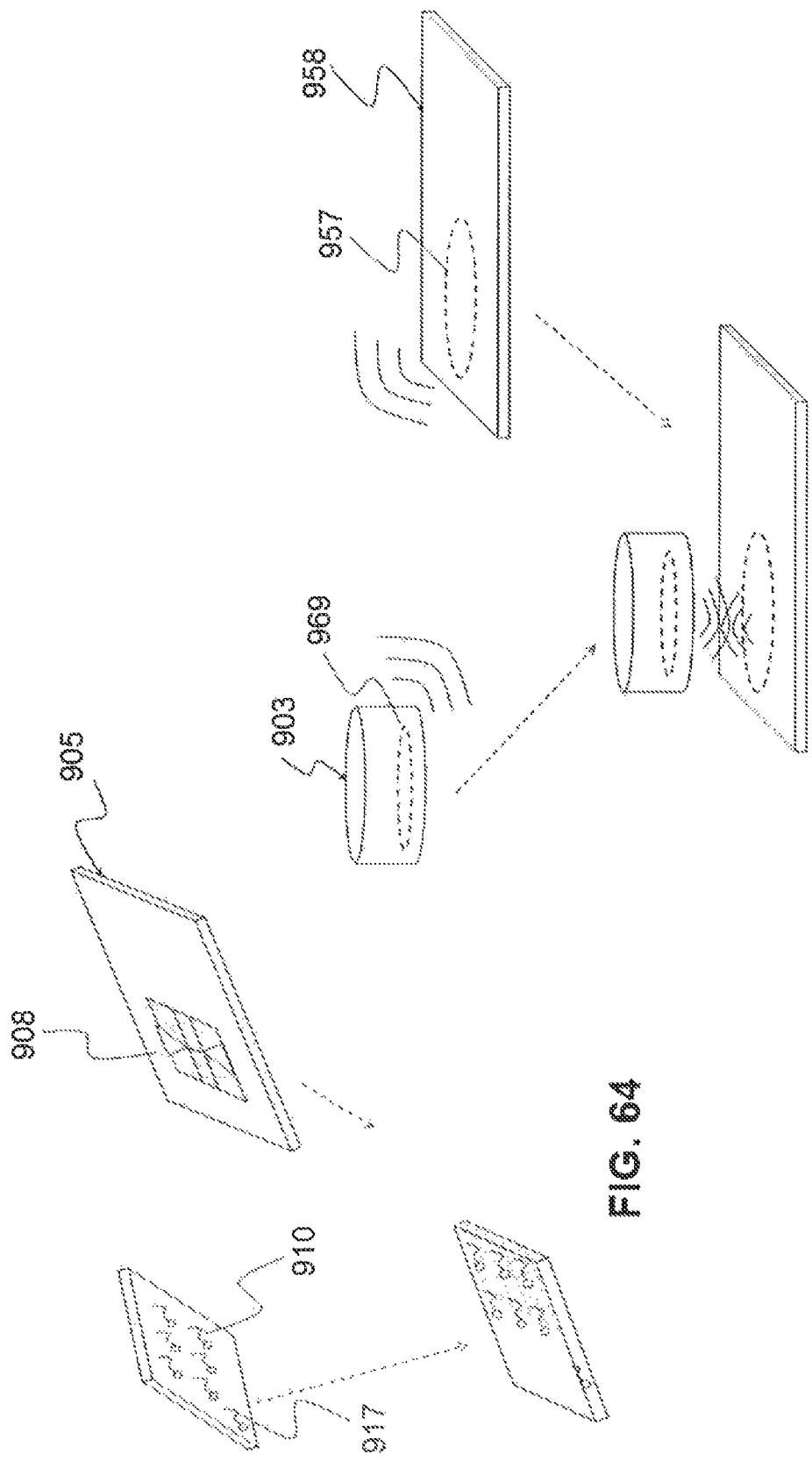

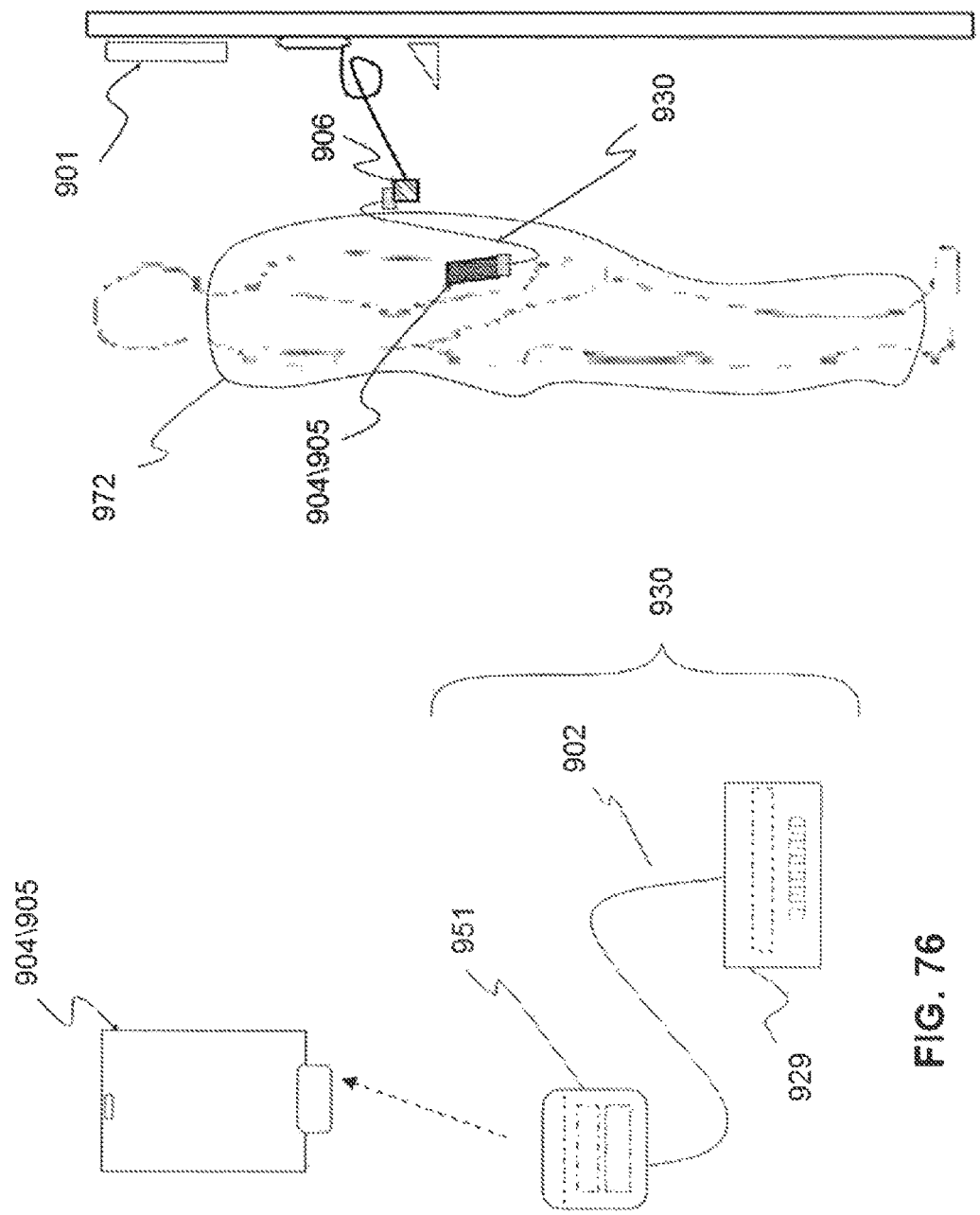

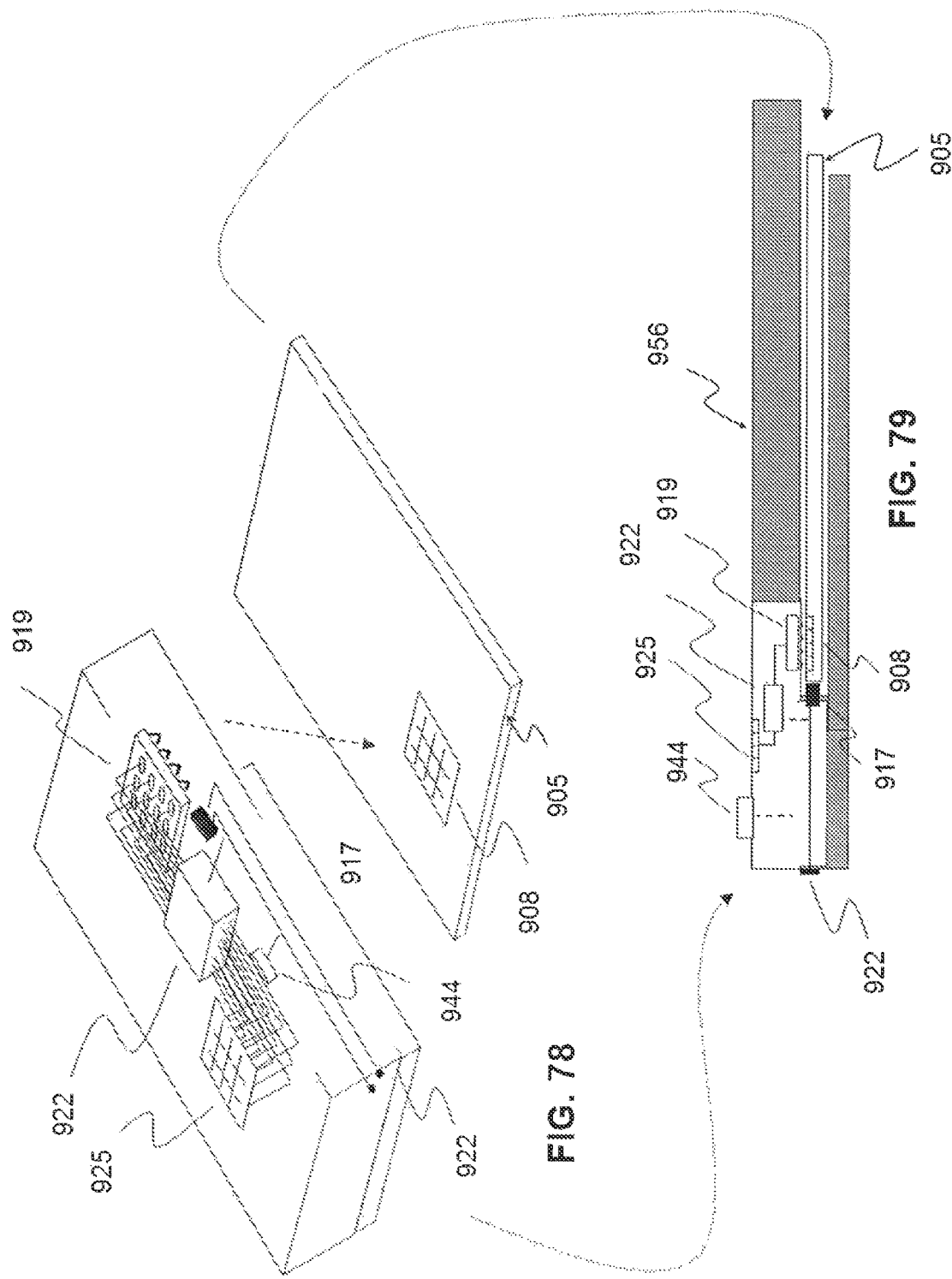

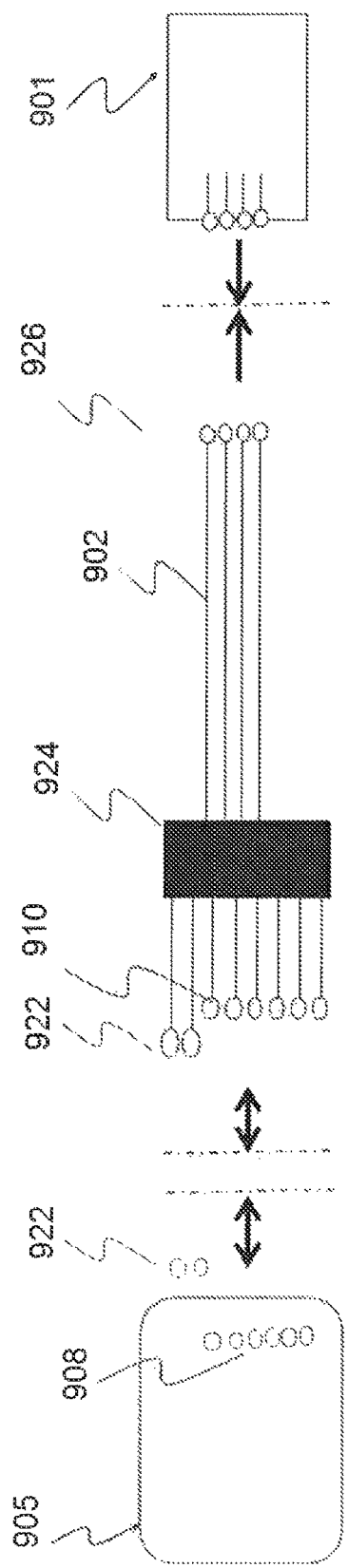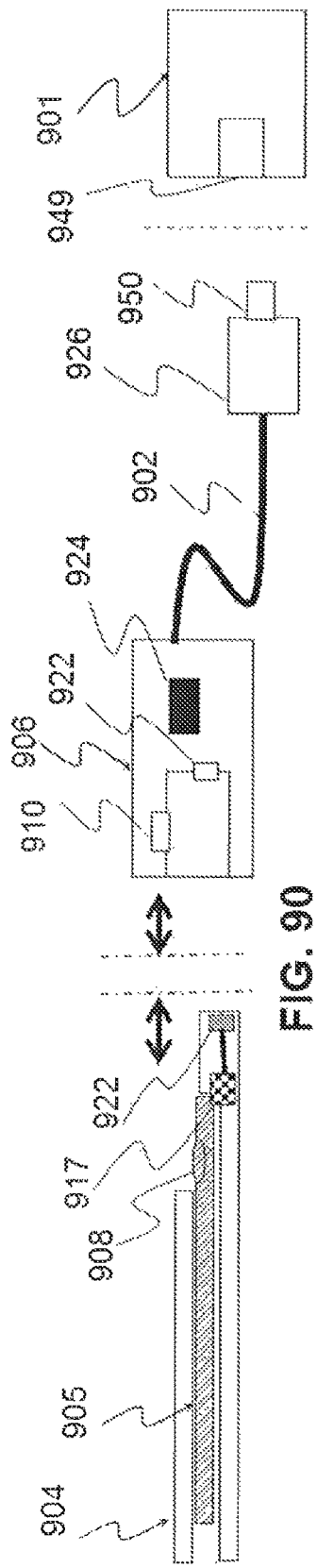
FIG. 89
FIG. 90

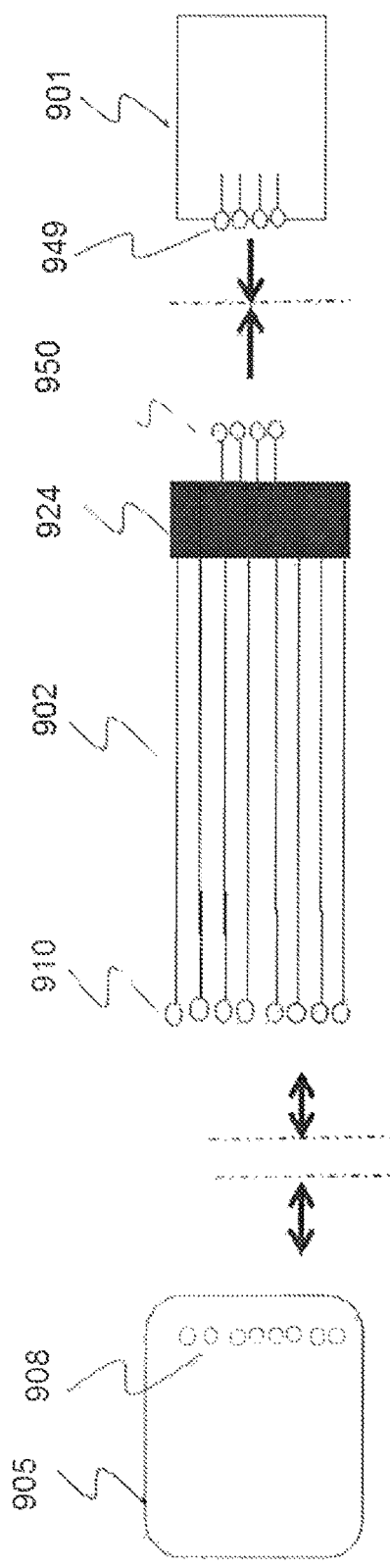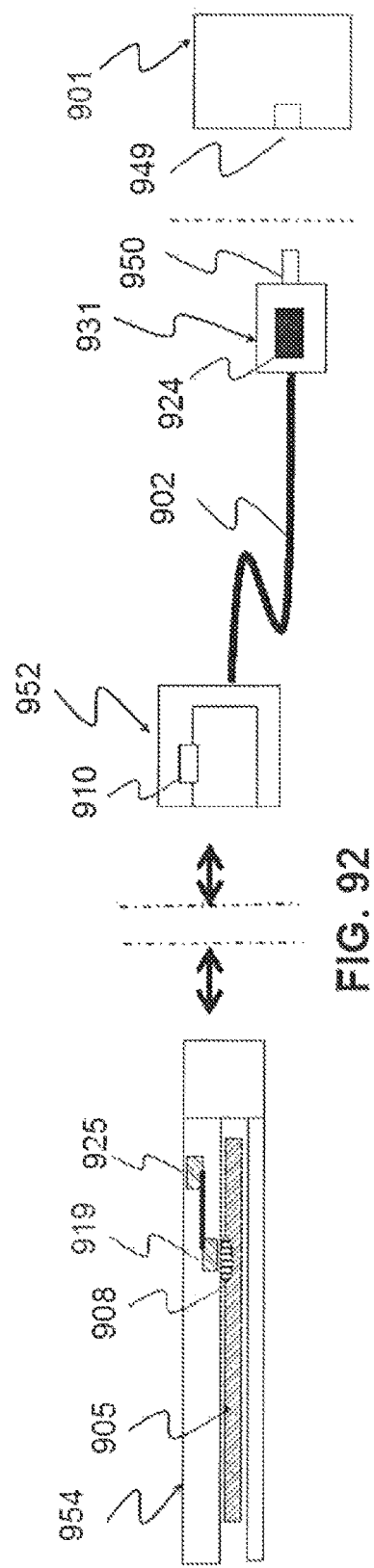

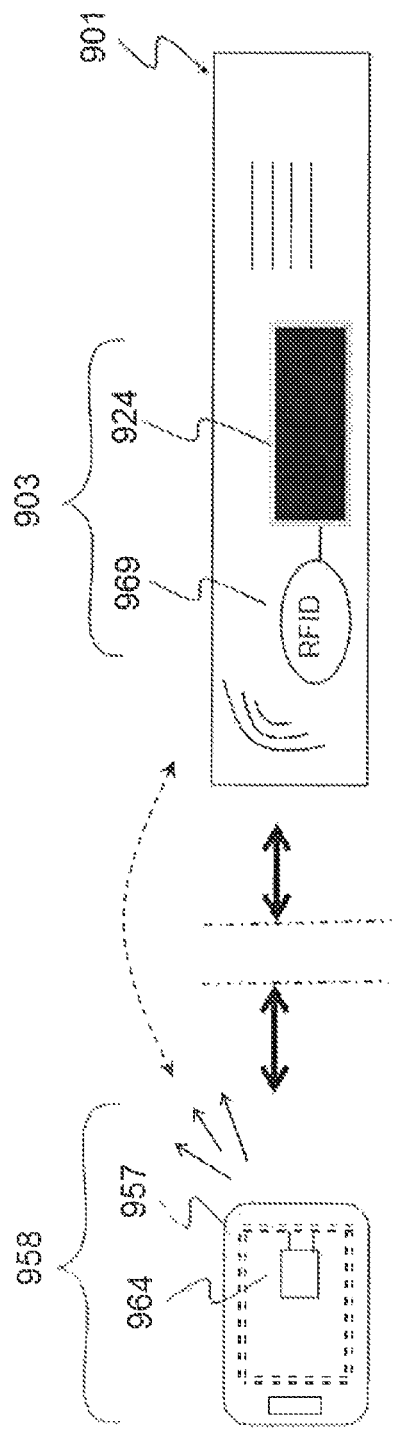
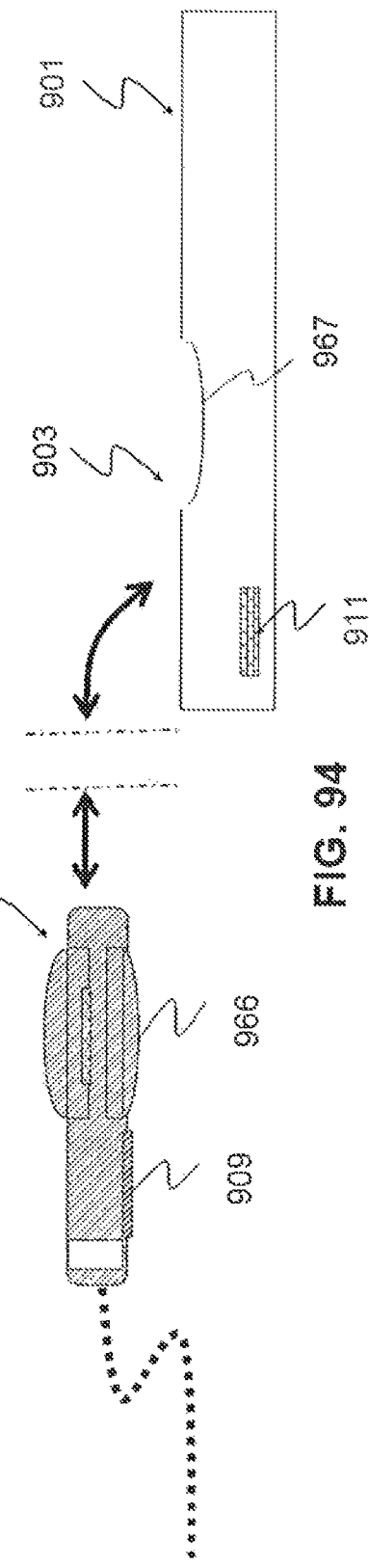

SMARTCARD AND COMPUTER QUICK CONNECT AND RELEASE SYSTEM

CROSS REFERENCE TO PRIOR APPLICATION

This application claims benefit of U.S. Patent Application No. 61/607,119 by Burns, filed Mar. 6, 2012, for a "card holder and reader system for electronic smart card," and of U.S. patent application Ser. No. 13/787,196 by Burns, filed Mar. 6, 2013, for a "Smartcard and Computer Quick Connect and Release System." The whole content of those applications is incorporated herein by reference as if explicitly set forth herein.

FIELD OF DISCLOSURE

The present disclosure relates to a card holder and reader system for a smartcard, and especially, a system including a card holder that is integrated with or operates in conjunction with a mating card reader to enable use of a smartcard configured for one or both of contact and contactless operation.

BACKGROUND OF DISCLOSURE

Electronic devices, such as a computer or computer system, commonly include an access terminal monitor, keyboard, and mouse, an operating system and or software, and may be connected to a network, including domain, or other control device for example, robotic or industrial controllers. An electronic device may also refer to other electronic machines, control systems, or devices with a HMI Human Machine Interface, including those used in retail, production, and other industries.

In general, in the interests of conciseness, in the present specification the term "computer" will be used to reference all such electronic devices with an HMI, and not only those more narrowly called computers.

The expression "computer access" is used to describe that a user person has the ability to interact with a computer in the broad sense of "computer" defined above through an access terminal. In turn, the user may have partial or full operative access to connected systems equipment, networks, software, data, etc. Operative access includes but is not limited to the ability to interact with a computer's operating system, software, data, network, etc.

Smartcards have become widely used in a system of "two-factor authentication," meaning that the user must possess something a smartcard and know something a password, for be authenticated as a valid user and to have operative access to the computer. Typically, the computer user is required to insert his or her smartcard into a smartcard reader connected to the computer, and then enter a valid password in order to obtain computer access. A computer system's owner/administrator may authorize different users various levels or areas of computer access.

It is known to provide a person with a card that acts both as a photo ID and as a smartcard for access to computer systems. Conventionally, such cards are worn visibly by the user in a badge holder. The card is then removed from the badge holder and inserted into a card reader attached to the computer, for computer access. However, there is then a risk that the user will move away from his or her computer, leaving the card in the card reader. That both leaves the computer vulnerable to interference by an unauthorized user, and leaves the user without proper ID.

Since the smartcard is required for obtaining computer access, the computer may also monitor the presence of the smartcard in a smartcard reader so that when the smartcard is removed the computer access is limited or disabled.

Computers use various methods to determine the presence of the smartcard in the smartcard reader, including: a "card in position switch" that mechanically detects the presence of the card in the reader, smartcard's contacts; or continuous "polling" communication with the smartcard's integrated circuit.

A security risk is created if the computer is left unattended and accessible to an unauthorized user because a previous authorized user fails to remove his or her smartcard from the card reader before leaving the computer.

The design of conventional smartcards, smartcard holders, and smartcards readers requires the user to effectively lose possession of their smartcard, because it must be removed or disconnected from their smartcard holder, lanyard, wallet, etc. in order to insert the smartcard into the smartcard reader, or place the smartcard near a contactless reader. This approach is illustrated by, for example, U.S. Pat. No. 5,337,813, which shows a card holder for displaying a card as an ID badge designed to make the smartcard easily removable, implying a need by users who are constantly removing the smartcard to insert into a smartcard reader for computer access. Smartcard reader designs such as that shown in U.S. Pat. No. 6,015,092 illustrate a desire/need to make smartcard insertion and removal easier by orienting the slot into which the smartcard is inserted at a right angle. Furthermore, current smartcard readers are designed to be "fixed" in place. Examples are a built in reader on a laptop computer, or a desktop mounted card reader. In general the current designs of smartcard holders and readers require users to remove the smartcard from their persons and place the smartcard into the computer's smartcard reader in order to gain computer access. Since the user is not able to maintain possession of their smartcard during computer access the only method of mitigating the previously discussed security risk is to require users to remember to remove their smartcard when they leave a computer unattended.

Currently, it would be possible for a user to maintain possession of their smartcard during computer access by attaching the smartcard, without a protective holder, to a retractable ID reel worn by the user. The design of smartcards, smartcard readers, and smartcard holders presents several problems that make this an undesirable method. First, the smartcard reader may lack sufficient pressure to the smartcard's surface to supply enough frictional force to hold the smartcard in the smartcard reader against the retraction force from the reel. Second, a non-axial force applied to the smartcard by the tether may cause the smartcard to become stuck in the smartcard reader. That may result in the reader, and any attached equipment, being dragged out of position, or may result in either the smartcard or the entire reader coming loose suddenly. Any of those scenarios presents a risk of damage to the connected equipment or damage and/or injury to articles and/or persons in the "line of fire" of the tether. Third, the smartcard is not easy to insert into the narrow card receiving slot of a card reader, and may be even more difficult with the retractable reel attached.

The use of smartcards for computer access may be required in various working environments requiring repeated smartcard connections such that quick, blind by touch or feel, and even single handed application would be desirable. In addition various working environments may also require an both an easy smartcard disconnect and breakaway design so that the smartcard can be quickly removed and in the case where the user inadvertently fails to remove their smartcard it breaks free of the reader in such a fashion as to minimize or eliminate equipment damage or personal injury.

It has been proposed in US 2010/0265084 Augustinowicz to provide a badge holder including a smartcard reader interface with a cable that can be plugged into the computer, so that the smartcard can be used for computer access without being removed from the holder worn by the user. However, in that case, if the user moves away from the computer without disconnecting the cable, there is a risk that the cable connector or other components will be damaged, and/or computer equipment will be pulled onto the floor. A device commercially available from Stanley Global under the designation SGT-118 is advertised as including an "OSHA compliant safety breakaway lanyard." However, the breakaway point appears to be in the lanyard that attaches the card holder to the user. Consequently, breaking away of the lanyard would leave the card and reader attached to the computer and detached from the user, presenting the same issues as the conventional arrangement. The breakaway lanyard is meant to prevent catastrophic injury for example, choking to death if the badge holder is caught in machinery or other equipment. It is not meant to break away in office environments where incidental accidents for example, becoming tangled in a phone cord would lead merely to damaged equipment. The Augustinowicz and Stanley Global devices are effectively standard smartcard readers worn around the neck with a USB extension cord. They are not user friendly or easy to connect and only attach and release axially.

In addition, the Augustinowicz and Stanley Global badge holders are expensive, because they include the sophisticated card reader chip and card detect circuitry in the badge holder. That is in many situations undesirable, because badge holders continually worn by people frequently become lost and damaged.

There is therefore a need for a system by which the smartcard can be easily connected to and released from the smartcard reader, and which, if the user moves away from the computer without disconnecting properly, separates safely and reliably, leaving the user wearing his badge, leaving all the expensive electronics attached to the computer, and leaving the computer unusable by an intruder, because the computer detects that the smartcard has been removed.

SUMMARY OF THE INVENTION

Various aspects of the present invention make it possible for users to maintain possession of their smartcard. Some embodiments provide an improved disconnect between a smartcard unit and a computer unit. The smartcard unit could be defined as the smartcard itself, the smartcard and the smartcard holder, or the smartcard and the holder with a built in smartcard reader IC. The computer unit would then be the remaining circuitry and components required to make the computer connection. The objective of the design is so that the user can retain possession of their smartcard yet have quick, fast, and safe way of connecting to and releasing from a computer.

Embodiments of the invention provide methods and apparatus for connecting a smartcard unit worn by a person and computer unit together such that computer can only communicate with the smartcard's integrated circuit when the user is present.

Embodiments of the invention provide a smartcard holder and reader where surfaces of the holder and reader will have features to allow them to easily be aligned and connected together in order that the smartcard's integrated circuit may be read by the computer. In embodiments of the smartcard holder and reader, mechanical or magnetic features of the holder and reader have features to allow them to maintain physical or proximal connection together in order that the smartcard's integrated circuit may be read by the computer. In embodiments of the smartcard holder and reader, mechanical or magnetic features of the holder and reader allow them to be disconnected with minimal amount of force applied axially, laterally, and/or vertically so as to not cause damage to connected equipment, surrounding articles, or persons.

Embodiments of the invention provide a card holder and reader system, comprising: a card holder configured to receive at least a portion of a smartcard while permitting direct external communication with the smartcard, the holder having a first alignment device; a card reader removably connectable to the card holder, the card reader configured to communicate directly with the smartcard and having a second alignment device configured to cooperate with the first alignment device to align the smartcard and the card reader for direct communication; and a communication cable connected at one end to the card reader, the communication cable being in electrical communication with the card reader for transmitting data between the smartcard and an external device.

Embodiments of the invention provide a card holder and reader system, comprising: a card holder configured to receive at least a portion of a smartcard containing an electronic chip while permitting or enabling external electrical access to the electronic chip, the holder having a first alignment device; a card reader removably connectable to the card holder, the card reader operative for communication with the electronic chip on the smartcard and having a second alignment device configured to cooperate with the first alignment device to align the smartcard and the card reader for communication, the card reader further comprising electronic circuitry configured to at least one of encode and decode data transmitted between the smartcard electronic chip and an external device; and a communication cable connected at one end to the card reader, the communication cable being in electrical communication with the electronic circuitry for transmitting data between the smartcard electronic chip and the external device.

Embodiments of the invention provide an identification system comprising: a smartcard unit comprising at least a smartcard and an attachment enabling the smartcard unit to be worn by a user as a badge, wherein the smartcard is accessible for reading by an external reader; and a reader unit operative to interface communicatively with the smartcard in the smartcard unit and with a computer to enable the computer to communicate with the smartcard; wherein at least one of the smartcard unit and the reader unit has structure to align the reader unit relative to the smartcard in an alignment for communicative interfacing while the smartcard unit is being worn by the user; and wherein at least one of the smartcard unit and the reader unit has a retainer operative to secure the reader unit relative to the smartcard in said alignment so that the smartcard unit is reversibly separable from the reader unit without damage, in response to a force less than is necessary to detach or damage any other part of said system, in a direction other than along a longitudinal axis of the smartcard or of a pair of components being separated.

Embodiments of the invention provide a card holder and reader system for a smartcard having an electronic chip, the system comprising: a card holder including a body and a replication flap hingedly attached to the body, the body having a slot configured to receive at least a portion of the smartcard containing the electronic chip and first electrical contacts on an inner surface of the slot configured to communicate with the electronic chip, the replication flap having second electrical contacts on an outer surface of thereof, the card holder having electrical wiring connecting the first electrical contacts to the second electrical contacts; wherein the replication flap has a size and shape substantially matching the size and shape of the smartcard to enable the replication flap to be received into a standard smartcard reader.

Embodiments of the invention provide a card holder and reader system for a smartcard having an electronic chip, the system comprising: a card holder having a slot configured to receive at least a portion of the smartcard containing the electronic chip and having an opening extending between the slot and an outer surface of the card holder to enable direct access to card contacts on the smartcard and a first alignment device; a card reader removably connectable to the card holder, the card reader having electrical contacts configured to communicate with the card contacts on the smartcard and a second alignment device configured to cooperated with the first alignment device to align the electrical contacts on the card reader with the opening on the card holder such that the card reader electrical contacts can contact the card contacts; and a communication cable connected at one end to the card reader, the communication cable being in electrical communication with the electrical contacts of the card reader for transmitting data between the smartcard electronic chip and an external device.

Embodiments of the invention provide a card holder and reader system for a smartcard having an electronic chip, the system comprising: a card holder configured to receive at least a portion of the smartcard containing the electronic chip, the holder having a first alignment device; a card reader removably connectable to the card holder, the card reader having a contactless sensor configured to communicate with the electronic chip on the smartcard and a second alignment device configured to cooperated with the first alignment device to align the contactless sensor on the card reader for communication with the electronic chip; and a communication cable connected at one end to the card reader, the communication cable being in electrical communication with the contactless sensor for transmitting data between the smartcard electronic chip and an external device.

Embodiments of the invention provide a card holder and reader system for a smartcard having an electronic chip, the system comprising: a card holder having a slot configured to receive at least a portion of the smartcard containing the electronic chip and having an opening extending between the slot and an outer surface of the card holder to enable direct access to the electronic chip; a card reader adapter removably connectable to the card holder, the card reader adapter having first electrical contacts configured to communicate with the electronic chip on the smartcard, second electrical contacts on an outer surface of the card reader adapter, and electrical wiring connecting the first electrical contacts to the second electrical contacts, the card reader adapter having a first alignment device; a card reader removably connectable to the card reader adapter, the card reader having third electrical contacts configured to communicate with the second electrical contacts on the card reader adapter and a second alignment device configured to cooperated with the first alignment device to align the third electrical contacts on the card reader with the second electrical contacts on the card reader adapter; and a communication cable connected at one end to the card reader, the communication cable being in electrical communication with the third electrical contacts of the card reader for transmitting data between the smartcard electronic chip and an external device.

The system may further comprise electronic circuitry configured to at least one of encode and decode data transmitted between the smartcard electronic chip and the external device, the electronic circuitry being located in at least one of the card reader, the card holder, and the communication cable.

The smartcard unit may further comprise a badge holder, and may have an attachment enabling the holder, holding the smartcard, to be worn by the user as the badge.

The smartcard may have card electrical contacts; the reader may have reader electrical contacts; and the holder may comprise first holder electrical contacts aligned to connect with the card electrical contacts when the smartcard is received in the holder, second holder electrical contacts aligned to connect with the reader electrical contacts when the reader is retained on the holder, and circuitry connecting the first and second holder electrical contacts so as to transparently electrically connect the reader with the card.

The smartcard may have card electrical contacts; the reader may have reader electrical contacts; and when the card is received in the holder, the card electrical contacts may be exposed by the holder; and the reader may be so configured that the reader electrical contacts connect directly to the card electrical contacts.

The smartcard may be in the form of a contactless card or fob, the card reader may have a wireless transceiver, and communication between the smartcard and the reader may be established when the smartcard is located in sufficient proximity and correct alignment with the reader transceiver.

The reader when retained on the holder may emulate at the external device a standard reader for the smart card.

The reader may comprise a sensor that emulates a card-in-position switch and that when the reader is separated from the smartcard returns to the external device a signal indicating that the card has been removed.

The mechanical force required to separate the card reader from the card holder may be substantially less than the mechanical force that, if applied to the card reader, would be required to separate the smartcard from the card holder.

The outer surface of the card holder may further comprise an alignment guide to facilitate alignment of the card reader.

The reader may comprise a module connectable with the badge holder and a desktop module connected to the external device, and the communication cable connects the module connectable with the badge holder to the desktop module.

The system retainer may comprise a resiliently biased retainer member wherein the bias exerts a force tending to hold the smartcard or smartcard unit and the reader or reader unit in alignment. The resiliently biased retainer member may then comprise a flap hingedly attached to the card reader or to a holder, the flap being configured to pivot between a first position in which the flap protects electrical contacts on one of the reader, the holder, and the card, and a second position in which the flap allows access to the electrical contacts.

BRIEF DESCRIPTION OF THE DRAWINGS

The above and other aspects, features, and advantages of the present invention may be more apparent from the following more particular description of embodiments thereof, presented in conjunction with the following drawings. In the drawings:

FIG. 1 is a schematic view of a card holder and reader with a cable to connect it to a computer.

FIG. 2 is a schematic view similar to FIG. 1, showing a system in which the card is connectable to a computer by a retractable cord.

FIG. 3 is a schematic view similar to FIG. 1, showing a system in which the card is connectable to the computer by a replication tether.

FIG. 4 is a schematic view similar to FIG. 1, showing a card holder with an integrated card reader connectable to a computer by a card holder connector cable.

FIG. 5 is an enlarged view of a smartcard reader attached magnetically to a smartcard in a holder worn by user with lanyard.

FIG. 6 is an enlarged view of a smartcard and holder inserted mechanically to a desktop card reader.

FIG. 7 shows a contactless smartcard attached to an ID reel being held in position mechanically on a USB contactless card reader plugged into a laptop.

FIG. 8 shows a contactless smartcard held in position magnetically to a contactless card reader built into a laptop.

FIG. 9 shows a contact smartcard reader and a smartcard in holder with protective flaps to hold the reader in place.

FIG. 10 shows the device of FIG. 9 with the reader engaged with the smartcard.

FIG. 11 shows a contactless smartcard reader and a smartcard in holder with protective flaps that provide RFID and laterally hold the reader in place.

FIG. 12 shows the device of FIG. 11 with the reader engaged with the smartcard.

FIG. 13 shows a contact smartcard reader and a smartcard in holder where the reader has a hinged bottom feature to hold the reader in place.

FIG. 14 shows the device of FIG. 13 with the reader engaged with the smartcard.

FIG. 15 is a perspective view of a heavy duty smartcard and reader system.

FIG. 17 is a perspective view of a smartcard in the form of a fob with a slip on adaptor.

FIG. 18 is a perspective view of a slip-on adaptor for a contact type smartcard.

FIG. 19 is a section through a desktop smartcard reader with indirect acting spring hinge.

FIG. 30 is a section along the lines B-B in FIG. 26 and C-C in FIG. 27 showing the card reader being applied to and removed from the card holder.

FIG. 31 is a view similar to FIG. 30 showing a modified form of the apparatus.

FIG. 32 is a view similar to FIG. 30 showing another modified form of the apparatus.

FIG. 33 is a view similar to FIG. 30 showing a contactless card and reader an opening that can be useful for RFID holders.

FIG. 34 is a perspective view showing a holder with an alignment feature.

FIG. 38 is a section along the line A-A of FIG. 36.

FIG. 39 is a section along the line B-B of FIG. 36.

FIG. 45 is a perspective view of a prior art upright desktop card reader.

FIG. 46 is a perspective view of a prior art horizontal desktop card readers and smartcard.

FIG. 47 is perspective view an embodiment of an open designed card reader according to an embodiment of the invention, showing a smartcard being axially, laterally, and vertically removable.

FIG. 48 is a frontal view of the reader of FIG. 47, illustrating lateral movement of the smartcard.

FIG. 49 is side view of the reader of FIG. 47 illustrating hinged sensors and a smartcard being vertically removable.

FIG. 50 is perspective view of a magnetic open horizontal desktop card reader, illustrating axial, lateral, and vertical movements of the smartcard.

FIG. 51 is a side view of the reader of FIG. 50 illustrating axial and vertical connection movements.

FIG. 52 is top view of the reader of FIG. 50 illustrating axial and lateral connection movements.

FIG. 53 is perspective view of a smartcard or holder attached to an ID reel being connected to the card reader of FIG. 50.

FIG. 54 is perspective view of a smartcard or holder attached to an ID reel being connected to a card reader of FIG. 47.

FIG. 55 is a perspective view of a mechanically connectable card reader being attached to a smartcard holder worn by user with a lanyard.

FIG. 56 is a top view of the card reader of FIG. 55 and smartcard, illustrating axial and lateral connection movements.

FIG. 57 is a side view of the card reader of FIG. 55 and smartcard/holder in a fully connected state.

FIG. 58 is a side view card of the reader of FIG. 55 and smartcard illustrating axial and vertical connection movements.

FIG. 59 is a perspective view of a magnetically connectable card reader and a smartcard holder on a belt clip.

FIG. 60 is a top view of the card reader of FIG. 59 and smartcard illustrating axial and lateral connection movements.

FIG. 64 is a perspective view showing a reader with contact pins and a smartcard or holder with contacts pads.

FIG. 65 is a perspective view showing antenna ranges of a contactless reader and smartcard.

FIG. 76 is a schematic top view of a card holder with an undergarment tether.

FIG. 77 shows a user in protective clothing using the card holder of FIG. 76 at a computer control station.

FIG. 78 is a perspective schematic view showing a card holder with connections to a card reader on one side and to a smartcard on the other side.

FIG. 79 is a cross-sectional view of the embodiment of FIG. 78 with the smartcard received into the card holder.

FIG. 89 is a schematic diagram of one embodiment of the electrical connection between a smartcard, a card reader, and a computer.

FIG. 90 is a side view of mechanical components for one embodiment of the connection scheme shown in FIG. 89.

FIG. 91 is a view similar to FIG. 89 of an alternative embodiment.

FIG. 92 is a side view similar to FIG. 90 for one embodiment of the connection scheme shown in FIG. 91.

FIG. 93 is a schematic top view of one form of contactless interface between smartcard antenna and computer.

FIG. 94 is a side view showing a mechanical connection for the device shown in FIG. 93.

DETAILED DESCRIPTION

Figure 16:
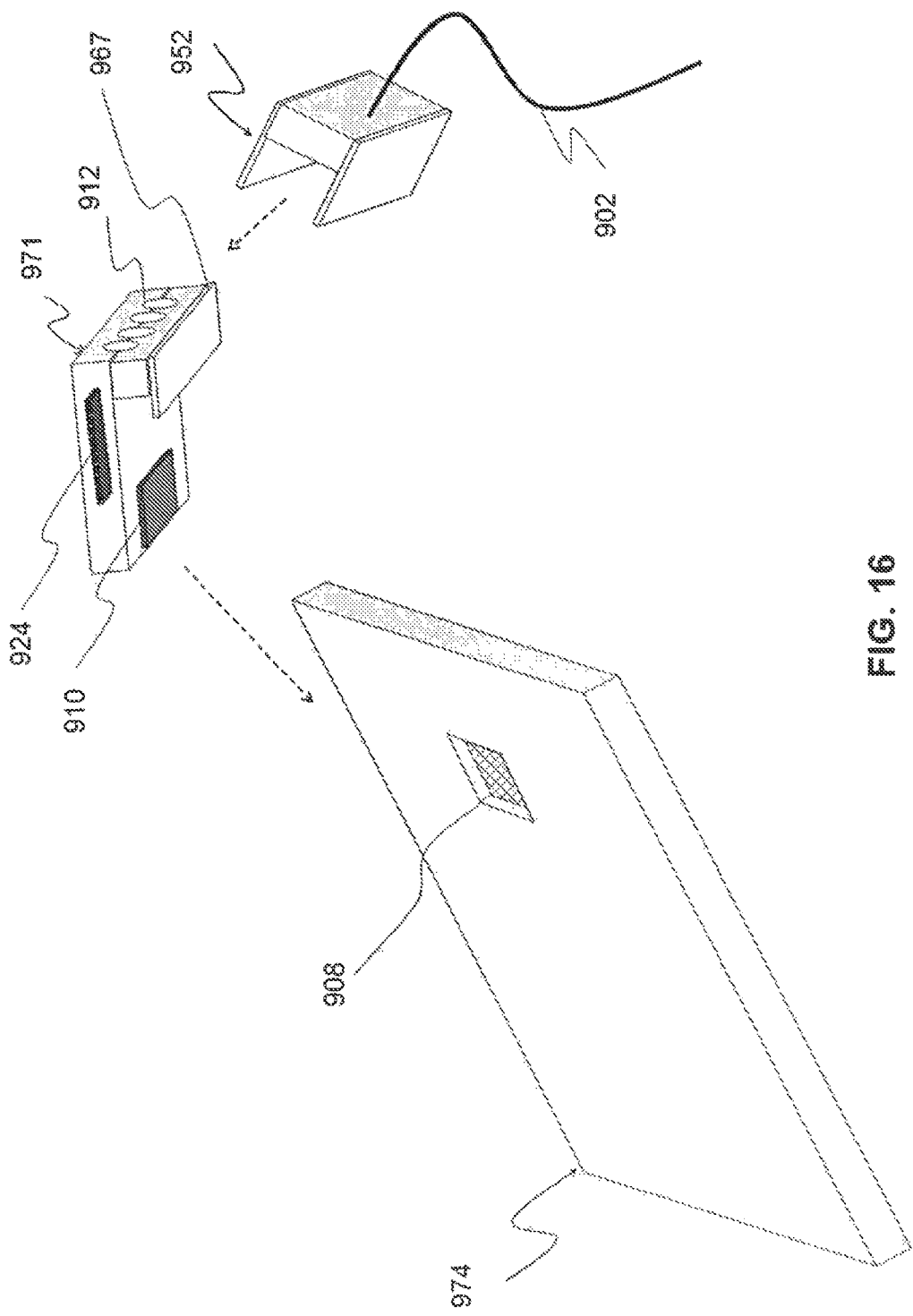
FIG. 16 is a perspective view of a smartcard holder adaptor.

A better understanding of various features and advantages of the present methods and devices may be obtained by reference to the following detailed description of illustrative embodiments of the invention and accompanying drawings, in which like numerals designate like elements. Although these drawings depict embodiments of the contemplated methods and devices, they should not be construed as foreclosing alternative or equivalent embodiments apparent to those of ordinary skill in the subject art.

Referring to the drawings, and initially to FIG. 1, in one embodiment of a card holder and reader system according to an embodiment of the present invention, a smartcard 905 is inserted in use into a smartcard holder 904 to form a smartcard unit. The holder 904 is provided with a lanyard 927 by which the user can wear the holder 904, with the smartcard 905, round his or her neck. The smartcard 905 may then serve as a visible ID badge, and/or may be used as an access card for, for example, unlocking doors with card readers. A smartcard reader 906 is connected to a computer 901 by a communication cable 902 with a computer connector 912 to form a computer unit. To establish communication between smartcard 905 and computer 901, the computer unit is connected to the smartcard unit by attaching the smartcard reader 906 to the smartcard holder 904. Embodiments of smartcard readers 906, holders 904, and smartcards 905, and their interactions, will be described below with reference to further figures of the drawings.

The computer 901 is provided with a CPU, read only memory (ROM), random access memory (RAM), non-volatile storage including fixed and removable disk drives, user interfaces such as a keyboard and monitor, and external communications ports such as data port 949. All of those features may be conventional and, in the interests of conciseness, are not described herein in more detail.

Referring now to FIG. 2, in an alternative embodiment, a smartcard 954 on an ID reel 927 forms the smartcard unit. A smartcard reader 946 connected to a computer 901 by a communication cable 902 forms the computer unit. To establish communication between the smartcard 954 and the computer 901, the smartcard unit is connected to the computer unit by attaching or inserting the smartcard 954 to the smartcard reader 946. The smartcard reader 946 may be as shown in more detail in FIG. 6, described below.

Referring now to FIG. 3, in an alternative embodiment, a smartcard 905 inserted into a smartcard holder 956 with a lanyard 927 comprises the smartcard unit. A smartcard reader or tether holder 951 is connected by a communication cable 902 to a replication tether 937, described in more detail below with reference to FIG. 74. The replication tether 937 mimics the physical shape and properties of a smartcard, and is inserted into a conventional desktop smartcard reader 938 connected to a computer 901 by a communication cable 902. Everything from replication tether holder 951 through computer 901 together forms the computer unit. To establish communication, the computer unit is connected to smartcard unit by attaching the replication tether holder connector 951 to the smartcard holder 956.

Referring now to FIG. 4, in an alternative embodiment, FIG. 4, a smartcard 905 is inserted into a smartcard holder 921 including a smartcard reader IC and provided with a lanyard 927 to form the smartcard unit. A smartcard unit adaptor 952 is connected to a computer 901 by a communication cable 902 and computer connector 912 to form the computer unit. To establish communication, the computer unit is connected to the smartcard unit by attaching the smartcard adaptor 952 to the smartcard holder with reader 921.

Referring now to FIG. 5, one form of smartcard reader 968 is shown being attached to smartcard holder 956 as shown in FIG. 1 or FIG. 3. The connection method may be that described in more detail below with reference to FIG. 68, and the alignment method may be that described in more detail below with reference to FIGS. 59 through 63.

Figure 66:
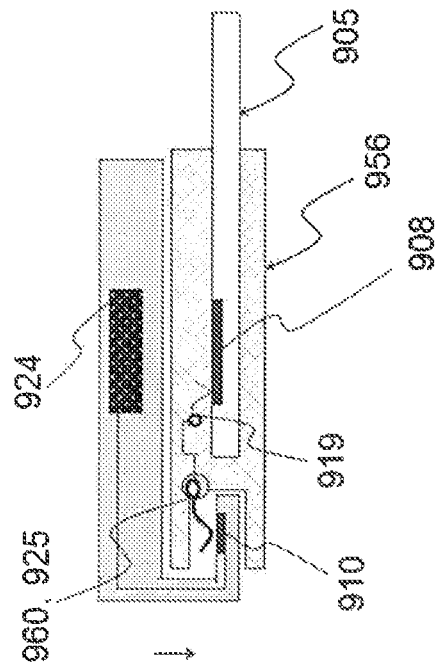
FIG. 66 is a sectional view showing a mechanical card reader connected to a holder where the reader has a mechanical hinge to make the contact pins of the reader connect to contact pads of the smartcard or smartcard holder.

Referring now to FIG. 6, in one embodiment of the system shown in FIG. 2, a smartcard 954 is connected to smartcard reader 946 using a connection method which may be that of FIG. 66 and an alignment method which may be that of FIGS. 47 through 49.

FIG. 7, similarly to FIGS. 2 and 6, shows a smartcard on a lanyard 927 being attached to a desktop smartcard reader 903. However, in the embodiment of FIG. 7 the card reader 903 is connected directly to the computer 901, effectively reducing the communication cable length between them to zero. The smartcard 958 is connected to reader 903 using a mechanically hinged spring clamp 960 provided at its tip with a rounded guide 966, as shown in more detail in FIG. 69. The alignment method is non-critical because FIG. 7 shows a contactless card 958 that only has to held in reasonable proximity to the reader 903 so that the smartcard reader's antenna can interrogate the smartcard 958. In this and other embodiments, other forms of hinge and other forms of spring may be used. For example, a "living hinge" may be used, and may be sufficiently stiff also to act as a spring.

FIG. 8 shows a contactless smartcard 958 in a fob format being connected to smartcard reader 903 that is built into the computer 901. The connection method may be similar to that of FIG. 71 and the alignment method is non-critical as the card 958 only has to held in reasonable proximity to the reader 903 so that the smartcard reader's antenna can interrogate the smartcard.

Figure 69:
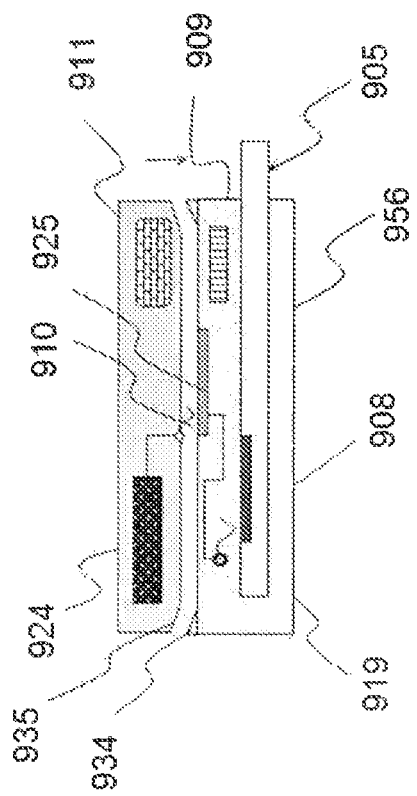
FIG. 69 is a view similar to FIG. 66 showing a mechanical contactless card reader and a smartcard holder with hinged protective flaps.

FIGS. 9 and 10 show a smartcard reader 906 being attached to smartcard holder 904 in a manner that may be used as an embodiment of FIG. 1. The reader 906 may be aligned with the card in the holder 904 by the use of a projection and recess similar to that described below with reference to FIGS. 59 through 63. The reader 906 is held in place on the holder 904 by protective flap 916 mounted on spring-loaded hinge 961, as shown in FIG. 69. The protective flaps 916 may also serve to provide RFID shielding for hybrid type cards, preventing the card from being remotely accessed with the flap 916 closed as shown in FIG. 9. Rounded holder guides 966 on the flap 916 and reader guides 967 on the reader 906 allow the reader to be pushed into place under the flap 916 without the user needing to lift the flap 916 with his other hand.

Figure 72:
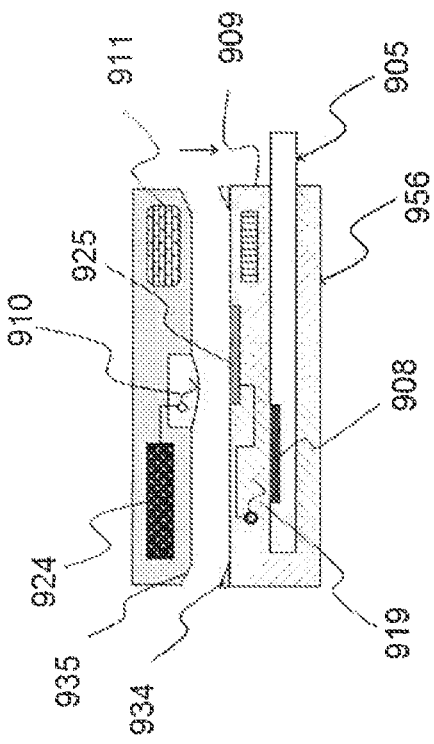
FIG. 72 is a view similar to FIG. 66 showing a mechanical reader connected to a smartcard holder where the hinged action of sliding plates and angular design forces the card reader onto the holder.

FIGS. 11 and 12 show a smartcard reader 903 being attached to smartcard holder 904 somewhat similarly to the embodiment shown in FIGS. 9 and 10. Alignment may be by a projection on reader 903 fitting into a recess in holder 904 as shown in FIGS. 59 through 63. In this embodiment the recess is covered by protective flaps 963 that slide laterally and\or axially, allowing the card reader to be slid into place between the two flaps, and held in place by notches on the flaps gripping ribs on the edges of the reader 903, as shown in FIG. 72. The shape of the flaps and the card reader serve as both connection guides and holders. The design of flap hinges 960 and 963 allows for multidirectional release.

Figure 67:
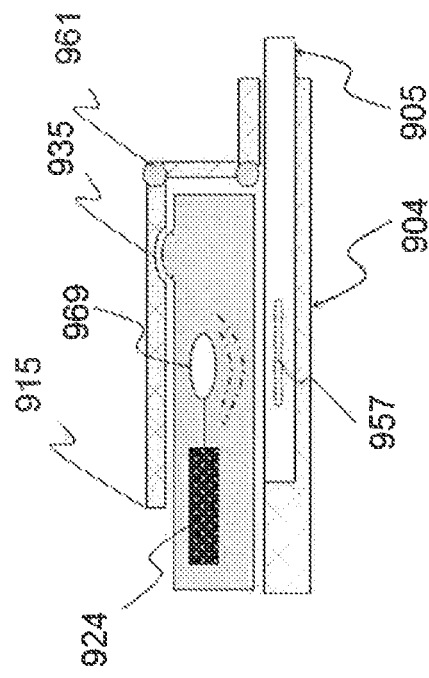
FIG. 67 is a view similar to FIG. 66 of an alternative embodiment in which the mechanical hinges are also the contact pins of the smartcard holder.

FIGS. 13 and 14 show a smartcard reader 906 being attached to smartcard holder 904 using the connection method of FIG. 67, in which a tab on reader 906 bearing contact sensors 910 slides into a slot containing contact pins 925 in the holder 904, while the main body of reader 904 overlies a flat surface of holder 904. The tab may be mounted on spring-loaded hinges 960 to ensure a sufficient contact pressure and frictional grip between the reader 906 and the holder 904. The opening to the holder contacts 925 is shape such to allow holder's contacts to be slide into place semi laterally yet when fully inserted align the contacts properly for communication purposes. Correct alignment method is that detailed in FIG. 55 through FIG. 58. The opening to the holder contacts 925 is shaped so as to allow the tab on the reader 906 to be slid into place semi laterally, and to be removed obliquely or semi laterally, yet when fully inserted to align the contacts properly for communication purposes. Correct alignment may be ensured by the method described in more detail below with reference to FIGS. 55 through 58.

FIG. 15 shows a smartcard reader 968 attached to smartcard 956 as shown in FIG. 1. Electrical connection is provided by external contacts 910, 925 on the reader 968 and the holder 956, respectively. Alignment is provided by a sloped projection and recess 966, 967, and by projection 935 of reader 968 fitting into recess 934 on holder 956, as discussed below with reference to FIGS. 55 to 58. The reader may be held onto the holder magnetically, as discussed below with reference to FIG. 68. This embodiment shows that a smartcard such at that disclosed by ISO 7816 can be modified to allow a smart card reader to be connected and released quite easily.

FIG. 16 shows a smartcard holder 974, which may be, for example, a holder 904, 906, or 956, being outfitted with an adaptor 971 which will allow a holder connector 952 to be connected. Any two different connections may be formed between holder 974 and adaptor 971, and between adaptor 971 and connector 952. As shown in FIG. 16, the connection method between the adaptor 971 and holder connector 952 is that of FIG. 70, using card reader guide 967, and data pins 912, and the alignment method via the connector is that detailed in FIG. 59 through FIG. 63. Sensors 910 on adaptor 971 engage card contacts 908 through an aperture in holder 974. The adaptor 971 may or may not have a smartcard reader IC 924 built in, in the case where the IC is not in the adaptor, a different computer unit would be required, for example 968.

FIG. 17 shows a smartcard holder 958 being outfitted with an adaptor which will allow a smartcard reader 903 to be connected. The connection method between the adaptor and holder connector is that of FIG. 71 and the alignment method is not critical.

FIG. 18 shows a combination of a slip card holder 953 and a holder with a smartcard reader IC 921 which allows for a holder connector 952 to be connected. The connection and alignment method between the card holder 953, 921 and a smartcard 905 within the card holder 953 is that of FIG. 66. The clamp hinge 961 grips the card 905 with greater force and is not meant to be easily disconnected. The connection and alignment method between the computer connector 952 and the card holder 953, 921 is that of FIG. 70.

FIG. 19 shows an example of desktop smartcard reader 946 (see FIG. 2) with a spring type hinge 960 acting indirectly to hold the smartcard 905 in the smartcard reader. The mechanism is designed with an "over center" action such that when the flap 915 holding the smartcard against the contacts is to either side of a 45 degree angle the flap either is pushed more open to release the smartcard, or pushed more closed thus holding the smartcard firmly in the card reader. The feature of pushing the flap more open make it easier for the user to align and simply place their card on the open flap and push forward until the spring is to the other side of the 45° position, and snaps shut to clamp the smartcard in place.

Figure 20:
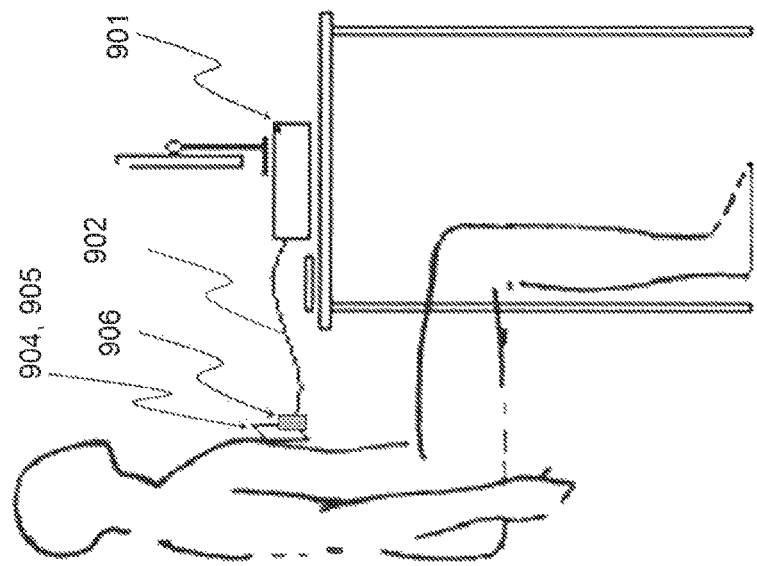

FIG. 20 shows a user with their smartcard 905 held in the card holder 904 worn on lanyard 927, tethered to a computer 901 with a computer unit 906 and 902.

Figure 21:
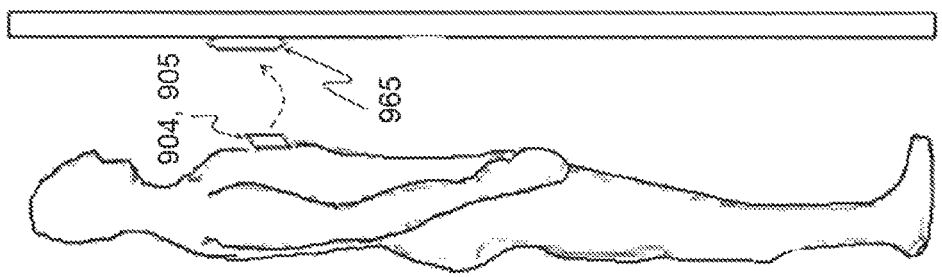
FIGS. 20 through 24 are schematics showing a person using various smartcard units with various computer units.

FIG. 21 shows a user with their smartcard 905 held in the card holder 904 worn on lanyard 927, interacting wirelessly, in a contactless manner, with an access point card reader 965.

Figure 22:
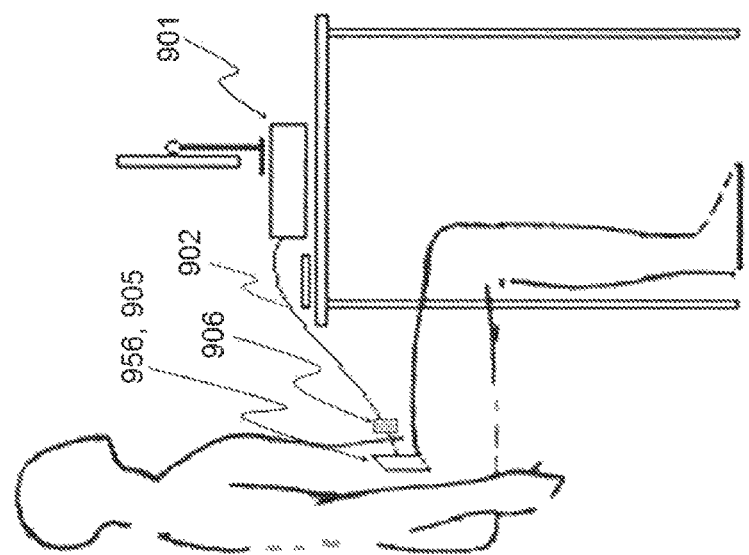

FIG. 22 shows a user with their smartcard 905 held in the card holder 956 worn on a belt clip 927, tethered to a computer 901 with a computer unit 906 and 902.

Figure 23:
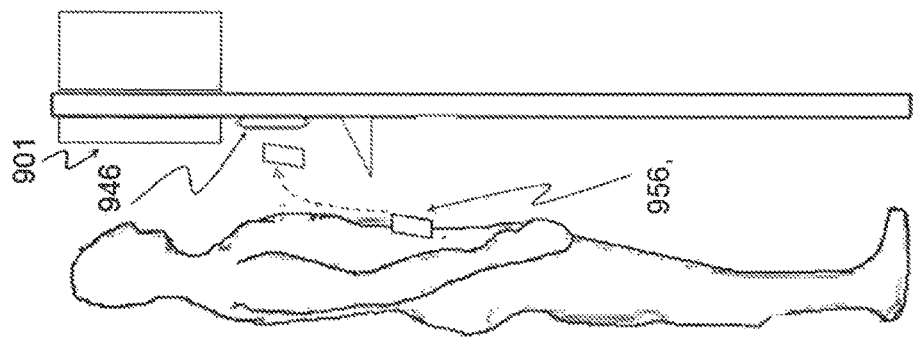

FIG. 23 shows user at an industrial control panel computer 901 and card reader 946. The user's smartcard 905 is in a holder 956 attached to the user by a retractable cord. The user is able to log onto computer 901 by inserting the smartcard 905 in reader 946, without removing smartcard 905 from holder 956, or detaching holder 956 from the user.

Figure 24:
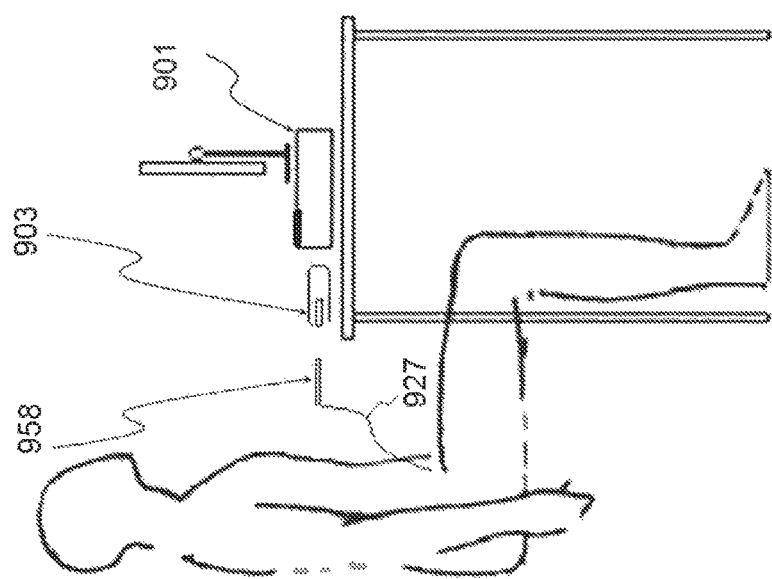
Figure 27:
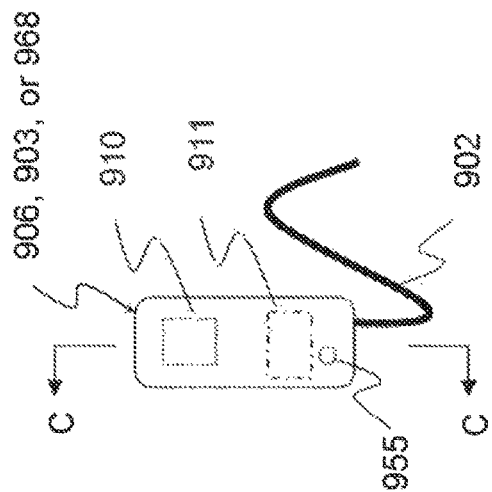
FIG. 27 is a top view of a card reader for use with the card holder of FIG. 25.
Figure 26:
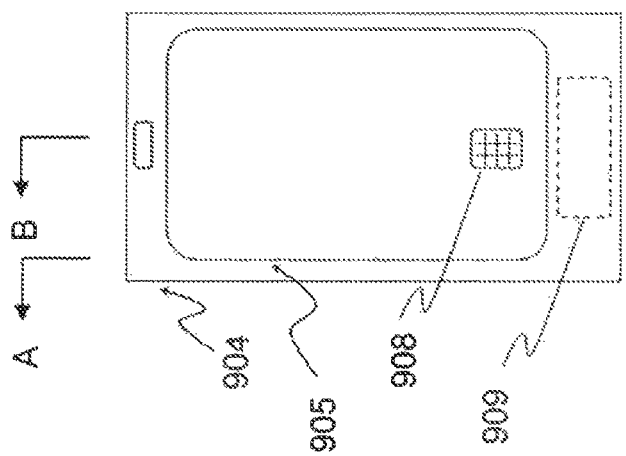
FIG. 26 is a top view showing internal structure of the card holder of FIG. 25.
Figure 25:
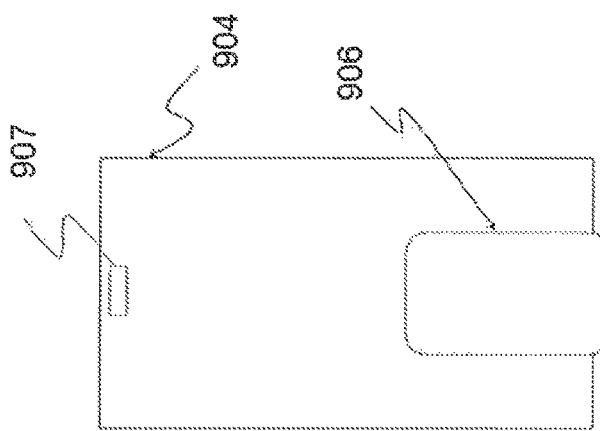
FIG. 25 is a top view of a card reader and holder that includes an opening to enable access to either an antenna or contacts on the smartcard.
Figure 28:
FIG. 28 is a section along the line A-A in FIG. 26.
Figure 29:
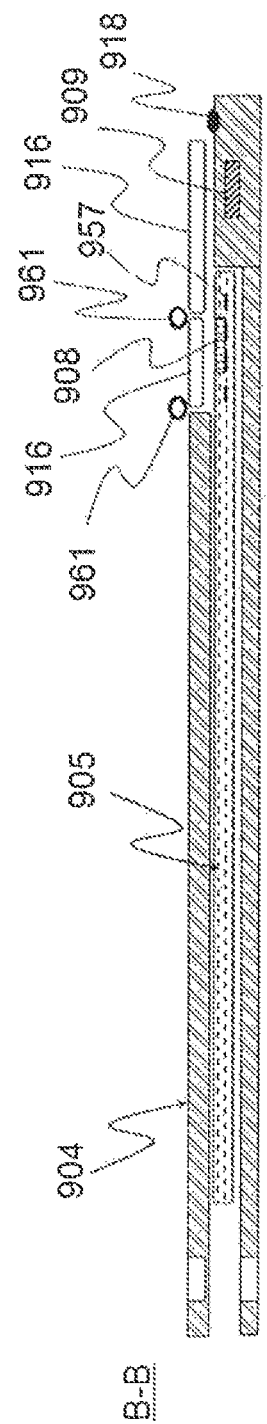
FIG. 29 is a section along the line B-B in FIG. 26.
Figure 37:
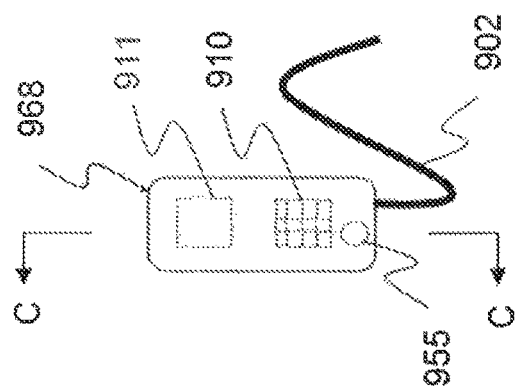
FIG. 37 is a top view of a card reader.
Figure 36:
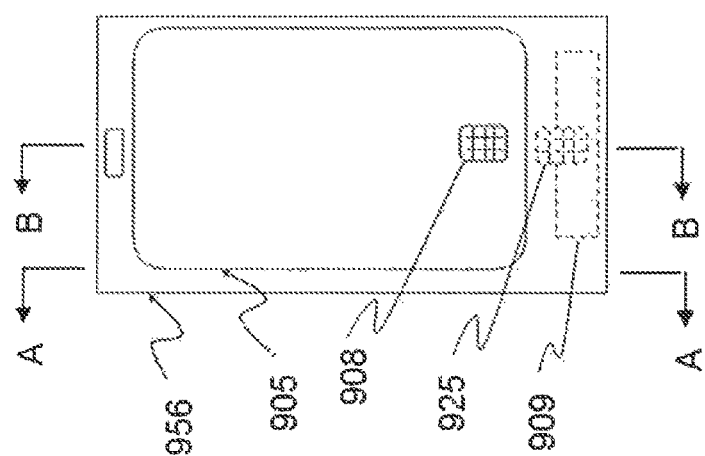
FIG. 36 is a top view showing internal structure of the card holder of FIG. 35.

FIG. 24. shows the user at a desk with computer 901 and contactless desktop card reader 903. The user connects the smartcard 958 to the computer, without needing to detach retractable cord 927.

FIG. 25 through FIG. 34 illustrate various forms of a card holder 904 that is distinguished by an opening that allows either direct contact to the smartcard's contact pads 908 or an opening that allows necessary access to the interrogation zone of an antenna 957 of a contactless smartcard. The card holder 904 may be used with various card reader types, card types, and connection and alignment methods.

Referring initially to FIGS. 25 through 29, certain basic features of smartcard holder 904 and smartcard reader 903, 906, 968 are illustrated. A card opening features alignment guides 934 (see FIG. 34) so as to assist aligning the reader contacts 910 with the smartcard contacts 908 and also to allow the card reader 903, 906, 968 to be removed easily by sliding. The system for both contact and contactless cards 905 includes a card holder 904, an appropriate card reader 906, 968, 903, and a communication cable 902, and various computer connectors 926, 931, 932. The card holder 904 has a slot configured to receive at least a portion of the smartcard 905 and the card opening extending between the slot and an outer surface of the card holder to enable either direct or indirect access to the smartcard's integrated circuit chip 964 through either the smartcard's contacts 908 or smartcard's antenna 957 and the first alignment device 934. The card reader 903, 906, 968 is removably connectable to the card holder 904, the card reader 906, 968 having electrical contacts 908 configured to communicate with the smartcard's IC through contact pads 908 and a second alignment device 935 configured to cooperate with the first alignment device 934 to align the electrical contacts on the card reader with the opening on the card holder such that the electrical contacts can contact the electronic chip. The communication cable 902 is connected at one end to the card reader and is in electrical communication with the electrical contacts 910 of the card reader for transmitting data between the smartcard IC 964 and a computer 901. Alternatively the same alignment removably connectable method will apply to contactless smart card where the card reader 903 is aligned in proximity with the smartcard's antenna 957.

The system may include an indicator light 955 on at least one of the card holder and the card reader to indicate that the card reader contacts are in communication with the smartcard's electronic chip.

The open card holder system allows for existing card reader connectors 910 which adhere to ISO 7816 contact pad dimensions to be used.

Referring now to FIG. 30, in one variation, the card holder 904 includes magnetically attractable component 909 and the smartcard reader 906 or holder connector 912 includes a magnet 911, or vice versa. The bevel edges 934 of the opening, see FIG. 34, assist in aligning the card reader contacts 910 to with the smartcard contact pads 908 in both the lateral and axial direction.

In another variation, FIG. 31, the card reader and the card holder may be mechanically attached to each other with a hinge mechanism 960 on the carder reader. The mechanism may include one or more hinge type devices 960 and/or a spring loaded clip or flap 915, working separately or in combination. Alternatively, the mechanism may include protrusion and detent 934 and 935 on the card holder and on the card reader, so that the detent receives the protrusion when the card holder is fully received into the card reader. Additionally, it is understood that a similar mechanical attachment mechanism may be used in conjunction with any of the embodiments described herein. FIG. 31 also shows a computer connector 932 which allows the connection to computer communication port and provides an additional communication port to leaving a spare port. Connector 932 has a USB male plug 950 to insert into a USB female socket in computer 901, a USB splitter 942 that supports both cable 902 and an additional USB female socket on the exposed end of connector 932.

In another variation, shown in FIG. 32, the card holder 904 has protective flaps 916 with spring hinges 960 that provide the necessary force to hold the card reader 968 to the card holder 904 such that the reader contacts 910 connect to the smartcard contacts 908. The flaps 916 can also: assist in guiding and aligning the card reader 968 on the card holder; and, when closed, provide smartcard contact pads 908 with protection from debris and damage. FIG. 32 also shows that the smartcard reader IC 924 can alternatively be located in the computer connector 931 at the end of communications cable 902 nearer to computer 901, instead of on the card holder connector end 968. This may result in a different data communication protocol being used in cable 902, and may require a physically different cable. Computer connector 931 may instead, or in addition, be a connector 932 that has an auxiliary data connector such as an additional USB port. FIG. 32 also shows that the card holder connector end 968 may also feature a position switch, which is actuated by actuator 918 when the reader is connected to the card holder. This switch can be used for the "card in position" input, sometimes referred to as "PRESN", of a standard smartcard reader IC, or for any similar system that verifies the physical presence of a smartcard in the reader. The flaps 960 are configured to pivot between a first position (see FIG. 9) in which the flaps protect the smartcard contacts 908 or antenna 957 and a second position (see FIGS. 10 and 32) in which the flaps allow physical access to the smartcard contacts or wireless access to the smartcard antenna 957.

As shown in FIG. 33, which is a further variation of FIG. 32, for a contactless card reader 903 the position flaps hold the card reader 903 in place with the reader's antenna 969 in the interrogation zone of the smartcard's antenna 957. The effective ranges of the two antennae can then be very short, allowing very low transmission power. When closed, the protective flaps 916 can provide RFID protection when the card reader 903 is not connected, preventing unauthorized wireless access to card 905. The protective flaps 916 can also be easily be manipulated by the user to expose the smartcard antenna 957 when being used for an area access reader 965, see FIG. 21.

FIG. 34 shows a perspective view of an example of the opening in card holder 904 for access to card contacts 908. In this example, the "alignment" feature 934 is formed by smoothly beveled edges of the opening, so that the mating card reader or holder connector can be slipped into and out of place even with a motion that is more nearly parallel to the surface of the holder 904 than to the perpendicular axis.

As already discussed, any of the holder 904 or 956, the reader 968, and the connector 931 may contain a card reader chip 924 or other electronic circuitry configured to convert power and data signals between the protocol used by the smart card 905 and the USB protocol used at plug 950, or otherwise to at least one of encode and decode data transmitted between the smartcard electronic chip and the external device, the electronic circuitry being located in at least one of the card reader, the card holder, and the communication cable.

If the reader IC is in holder 904, then the holder 904 is in a sense a reader too, and the detachable reader 903, 906, 968 may then be a dumber device. However, the holder 904 is still also a card holder design so the user can maintain possession of the smart card.

Figure 70:
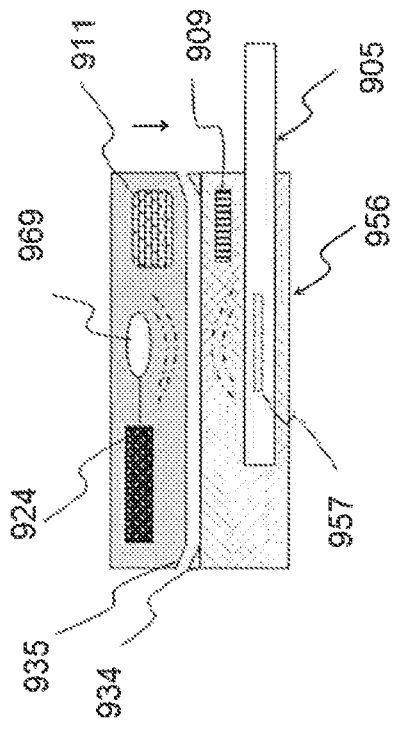
FIG. 70 is a view similar to FIG. 66 showing a magnetic card reader that has magnetic contact pins which connect to ferro-magnetic material contact pads of a smartcard or smartcard holder and is self-aligning.

FIGS. 35 through 44 illustrate variations of a card holder 956 used with various card reader types, and contact card type 905, and connection and alignment methods. The card holder 956 is distinguished by having a set of internal contacts 919 (see FIGS. 39 to 43) that connect to a smartcard's contacts 908 when the card is fully inserted. The internal contacts 919 are connected to a set of external contacts 925 that are accessible from the outside of the card holder's holding space, which is typically a slot to receive a flat card. In other words, the holder 956 has second electrical contacts 919 on an inner surface of the slot configured to communicate with the smartcard's contacts 908 and therefore with the smartcard's IC, third electrical contacts 925 on an outer surface of the card holder, and electrical wiring connecting the second electrical contacts to the third electrical contacts. When the card reader is aligned with the card holder, the first electrical contacts of the card reader communicate with the third electrical contacts of the card holder. Those features allow for smartcard readers 968, 906, etc., or card holder connectors 951, 952, etc. to have various electrical connection designs or types, for example, as shown in FIG. 66, FIG. 67, and FIG. 70. FIGS. 35 through 39 show basic features of smartcard holder 956 and an associated smartcard reader 968. The basic card holder 956 feature is a straight through electrical connection from internal contacts 919 to the external contacts 925, see FIG. 82. This feature can have an additional capability to provide security by activating the "PRESN" contact on the smartcard reader's IC 924. An internal switch 917 to detect when a card is inserted can be communicated to the card reader either by providing a status contacts or relay contacts 922, see FIGS. 87 and 88, or by actuating an actuator 918, see FIGS. 85 and 86. Alternatively a position switch may be a reed type switch and located in the card reader 968 and when the reader is in position on the holder and magnetic field is such that the switch is actuated, see FIG. 40.

In other words, the card holder has a slot configured to receive at least a portion of the smartcard containing the electronic chip, second electrical contacts on an inner surface of the slot configured to communicate with the electronic chip, third electrical contacts on an outer surface of the card holder, and electrical wiring connecting the third electrical contacts to the second electrical contacts, the holder further having a first alignment device. The card reader is removably connectable to the card holder and has first electrical contacts configured to communicate with the third electrical contacts on the card holder and a second alignment device configured to cooperate with the first alignment device on the card holder to align the first and third electrical contacts. The communication cable is connected at one end to the card reader and is in electrical communication with the electrical contacts of the card reader for transmitting data between the smartcard electronic chip and an external device.

The card holder may further include a proximity switch, which in embodiments shown in the drawings is a normally open proximity switch, located in the electrical wiring between the second and third electrical contacts, and the card reader further comprising a proximity switch actuator, such that when the first and third electrical contacts are aligned, the proximity switch actuator causes the proximity switch to change state to complete (or break) the connection between the second and third electrical contacts. In one variation, the proximity switch includes a reed switch and the proximity switch actuator includes a magnet. In another variation, the proximity switch includes a mechanical limit switch and the proximity switch actuator includes a pin configured to actuate the mechanical limit switch. The card reader may further include a slot for receiving at least a portion of the card holder including the third electrical contacts.

In one variation, the card holder further includes a normally open proximity switch located in the electrical wiring between the first and second electrical contacts, and the card reader further includes a proximity switch actuator, such that when the first and third electrical contacts are aligned, the proximity switch actuator causes the proximity switch to close to complete the connection between the first and second electrical contacts. The proximity switch may include a reed switch and the proximity switch actuator comprises a magnet. Alternatively, the proximity switch may include a mechanical limit switch and the proximity switch actuator comprises a pin configured to actuate the mechanical limit switch. Additionally the card holder 956 will feature alignment guides 934 so as to assist aligning the reader contacts 910 with the holder outer contacts 925 and the holder inner contacts 919 with the smartcard contacts 908 and also to allow either the card 905 or the card reader 968, as the case may be, to be removed easily by sliding it.

The system may further include a pushbutton switch configured to enable or disable communication between the smartcard 905 and the external device 901. Additionally, the system may further include electronic circuitry configured to at least one of encode and decode data transmitted between the smartcard electronic chip and the external device. The electronic circuitry is located in at least one of the card holder, the card reader, and the communication cable.

Figure 35:
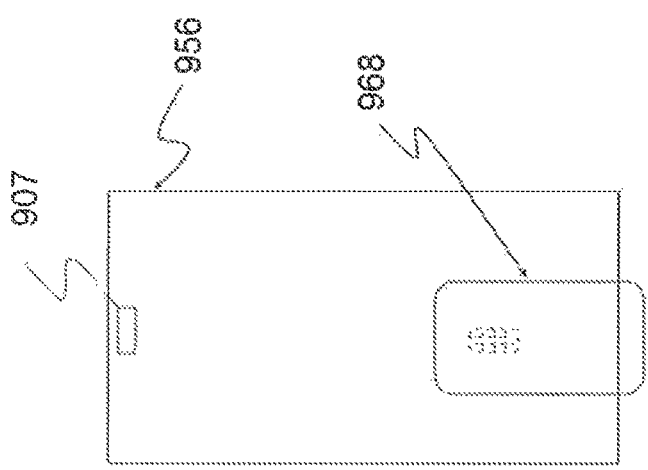
FIG. 35 is a top view of a card reader and card holder with indirect connection to smartcard contacts.

FIG. 40 through FIG. 44 shows various cross sectional views card reader or holder connector connections to card holder 968 as shown in FIG. 35.

Figure 40:
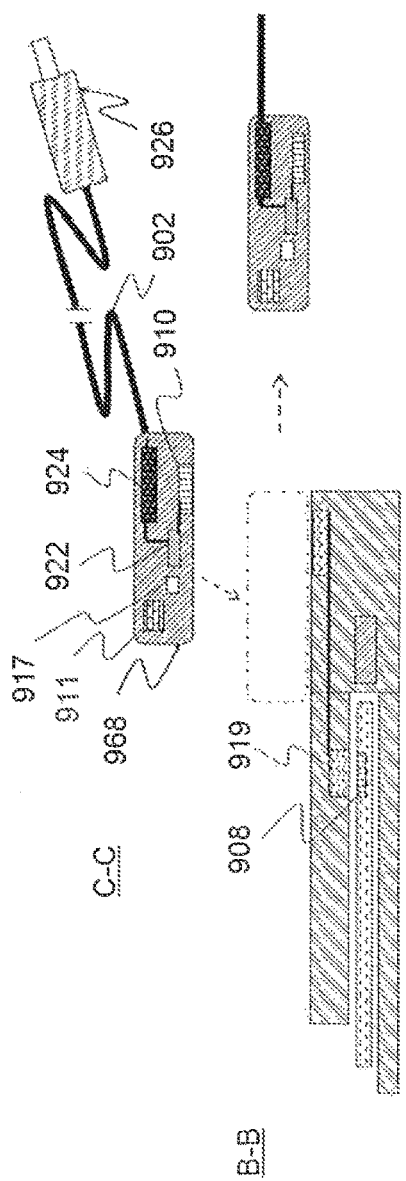
FIG. 40 is a section along the line B-B of FIG. 36 and the line C-C of FIG. 37, showing the card reader of FIG. 37 being applied to and removed from the card holder of FIG. 36.

In one variation, FIG. 40, one of the first and second alignment devices 934, 966 on the card holder 956 includes magnetically attractable component 909 and the other of the first and second alignment devices 935, 967 on the smartcard reader 968 or holder connector 912 includes a magnet 911, or vice versa. Either the card reader 968 or the card holder 956 may have an opening or recess with bevel edges, see FIGS. 59 through 63, that assist in aligning the card reader contacts 910 with the card holder contacts 925 in both the lateral and axial direction. This variation of the card reader 956 has a reed type position switch 917 arranged so that when the reader 968 is placed in contact with the holder 956 the switch activates a contact 922 that can be used to control the "card in position" input PRESN on the smartcard reader IC 924.

Figure 41:
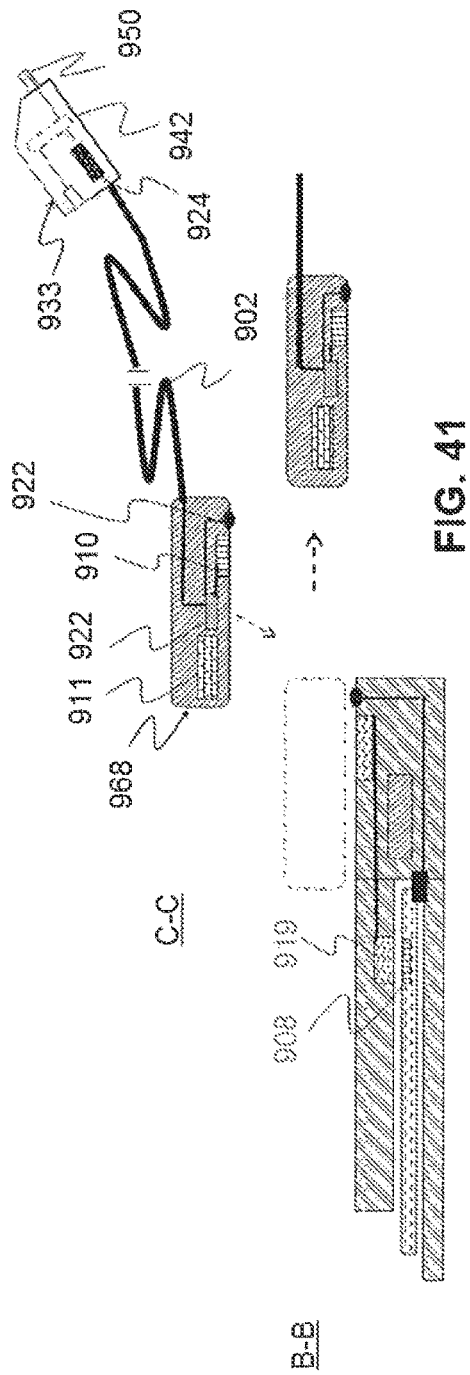
FIGS. 41 through 43 are views similar to FIG. 40 showing alternative forms of the device.

In another variation, FIG. 41, the card in position switch 917 is located internally of the card holding space with contacts 922 on the surface of the card holder 956 and the reader 968. When card reader 968 is connected to card holder 956 the holder's contacts 922 contact the reader's contacts 922 to communication the status of the card 905 in the holder to the smartcard reader IC 924. Thus, the PRESN input of the smartcard reader IC 924 is set to TRUE only when there is a card 905 correctly inserted into card holder 956, and card reader 968 is correctly positioned on card holder 956. The computer connector 933 houses the smartcard reader IC 924 and also has second communication through USB splitter 942 to allow other data access to the computer when the reader is attached.

Figure 42:
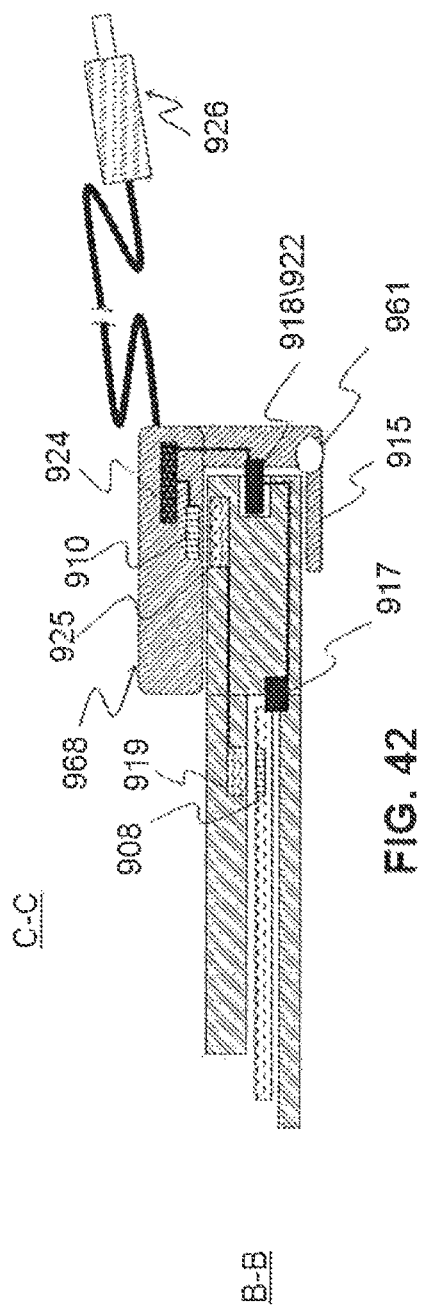

In a further variation, FIG. 42, the card in position switch 917 is located internally of the card holding space with contacts 922 on the surface of the card holder. When card reader 968 is connected to card holder 956 the holder's contacts 922 contact the reader's contacts 922 which are in turn connected to card reader actuator 918 which in wired in series to communicate the status of the card 905 in the holder 956 and the status of the card reader 968 relative to the holder 956 to the smartcard reader IC 924. The card reader 968 is connected to the card holder 956 by a flap 915 with sprung hinges 961.

Figure 43:
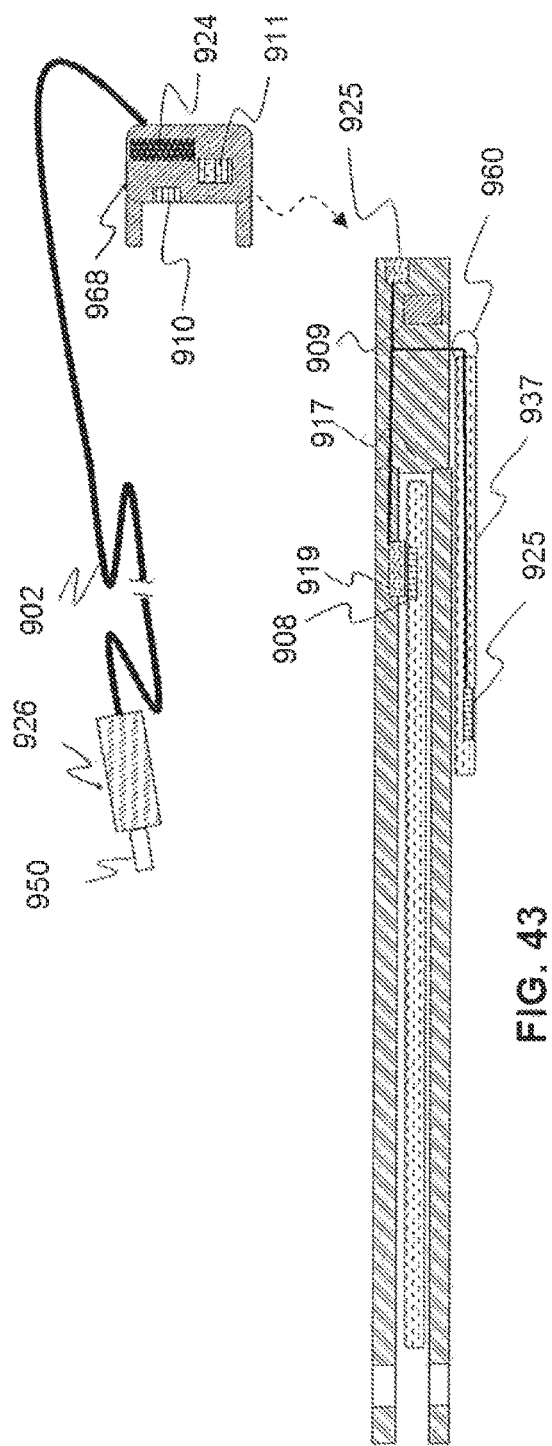
Figure 44:
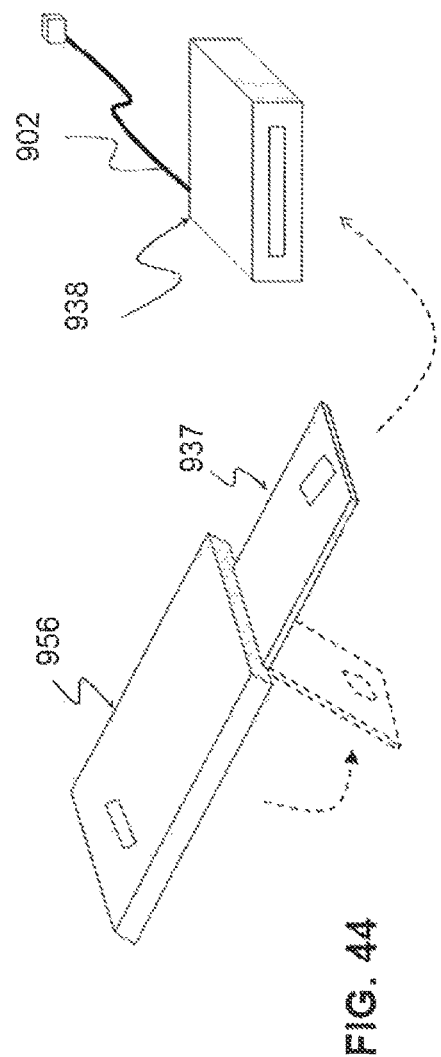
FIG. 44 shows a card holder with a replication flap for use in a standard reader.

In one variation, FIG. 43, the card holder external contacts 925 can be oriented in a format other than standard smartcard contact pad arrangement, in this case on the bottom of the card holder. The card reader contacts 910 and card holder external contacts 925 could, for example, be as shown in FIG. 67 or FIG. 70. Another addition to the card holder may be a "replication flap" 937, which is a member of the same shape and size as one end of a standard smartcard, and having a set of external contacts 925 mimicking the contacts on a standard smartcard, so that it may be used in a standard card reader 938. In FIG. 43, the replication flap 937 is provided with a spring-loaded hinge 960, so that it folds flat against the underside of card holder 956 when not in use. The electrical contacts 925 on the replication flap 937 are wired within the card holder 956 to the internal contacts 919 in parallel with any other set of holder external contacts 925. FIG. 44 shows a perspective view of the replication flap 937 of FIG. 43 being inserted into a card reader 938.

FIGS. 45 and 46 show two standard commercially available desktop style smartcard readers. FIG. 45 shows a smartcard 905 being inserted into a vertical style smartcard reader 938. The card reader 938 has a holding space for the smartcard 905 that only allows for the smartcard 905 to be inserted and removed vertically, along its long axis. Furthermore the standard card reader 938 is designed to accept only smartcards that meet the ISO 7816/CR 80 standard, basically a card the shape and size of a standard credit card. If the user carries the smart card in a holder, then it must be removed from the holder to be inserted into the card reader 938. If the user has the smart card attached to an ID reel 927, then excessive lateral or fore-and-aft forces on the card can result in damage. FIG. 46 shows a conventional horizontal card reader equivalent to the vertical card reader 938 shown in FIG. 45. With the reader shown in FIG. 46, the card must be inserted and removed horizontally, in one specific direction, as shown by the arrow. If a force is applied, for example, by the user's lanyard, in a direction having a vertical component, or in any horizontal direction other than the one shown, then damage can result.

FIG. 47 shows a smartcard 905 being inserted into a vertical style smartcard reader 946 as shown in FIG. 2. The smartcard reader 946 has a flexible holding space which allows for the smartcard 905 to be inserted and removed with movement in any or all three axes, as shown by the arrows. At least the front wall of the slot is mounted on a hinge 960, allowing the walls to spread apart to accommodate fore-and-aft movement. The front wall or face of the card reader 946 is replaced by a protective flap 916 which operates on a spring type hinge 960. The protective flap 916 provides the necessary pressure to apply the smartcard contacts 908 against the card reader contacts 910 for communicative connection and yet opens sufficiently to allow the smartcard to be inserted and removed in the vertical direction.

The side walls of the slot in card reader 938, which align the smartcard contacts 908 with the reader contacts 910 in the lateral direction, are omitted and replaced with alignment guides 935. FIG. 48 shows the smartcard card 905 aligned in the card reader by the guides 935 and lateral movement into and out of the card reader 946. The alignment guides 935 align the card when the card is fully inserted, but allow it to be tipped sideways or removed diagonally up and sideways.

The base of the card reader 946 aligns the smartcard contacts 908 with the card reader contacts 910 in the axial direction just as is the case with the standard card reader 938. Alternatively the alignment guides 935 can provide alignment in the axial direction as well. The outside edges of the smartcard card 905 effectively are the second alignment guides 934 that cooperate with alignment guides 935. However, other surface features may be added if it is not necessary for card 905 to comply strictly with a conventional credit card shape.

FIG. 49 shows smartcard 905 inserted in the card reader 946 and the movement of the protective flap 916. The spring type hinge 960 can have various features which allow the protective flap to remain in the open position when the smartcard 905 is removed from the card reader 946 but when the smartcard 905 is inserted the protective flap 916 provides closing pressure necessary to make communicative contact between smartcard contacts 908 and card reader contacts 910.

FIG. 50 shows a smartcard 954 being inserted into a horizontal style smartcard reader 946. The smartcard reader 946 has a magnetic holding space which allows for the smartcard 954 to be inserted and removed in all three axes. The side wall supports of the card reader 938 which align the smartcard contacts 908 with the reader contacts 910 in the lateral direction are replaced with alignment guides 935. As is best shown in FIG. 52, the alignment guides 935 are slightly closer together than the width of the card 954. Axial positioning of the smartcard 954 is thus assured by the rounded corners of the card seating on the alignment guides 935. Alternatively, a central end-stop can be provided on the base of reader 946. The outside edges of the smartcard card 905 effectively are the second alignment guides 934, however other surface features may be added. As shown in FIG. 50, a magnet 911 in the reader 946 and a ferromagnetic element 910 in the smartcard 954 may also be provided. The attraction between the magnetic elements 910, 911 both provides the necessary pressure to hold the card 954 in contact with the reader 946, and maintain electrical contact between the smartcard contacts 908 and the card reader contacts 910 for communicative connection, and assists in aligning the smartcard correctly.

FIG. 51 shows the smartcard card 954 aligned in the card reader by the guides 935 and illustrates vertical and rotational movement into and out of the card reader 946.

FIG. 52 shows the smartcard card 954 aligned in the card reader by the guides 935 and illustrates lateral movement and rotation into and out of the card reader 946. The card reader 946 can be design to accept various types or even multiple types of smartcards and holders.

FIGS. 53 and 54 show perspective views of the various smartcards and smartcard with holders connected to an ID reel 927 being attached to card readers 946 shown in FIG. 47 and FIG. 50.

FIG. 55 is a perspective view of a smartcard reader 906 being connected to or removed from a smartcard holder 954 worn on a lanyard 927.

FIG. 56 illustrates lateral movement of a smartcard reader 906 in relation to the smartcard holder 954. As in FIG. 47, the smartcard reader 906 has no side walls for lateral alignment of the smartcard contacts 908 (or holder contacts 925) with the card reader contacts 910. The smartcard holder has an alignment guide 935 which mates with the card holder alignment guide 934, which when connected align the smartcard contacts 908 with the card reader contacts 910 in both the lateral and axial direction, while allowing insertion or removal in an oblique direction or with rotation.

FIG. 57 shows a side view of the smartcard reader 906 connected to the smartcard holder 954. A protective flap 916 and spring type hinge 960 apply sufficient pressure to the bottom of the card holder 954 so that the smartcard contacts 908 and smartcard reader contacts 910 are in communicative contact and sufficient pressure to maintain connection to the holder during normal use, while allowing the reader 906 to freely break away as required.

FIG. 58 shows a side view of the smartcard reader 906 and smartcard holder 954 being connected or removed in the axial and vertical direction. The smartcard reader 906 and smartcard holder 954 have second alignment features 967 and 966. The second alignment features have smooth surfaces and rounded or angled designs such that when they are in proper contact the smartcard reader can pushed or slipped onto the smartcard holder.

FIG. 59 is a perspective view of a smartcard reader 968 being connected to or removed from a smartcard holder 956 worn on a belt clip 927.

FIG. 60 illustrates lateral movement of a smartcard reader 968 in relation to the smartcard holder 956. As in FIG. 52, the smartcard reader 968 has no side walls for lateral alignment of the smartcard holder contacts 925 with the card reader contacts 910. The smartcard holder has an alignment guide 935 which mates with an alignment guide 934 on the card holder, which when connected align the smartcard holder contacts 925 with the card reader contacts 910 in both the lateral and axial direction.

Figure 61:
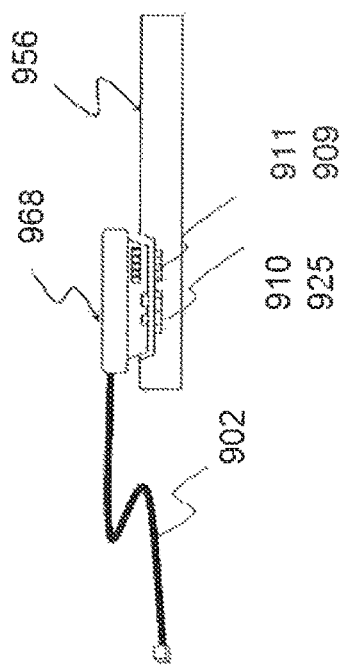
FIG. 61 is a side view of the card reader of FIG. 59 and smartcard/holder fully connected.

FIG. 61 shows a side view of the smartcard reader 968 of FIG. 60 connected to the smartcard holder 956. The card reader 968 has a magnetic device 911 that, when in proximity to a magnetic attractive device 909 on the card holder 956, applies sufficient pressure to the bottom of the card reader 956 so that the smartcard holder contacts 925 and smartcard reader contacts 910 are in communicative contact, and sufficient pressure to maintain connection to the holder during normal use, but allows them to freely break away as required.

Figure 62:
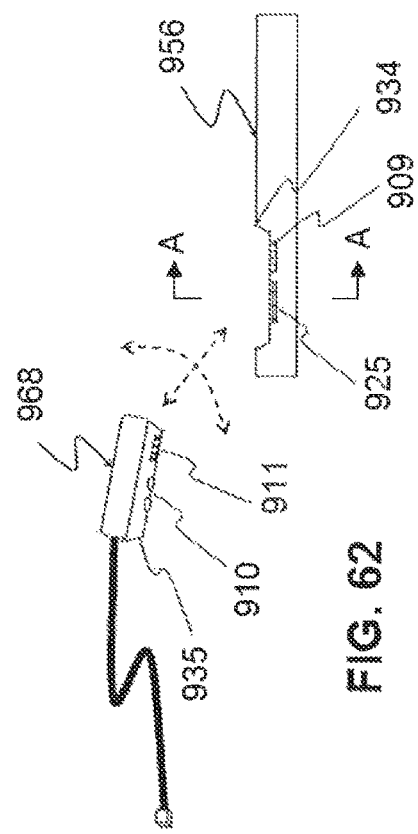
FIG. 62 is a side view of the card reader of FIG. 59 and smartcard/holder illustrating lateral and vertical connection movements.
Figure 63:
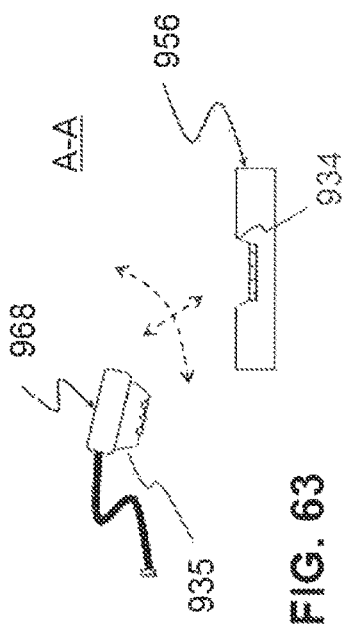
FIG. 63 is a section along the line A-A of FIG. 62.

FIG. 62 shows a side view of the smartcard reader 968 and smartcard holder 956 being connected or removed in the axial and vertical direction. FIG. 63 shows an end view, in section along line A-A of FIG. 62, showing the smartcard reader 968 and smartcard holder 956 being connected or removed in the lateral and vertical direction with possible rotation, as illustrated by the arrows. The smartcard reader 968 and smartcard holder 956 alignment features 934 and 935 have smooth surface and angled design is such that the smartcard reader can pushed or slipped onto or off of the smartcard holder and yet also align the contacts.

FIGS. 64 and 65 show examples of the interface between smartcard unit and computer unit connectivity. FIG. 64 shows a smartcard 905 with contact pads and a smartcard reader 906, 968, etc., with contact sensors 910 being connected so that a computer 901 can communicate with smartcard IC 964. The smartcard contacts 908 and the smartcard reader contacts 910 must be aligned properly and make contact with the correct corresponding sensor. FIG. 65 shows a contactless smartcard 958 and a smartcard reader 903 being connected so that a computer 901 can communicate with the smartcard IC 964. The smartcard 958 must be held in an appropriate orientation and distance from the smartcard reader 903 so that the reader's antenna 969 can "interrogate" the smartcard's antenna 957 and thereby communicate with the smartcard IC 964.

FIG. 66 through FIG. 73 show, in similar cross-sectional views, various methods of interface connectivity between the smartcard unit and the computer unit.

FIG. 66 shows a smartcard reader 906 connecting to smartcard holder 956 with a smartcard 905, the smartcard contacts 908 are replicated on the surface of the card by transfer connections from card holder internal sensors 919 to the card holder external contact pads 925. The smartcard reader 906 contacts 910 then connect to the card holder external contacts 925 to communicate with the smartcard. In order to hold the card reader 906 to the card holder 956 with sufficient force to make an electrical connection as well as maintain the card reader in position during normal use, the spring type hinge 960 applies a clamping pressure to protective flap 916, which results in the smartcard reader contacts 910 sandwiching the card holder 956.

FIG. 67 shows the a variation of FIG. 66 where the card holder external contacts 925 and the flap 916 (which in this case does not need to be hinged or sprung) are a combination unit and seat in a cavity on the card holder 956. When the card reader 906 is connected, the smartcard holder contacts 925 which are also provided with hinge type or other springs, apply sufficient pressure to the card reader contacts 910 to press the backside of the contacts against the wall of the card holder cavity and thus providing a clamping pressure to the card reader to maintain contact.

Figure 68:
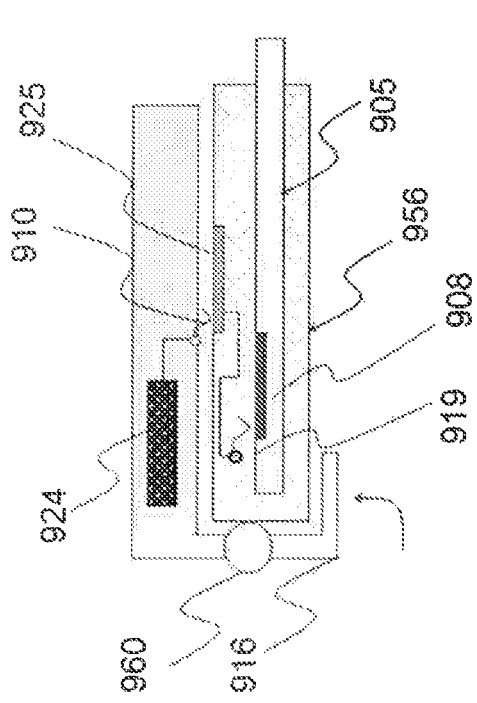
FIG. 68 is a view similar to FIG. 66 showing a card reader with a magnet and a smartcard or holder that has a strategically placed ferro-magnetic material.

FIG. 68 shows a variation of FIG. 66, in which the sufficient force to make an electrical connection as well as maintain the card reader in position during normal use is achieved by the magnetic attraction between a magnet or other magnetic device 911 located in the card reader 906 and a ferromagnetic element or other magnetic attractive device 909 located in the card holder 956. The card holder 956 alignment guides 934, in the form of a recess with beveled walls, and the card reader 906 alignment guides 935, in the form of a prominence with beveled sides, properly position the card reader contacts 910 with the card holder contacts 925 for communication.

FIG. 69 shows a smartcard reader 903 connecting to smartcard holder 904 with a non-contact smartcard 905. The smartcard reader antenna 969 is held in a correct distance and orientation to be in the interrogation zone of the smartcard antenna 957. The card holder 904 has protective flaps 916 with spring type hinges 960. Springs 960 and protective flaps 916 apply sufficient pressure to the card reader 903 to hold in proper position for communicative connection to the smartcard and to hold it in place during normal use. The protective flaps can also be constructed of a RFID blocking material such that the smartcard cannot be read when the protective flap are lying flat on the card holder, as shown in FIG. 9.

FIG. 70 shows a variation of FIG. 68, in which the card reader 906 has a cup-shaped metal magnet 911 that is the magnetic device 911, the card reader contact 910, and the card reader alignment device 934. The card holder 956 has a matching ferromagnetic metal dome that is the magnetic attractive device 909, the card holder external contact 925, and the card holder alignment device 935. The card reader and card holder contacts both align and provide sufficient force to make an electrical connection as well as maintain the card reader in position during normal use.

Figure 71:
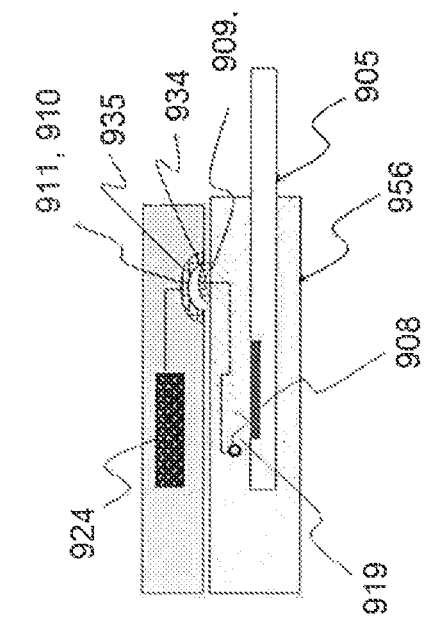
FIG. 71 is a view similar to FIG. 66 showing a contactless smartcard reader with a magnet connected to a smartcard holder with a ferrous-magnetic material.

FIG. 71 is a variation of FIG. 68 and FIG. 69, in which the card reader 903 magnetic device 911 and the card holder 956 magnetically attractive device 909 hold the reader 903 and the smartcard 905 together with sufficient force for the card reader to communicate with the smartcard 905. Separate beveled card reader alignment guides 935 and card holder alignment guides 934 keep the card reader 903 in position on the card holder 904 such that the card reader antenna 969 can communicate with the smartcard antenna 957.

FIG. 72 is a variation of FIG. 66 and FIG. 69 where the card holder 956 has a pair of indirectly sprung holders 962 that have grooves gripping ridges on the sides of the card reader 906. As shown in FIG. 72, each holder 962 may be in upper and lower pieces, with the upper piece separately movable. As shown in FIGS. 11 and 12, the two holders 962 may be a pair of shutters that close to protect underlying contact pads or to shield an RFID antenna when the card reader 906 is not in position. The springs 961 driving the holders 962 apply an indirect sufficient force to make an electrical connection as well as maintain the card reader in position during normal use.

Figure 73:
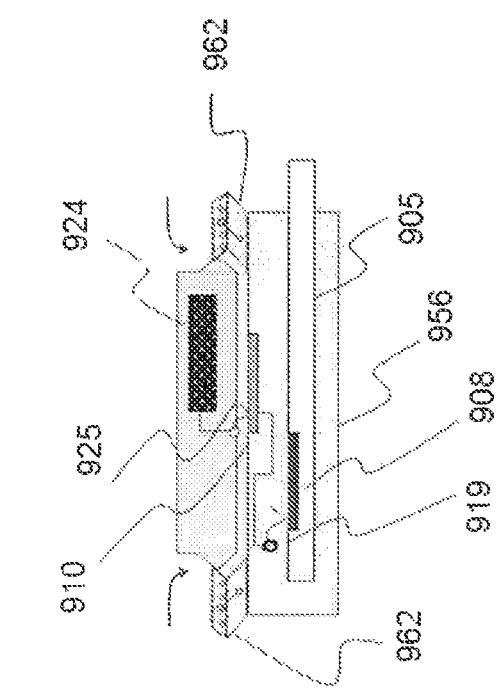
FIG. 73 is a view similar to FIG. 68 showing a variation of the card reader of FIG. 68 where the card contacts are sealed behind a conductive material.

FIG. 73 shows a version of FIG. 68 in which the spring contacts 910 on the reader are covered with a flexible membrane that is conductive or has conductive patches. That enables the card reader to have an entirely smooth exterior, where all surfaces can be kept clean for use in sterile or other clean environments.

Figure 74:
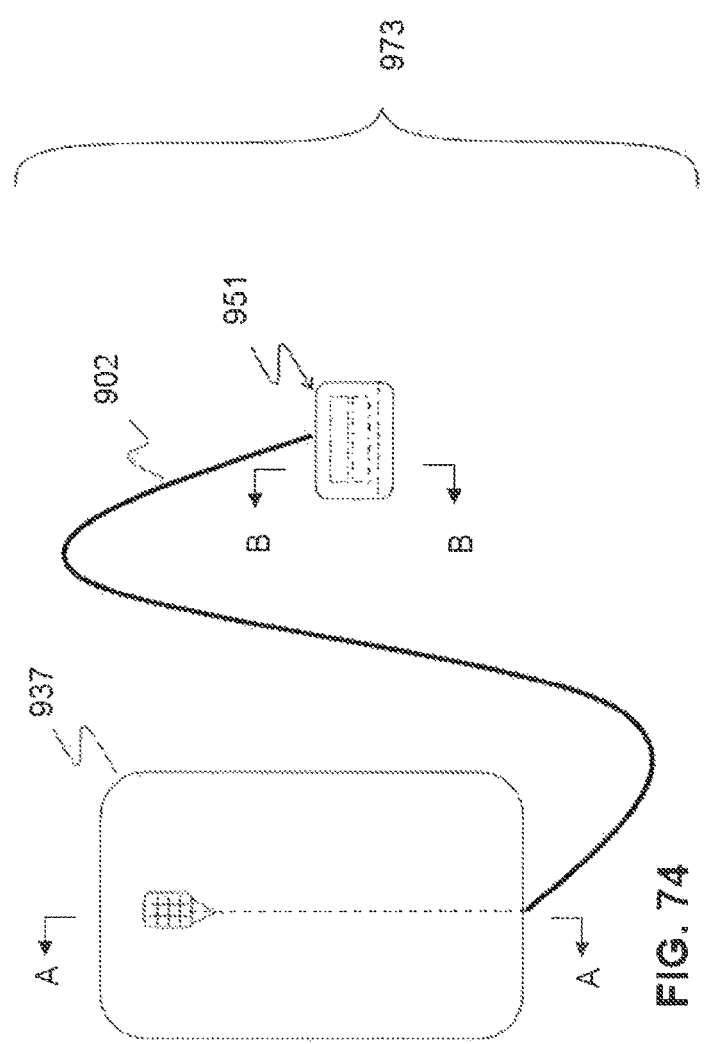
FIG. 74 is a top view of a card reader with a card replication tether.
Figure 75:
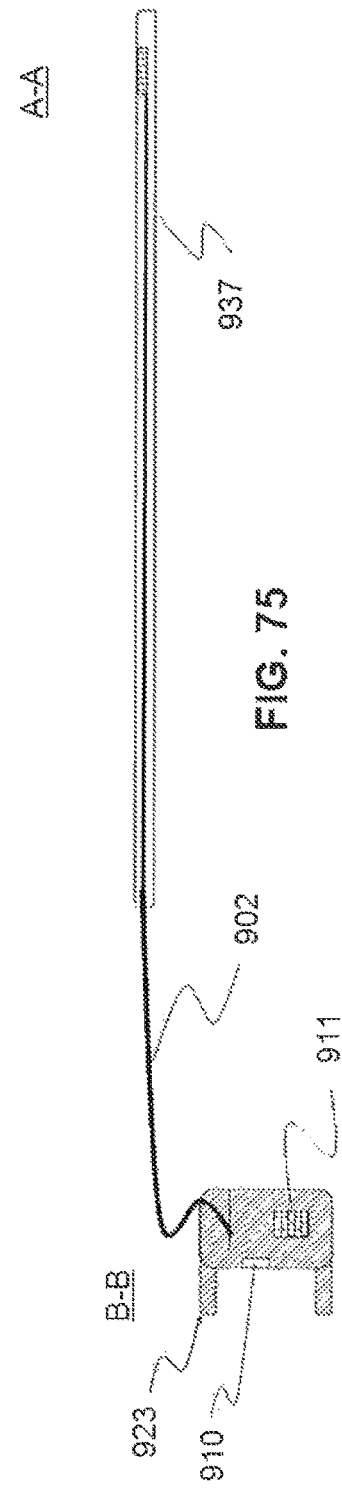
FIG. 75 is a section along the lines A-A and B-B of FIG. 74.

FIG. 74 shows a card reader sub-assembly 973 comprising a replication card 937 having contacts and a size and shape substantially matching the contacts and the size and shape of a conventional smartcard, to enable it to be received into a standard smartcard reader 938. The replication card 937 is connected to a card holder connector 951 by a communication cable 902. The card holder connector 951 has contacts 910 to make communicative contact with the card holder external contacts 925 or card contacts 908. When the replication card 937 is inserted into a card reader 938 and the card holder connector 951 is connected to a card holder 956 with a smartcard 905, the contacts on replication card 937 replicate the contacts on the smartcard 905 just as if the smartcard 905 were inserted in the reader 938. FIG. 75 shows a side view in section along the lines A-A and B-B in FIG. 74.

FIG. 76 shows a card reader sub-assembly 930 that is a variation of FIG. 74 where the replication card 937 is replaced with a tether connector 929 that can be connected to a smartcard reader 906. The device 930 enables a user to provide a connection point for a smartcard reader 906 when, for example, the user is wearing protective clothing that does not allow for their smartcard holder to be exposed. As shown in FIG. 77, the user wearing a protective suit has the smart card 905 in its holder 904 connected to the connector 951 of the device 930, all inside the protective suit. Only the connection cable 902 is passed through the protective suit to the tether connector 929 on the outside. The tether connector 929 can then be connected to a smartcard reader 906 attached to computer 901, to establish communication between the computer 901 and the smartcard 905 without exposing the smartcard.

FIG. 78 shows a perspective detail view of a card holder 956 that has an internal set of contacts 919 which connect to the smartcard contacts 908 on smartcard 905 and transfer those signals to a set of external contacts 925 on the external surface of the holder 956 where they can be read by a card reader 906, etc. FIG. 78 also shows various complementary optional features. A proximity or limit switch 917 can be located in the card receiving space of the card holder 956 that actuates when the smartcard 905 is properly inserted into the holder 956. In this case the smartcard is acting as the limit switch actuator 918. The limit switch can be connected to a set of contacts 922 which can be used to initiate, permit, facilitate, or break communication between the smartcard IC and the smartcard reader IC by various methods depending on various criteria, most notably the computer 901 operating system and software. If the system configuration is such that it can use the smartcard reader IC PRESN signal or similar, then a simple pair of contacts 922 would be used. If the system configuration continuously polls the smartcard contacts 908, then multiple sets relay of contacts 922 may be desired. A pushbutton may be inserted into the circuit to "manually" create a signal indicating the card has been removed, which in many systems automatically clears and resets the smartcard reader IC buffer. FIG. 79 shows a sectional side view of the card holder 956 shown in FIG. 78.

Figure 80:
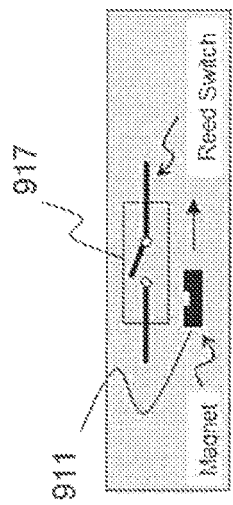
FIG. 80 is a schematic illustrating operation of a reed switch in the card holder of FIG. 78.
Figure 81:
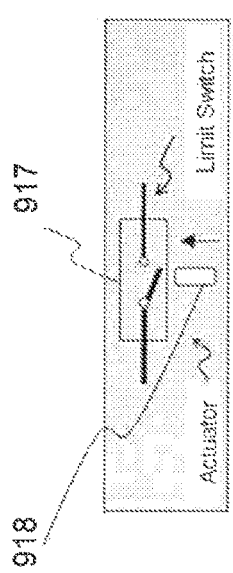
FIG. 81 is a schematic illustrating operation of a mechanical limit switch in the card holder of FIG. 78.

FIG. 80 shows schematically a physical actuator 918 that when moved into position closes the switch 917 contact. FIG. 81 shows a variation of FIG. 80 where the switch 917 is a reed type switch and is actuated by a magnetic field when a magnetic device 911 moves into a correct position.

Figure 82:
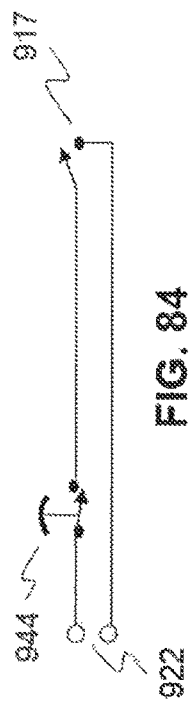
FIG. 82 is a schematic showing the card reader pins transposed to surface contacts on a card holder.
Figure 83:
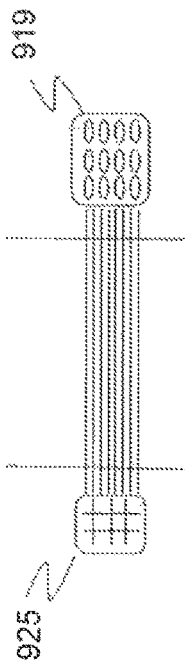
FIG. 83 shows a variation of FIG. 82 where some or all of the contact circuits can have an interposing relay or contacts.

FIG. 82 shows an example of the circuit diagram between card holder internal contacts 919 and the card holder external contacts 925 where the connection is a simple straight-through or point to point connection between each individual contact 919 and a matching contact 925. FIG. 83 shows the circuit of FIG. 1 with a set of contacts of a relay between the contacts 919 and 925. Some or all of the circuit connections between 919 and 925 are open, not communicating, when the card-in-position switch 917 is not closed.

Figure 84:
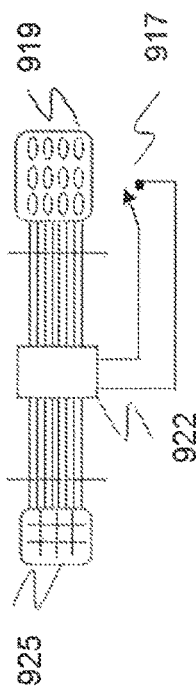
FIG. 84 shows a position switch and pushbutton connected in series to a pair of contacts.

FIG. 84 shows a simple circuit with contacts 922 connected when the limit switch 917 is closed. Optionally, a normally closed contact pushbutton 944 may be connected in series to open the contacts 922 manually or on demand. The switches 917 and 944 may be reversed to form a normally closed circuit. The closing, or opening, of the contacts 922 can be used to drive a card-in-position input of a card reader IC 924.

Figure 85:
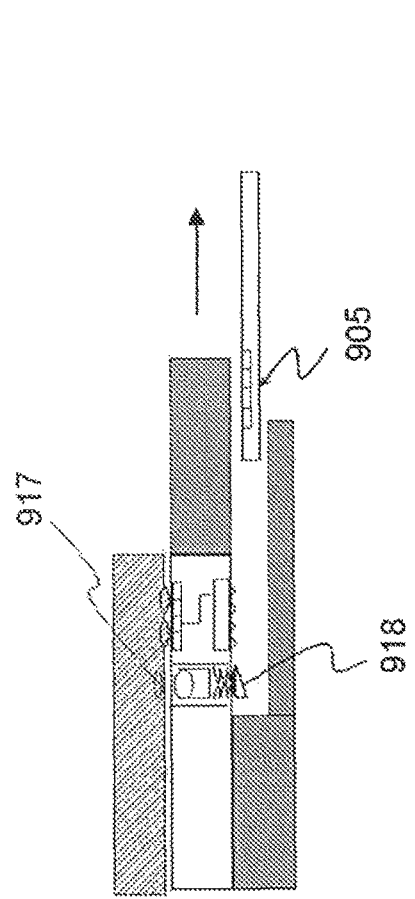
FIG. 85 is a section through a card holder, showing a card actuating a position switch.
Figure 86:
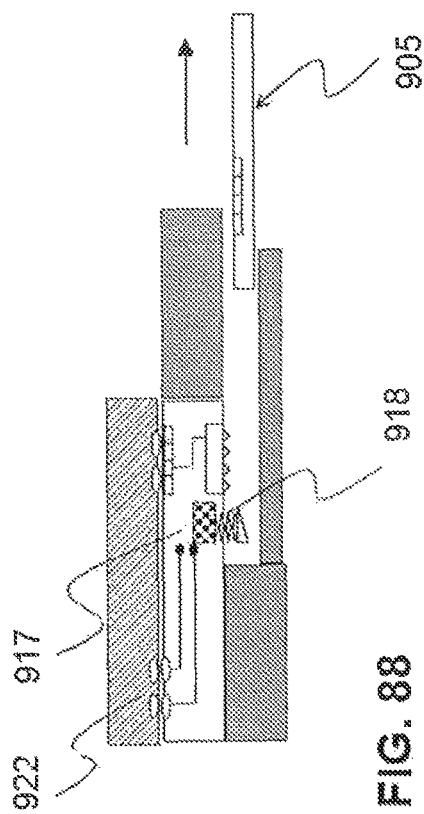
FIG. 86 is a view similar to FIG. 85, showing the smartcard removed and the position switch released.

FIGS. 85 and 86 show the operation of a position switch 917 located on the card reader 906. When the smartcard 905 is properly fully inserted in the card holder 956 card holding space, as shown in FIG. 85, the smartcard forces the actuator 918 up, extending beyond or above the surface of the card holder 956. When the smartcard reader 906 is also properly connected, so that contacts 910 and 925 are aligned and contacting each other, the card reader position switch or contact 917 is aligned with the card holder actuator 918 and is actuated, remaining closed while the smartcard remains inside the card holder. If the smartcard 905 is removed as shown in FIG. 86, the card holder actuator 918 retracts back below the surface of the card holder 956, breaks contact with the switch or contact 917, and the card reader 906 position switch 917 is deactivated.

Figure 87:
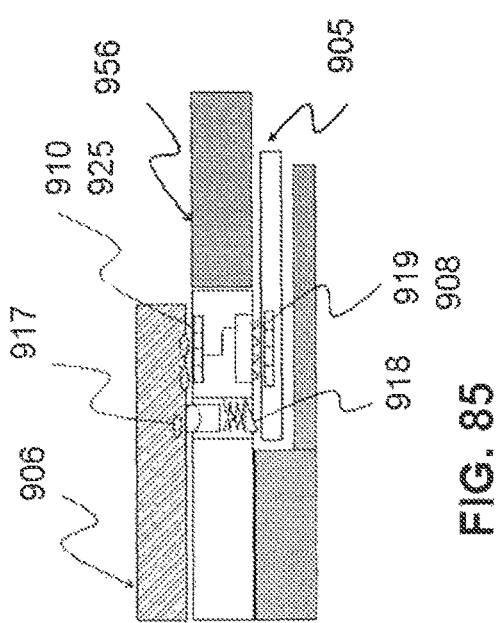
FIG. 87 and FIG. 88 are views similar to FIG. 85 and FIG. 86, respectively, illustrating an alternative form of position switch.
Figure 88:
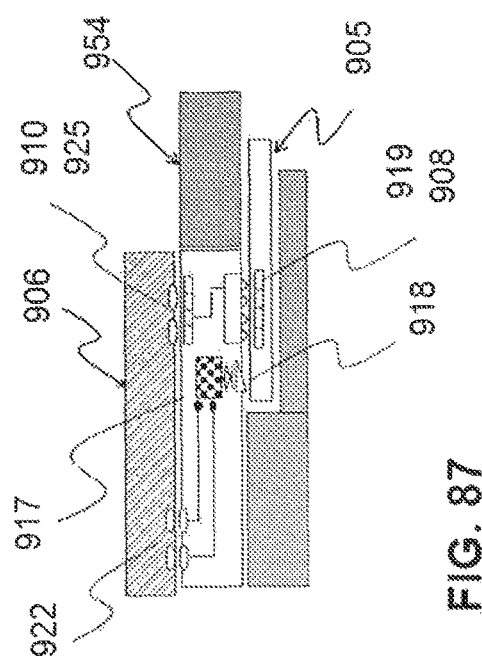

FIGS. 87 and 88 show a variation of FIGS. 85 and 86, in which the card holder actuator 918 closes a position switch 917 in the card holder which in turn close a pair of contacts 922 on the surface of the card holder that are in contact with mating contacts on the card reader. The card reader is able to detect a closed circuit between its two contacts 922 and recognize that the smartcard 905 is in position. When the smartcard 905 is removed from the card holding space the actuator 918 opens the limit switch 917 and therefore the contacts 922.

FIG. 89 shows a general circuit diagram of one embodiment of a connection between smartcard 905, smartcard holder 904, smartcard reader 906, and computer 901. The smartcard contacts 908 are connected to the smartcard reader contacts 910 which are read by the smartcard reader IC 924 which in turn interfaces with the computer 901 via the communication cable 902 and data connectors 950 and 949. In addition the smartcard holder contacts 922 for the smartcard position switch 917 provide status signal to smartcard reader IC through the smartcard reader contacts 922. FIG. 90 shows an example of the physical devices associated with circuit shown in FIG. 89. The circuits and devices to left side of the connection symbol <->||<-> in FIG. 89 and subsequent figures are part of the smartcard unit, the circuits and devices to the right of the part of the computer unit. The smartcard unit is distinguished by the fact it contains the smartcard and that it stays on the person of the user when the two units are separated in normal operation. The connection symbol indicates the interface between the computer unit and smartcard unit, the features of which interface are disclosed in this application. In particular, if the user moves away from computer 901 without first disconnecting, the system should in most embodiments disconnect without damage at the indicated division between the smartcard unit and the computer unit.

FIG. 91 and FIG. 92 show a variation of FIG. 89 and FIG. 90 where the card holder is a card holder 954, the smartcard reader is instead a smartcard holder connector 952, and the smartcard reader IC is located in the computer connector 931. Regardless of the variation from that of FIG. 89 and FIG. 90 the connection interface remains consistent where the circuits and devices to left side of the connection symbol <->||<-> are part of the smartcard unit, the circuits and devices to the right of the connection symbol are part of the computer unit.

FIG. 93 and FIG. 94 show yet another variation with the smartcard 958 being a contactless type, and the smartcard reader 903 also a contactless type and built into the computer 901 still follows the same concept where the circuits and devices to left side of the connection symbol <->||<-> are part of the smartcard unit, the circuits and devices to the right of the part of the computer unit.

In a card holder that provides RFID shielding for smartcards with standard antenna design, the antenna is essentially the size of the smartcard, so it is necessary to have a protective flap that exposes the entire smartcard. If the smartcard has an antenna with smaller diameter area, only a portion of the smartcard needs to be exposed in order for a card reader to be able to communicate with the smartcard IC. Alternatively, a smartcard can be designed with a reed type switch which disables the antenna when in the presence of a magnetic field.

Numerical listing of the reference numbers:

| Ref. | Name | Description |
|---|---|---|
| 901 | Computer | Computer, Cash Register Point of Sale, Control System, or other External Electronic Device |
| 902 | Data Cable | Data or communication cable. Cable types could be USB, Serial, straight-through or equivalent. |
| 903 | Reader Type 1 | Contactless card reader, used for computer and other electronic device access. No direct contact with card. The reader has an additional feature to assist holding the smartcard in place during use. |
| 904 | Card Holder Type 1 | Card holder for ISO 7810/7816 type smartcards 905 or contactless cards 958 in a credit card form, the card holder may have a lanyard attachment 907, opening for direct contact to smartcard contacts or to a card's antenna. |
| 905 | Card Type 1 | Smartcard Contact Type as defined by ISO 7810/7816, this card may also have antenna and is capable of being read by contactless reader, otherwise known as a Hybrid card |
| 906 | Reader Type 2 | Contact card reader, used for computer and other electronic device access, direct contact with smartcard contact pins of layout specified by ISO 7810/7816. The card reader has necessary feature to remain connected to the smartcard or holder while in use, and designed to allow the smartcard or holder to be attached vertically and\or laterally in addition to axially. |
| 907 | Lanyard or ID Reel Attachment | Card holder feature for securing lanyard, ID reel or equivalent device. |
| 908 | Smartcard Contacts | Smartcard Contact pins are contacts on the surface of a smartcard which allow communication with smartcard IC. Refer to ISO 7810/7816 |
| 909 | Ferrous Metal | Ferromagnetic metal or other material that attracts 911 |

-continued

| Ref. | Name | Description |
| --- | --- | --- |
| 910 | Card Reader Sensors | Card Holder Reader Contact Sensor Pins. These sensors connect smartcard reader integrated circuit 924 for communication with the smartcard IC via the smartcard contacts. |
| 911 | Magnetic Device | Magnet or other device that attracts 909 |
| 912 | Data Pins | Card holder & adaptor USB or equivalent connector pins/contacts |
| 913 | z Magnetic Pins | Magnetic USB connector pins/contacts |
| 914 | Mechanical Clip | Mechanical clip either alternate to magnet or protects reader contact pins |
| 915 | Card Reader Flap | Flap to assist with aligning, engaging the card reader with the smartcard or holder and/or to protect sensors 910 |
| 916 | Card Holder Flap | Flap to protect sensors 908 and or to assist with aligning, engaging the Card Reader with the Smartcard or Holder. The flaps may also be sliders and offer RFID protection. |
| 917 | Position Switch | Mechanical\Magnetic Position Switch |
| 918 | Position Switch Actuator | Mechanical\Magnetic Position Switch Actuator |
| 919 | Contact Pins Internal | Card Holder Internal Contact Pins Reader |
| 920 | Reader Type 4 | Card reader of Types 1, 2, or 3 transformed into standard desktop card reader |
| 921 | Card Holder Type 5 | Card Holder of Types 1, 2, or 3 with integrated card reader integrated circuit 924 |
| 922 | Position Switch Contacts-Relays | Mechanical\Magnetic Position Switch Contacts or Relay Contacts |
| 923 | z Magnetic Connector | Magnetic USB Connector |
| 924 | Smart Card Reader Circuitry | Smartcard Reader Integrated Circuit |
| 925 | Contact Pins External | External Badge Holder Card Chip Contact pins |
| 926 | Computer Connector Type 1 | Computer connector Simple Type, USB\Serial\or equivalent |
| 927 | Lanyard or ID Reel | Lanyard, ID card smartcard clip, or retractable ID reel for holding ID and\or ID holder on a person's possession |
| 928 | Work Shirt | Shirt\Blouse\Jacket or other apparel |
| 929 | Tether Connector | Surrogate Card Holder Connection |
| 930 | Tether Cable | Surrogate Card Holder Connector cable |
| 931 | Computer Connector Type 2 | Computer connector Smart Type, USB\Serial\or equivalent, with smartcard integrated circuit 924 located in the connector |
| 932 | Computer Connector Type 3 | Computer connector Dual Simple Type, USB\Serial\or equivalent with a second female USB\Serial\or equivalent port |
| 933 | Computer Connector Type 4 | Computer connector Dual Smart Type, Dual USB\Serial\or equivalent with a second female USB\Serial\or equivalent port smartcard integrated circuit 924 located in the connector |
| 934 | Card Holder Guide 1 | Card holder or smartcard unit guide, feature to help alignment of the card reader onto the card holder or smartcard |
| 935 | Card Reader Guide 1 | Card reader guide, a feature to help alignment of the card reader with the card holder or smartcard |
| 936 | Position Feature | Features on the either or both the card holder and card reader to assist in holding the units in position during use. Features include convex and concave "dimples", coating or material construction for necessary coefficient of friction, etc. |
| 937 | Replication Card | Replicates the actual card's contact pins such that it can be read by another standard and\or specialized card reader. |
| 938 | Reader Type 5 | Standard Desktop Card Reader either external or built in. |
| 939 | Tethered Reader | Desktop card holder for tethered card readers |
| 940 | Keyboard Connector Type 1 | Keyboard with USB\Serial connector |
| 941 | Keyboard Connector Type 2 | Keyboard with Card Reader |
| 942 | USB Splitter | USB Splitter |
| 944 | Pushbutton | Card Reader\Communication Reset Pushbutton |
| 945 | Secondary USB Connector | Secondary USB Connector |
| 946 | Reader Type 8 | Reader Type 2 in a desktop format or built in to computer |
| 947 | Reader Type 7 | Reader Type 1 in a desktop format or built in to computer |
| 948 | Reader Type 9 | Reader Type 3 in a desktop format or built in to computer |
| 949 | USB Female Connector | USB A Type Female Connector or equivalent |
| 95 | USB Male Connector | USB A Male Connector or equivalent |
| 951 | Holder Connector Type 1 | Card holder connector with contacts pins to transfer the smartcard contacts, card in position contacts, connector reader in position contacts to the smartcard integrated circuit located in the computer connector. The connector contacts are not limited to standard commercial products, e.g. USB or DB-9, but rather are designed to mate with the contacts on the card holder. |

-continued

| Ref. | Name | Description |
|---|---|---|
| 952 | Holder Connector Type 2 | Card holder connector of USB\Serial\or equivalent The connector contacts are not limited to standard commercial products, but rather are designed to mate with the contacts on the card holder. Designed to be used with card holder which has a smartcard integrated circuit 924. |
| 953 | Card Holder Type 3 | Slip-On card holder of types 1 or 2 904, or 956 |
| 954 | Card Type 2 | Modified Card Type 1, which may have additional feature not defined by ISO7810\7816, it may have notches cut out, surface features or ferrous metal features added to it. |
| 955 | Indicator Light | Light to indicate when the Card Reader or Connector is properly connect to the Carder Holder and\or when the communications exist\active. |
| 956 | Card Holder Type 2 | Card holder for ISO7810\7816 type smartcards 905 indirect electrical connections between the smartcard contacts and the surface of the holder. It may also have position switches, actuators, and contacts for detecting card and\or readers in position. |
| 957 | Antenna-Card | Smartcard antenna communication with the smartcard IC. |
| 958 | Card Type 3 | Contactless Type Card or FOB, Typically a pocket or keychain device containing a Smartchip |
| 959 | Card Holder Type 4 | A clip like device that slides onto an FOB or Smartcard with or without contacts to enable a contactless reader to be magnetically attached |
| 960 | Spring Clamp Type 1 | Mechanical hinge on the card reader for "clamping" the card reader and smartcard or holder during computer access |
| 961 | Spring Clamp Type 2 | Mechanical hinge on the card holder for "clamping" the card reader and smartcard or holder. Operates protective flaps 916, antenna windows 970, etc. |
| 962 | Spring Clamp Type 3 | Mechanical hinge of Type 1 where the hinge action indirectly achieves the clamping action |
| 963 | Spring Clamp Type 4 | Mechanical hinge of Type 2 where the hinge action indirectly achieves the clamping action |
| 964 | Smartcard IC | Smartcard integrated Circuit Chip, either contact or contactless |
| 965 | Reader Type 6 | Contactiess card reader wall mounted for area room or building access |
| 966 | Card Holder Guide 2 | Card holder or smartcard unit guide, feature to help attach the card reader onto the card holder or smartcard |
| 967 | Card Reader Guide 2 | Card reader guide, a feature the help attach the card reader with the card holder or smartcard |
| 968 | Reader Type 3 | Contact card reader, used for computer and other electronic device access, indirect contact with card and\or SIM contact pins, where the holder has internal circuit to replicate card contacts on surface of holder either in standard ISO7610\7816 format or alternate layout. In addition the reader has either contacts or switch to detect card in position and a reader in position switch. The card reader has necessary feature to remain connected to the smartcard or holder while in use, and designed to allow the smartcard or holder to be attached vertically and\or laterally in addition to axially. |
| 969 | Antenna-Reader | Smartcard reader antenna |
| 970 | Antenna-Window | Opening on card holder to allow access to a contactless smartcard antenna otherwise known as interrogation zone |
| 971 | Card Holder Adaptor | A device which attaches to card holder to allow various card readers or holder connectors to be attached. It may also include the smartcard reader IC. |
| 972 | Work Coveralls | Coveralls used by workers in various environments especially extremely dirty\hazardous or extremely clean environments as in pharmaceuticals |
| 973 | Card Replication Tether | A combination of a virtual card 937, communication cable 902, and card holder adaptor. |
| 974 | Generic Card Holder | May be, for example, any of the above-mentioned types. |

Although specific preferred embodiments are shown and described herein, it will be appreciated by those skilled in the art that additions, deletions, modifications, and substitutions not specifically described may be made without department from the spirit and scope of the invention.

Thus, various aspects of the present devices and methods enable or facilitate various of the following features:

In order for a user to maintain possession of their smartcard while placing the smartcard in a reader either:

1. The smartcard reader adaptor or connector having a sufficiently pliable cable is attached to the user's smartcard holder directly or indirectly which is worn by the user with a lanyard, ID reel, belt clip, armband, etc. See, for example, FIG. 1 and FIG. 4, FIG. 20 and FIG. 21.

2. The smartcard holder attached to the user via an ID reel or sufficiently "stretchable" cord is inserted into a smartcard reader adaptor. See FIG. 2 and FIG. 24

In order for the connection of smartcard holder to a smartcard reader adaptor to be practical and desirable three basic criteria can be met:

1. A simple and quick a method of connection;
2. A reliable design to maintain connection while in use;
3. A safe and rapid method of release.

To meet these criteria the smartcard holder and the smartcard reader adaptor may have the following features:

1. The smartcard holder and smartcard reader adaptor have structures features that align the contacts of smartcard holder with those of the smartcard reader adaptor.
2. The smartcard holder and smartcard reader adaptor have structures features that apply appropriate force to maintain connection to each other.
3. The smartcard holder and smartcard reader adaptor have structures features that allow their separation laterally and\or vertically, in addition the axial method.
4. The smartcard holder and smartcard reader adaptor have structures features that allow their connection laterally and\or vertically, in addition the current axial method. That may make them easier to connect single handed and/or blind by feel.

From Smartcard Alliance, a Smartcard is defined as:

"A smartcard is a device that includes an embedded integrated circuit chip (ICC) that can be either a secure microcontroller or equivalent intelligence with internal memory or a memory chip alone. The card connects to a reader with direct physical contact or with a remote contactless radio frequency interface. With an embedded microcontroller, smartcards have the unique ability to store large amounts of data, carry out their own on-card functions e.g., encryption and mutual authentication and interact intelligently with a smartcard reader. Smartcard technology conforms to international standards ISO/IEC 7816 and ISO/IEC 14443 and is available in a variety of form factors, including plastic cards, fobs, subscriber identity modules SIMs used in GSM mobile phones, and USB-based tokens."

The term "smartcard" as used in this application includes, but is not limited to, the Smartcard Alliance definition, and includes but is not limited to, other standards and definitions referenced herein.

Many factors influence the detail design "shape" of a smartcard unit, a smartcard or smartcard holder and smartcard reader. First, smartcards come in three forms, contact, contactless, and hybrid. A Hybrid implements both contact and contactless interfaces to the smartcard's integrated circuit. Second, the computer requirements—operating system and/or software—can influence what features are required in the smartcard holder and smartcard reader. Other factors would be defined by end-user requirements or preferences (for example, RFID shielding) or the environment (for example, office versus industrial, where features such as chemical resistance, heavy duty, or clean room compliant are desired).

Contact type smartcards are governed by ISO/IEC 7810 and ISO/IEC 7816 series of standards which define features such as physical shape and characteristics, electrical connector positions and shapes, electrical characteristics, communications protocols, etc., of the card. Of particular note is ISO-7816-3 Activation/Deactivation sequencer which initiates and automatic emergency deactivation upon card removal. This requirement influences the design of all contact smartcard readers to include a "card in position" switch. If the electronic device's operating system or software requires a card removal policy then it may be necessary to add secondary "card in position" switch on the card holder so that the security system is not bypassed by the user removing their smartcard holder after logging onto the system.

Contactless type smartcards are governed by ISO/IEC 14443-x which define features such as physical characteristics including antennae dimensions, radio frequency power and signal interface, etc. of the card. Contactless type smartcards come not only in a credit card type format but in other various shapes and sizes depending on their antennae dimensions, these are sometimes referred to as Tags and FOBs.

Contactless and Hybrid type smartcards requiring RFID shielding may require smartcard holders with a "window" feature that allows the user open the window when presenting to an area access reader or when attaching an electronic device's smartcard reader. The "window" can be spring loaded to automatically close. Additionally, the window can be designed to hold the electronic device's smartcard reader in place. See, for example, FIGS. 9 to 12.

Physical modifications to a contact type smartcard as defined by ISO/IEC 7810 to have features for easy smartcard reader connection will be considered a smartcard holder. see patent U.S. D 511,355, illustrated in FIG. 196.

A "Smartcard Reader" typically is understood to mean a device with the smartcard integrated circuit such as those by NXP. See FIG. 197 and FIG. 198. The interface is connected to the contacts which communicate with the smartcard and contacts which communicate with the computer. In some cases the smartcard interface integrated circuit maybe located in the smartcard holder itself. In order for the smartcard held within the smartcard holder to communicate with the computer an interconnecting element with holder adaptor and computer adaptor is required. Typically this interconnecting element contains the smartcard interface integrated circuit. However, as is explained elsewhere in this specification, the smartcard IC, or equivalent functionality, may be located in many different places in the chain of communication between a smartcard and an external computer or other device.

Several embodiments and variations of a smartcard unit (smartcard, or smartcard and holder) and a computer unit (smartcard reader connected to a computer, or computer with built in smartcard reader connection system) are described herein for various smartcard forms. Details of the smartcard unit and computer unit connection are disclosed and explained. In some embodiments, theH smartcard IC is in the "smartcard unit" rather than the "computer unit."

A design concept goal is to enable the user to maintain possession of their smartcard by either attaching a computer unit to the smartcard unit or attaching the smartcard unit to the computer unit in such a manner that makes it simple, easy, and fast to connect and align them together as well as easy to separate, particularly in the unintentional case. The design concepts apply to both contact and contactless cards and readers. In case of contact cards, one design criteria is reliable alignment and contact between the card reader and smartcard's contact pads; whereas with contactless cards the corresponding design criteria is proximity and access to the smartcard antenna's interrogation zone.

The system includes electronic circuitry configured to at least one of encode and decode data transmitted between the smartcard electronic chip and the computer, otherwise known as a smartcard integrated circuit, it is what enables the a smartcard and computer to communicate with one another. Primarily the smartcard IC is part of the computer unit, meaning the smartcard IC can reside either in the component which connects to the smartcard unit, see FIG. 30, the component which connects to the computer, see FIG. 32, or in the computer itself, see FIG. 8. In a variation, the smartcard IC is located in the smartcard unit, see FIG. 18. In the case where the smartcard holder is also effectively a smartcard reader, however, the connection features disclosed here still apply as the smartcard unit with a smartcard IC still enables the user to maintain possession of their smartcard.

There are two different "operating modes" the for smartcard unit and computer unit connection system. The first is where the computer unit attaches to the smartcard unit worn by the user with the computer unit's communication cable tethering the user to the computer, see FIG. 5. The second is where the smartcard unit worn by the user attaches to the computer unit, with the smartcard unit being tethered to the user by an ID reel or other sufficiently "stretchable" cord, see FIG. 6.

In the embodiments, there are basically two different types of computer unit styles, contact and contactless, where the computer unit style is dependent on the type of smartcard used. There are basically three different types of smartcard units, simple smartcard in credit card format, simple smartcard in a holder, and modified smartcard, for example, FOB, heavy duty, modified simple smartcard, etc. The smartcard holder has at least six variations: direct, indirect, shielded, and unshielded for contact style cards; shielded and unshielded for contactless style cards. There are at least two basic connection methods, mechanical and magnetic. There are numerous connection designs, for example, smartcard unit "clips" to computer unit vs computer unit "clips" to smartcard unit. Any combination of computer unit and smartcard unit connection has two common features disclosed here. Simple, fast, multidirectional, and safe connectability and remove-ability and easy self-alignment features.

Although specific embodiments and combinations of features have been described, the skilled reader will understand how to combine features of different embodiments to produce new combinations and embodiments within the scope of the appended claims.

In one embodiment, a card holder and reader system is described for a smartcard having an electronic chip. The system includes a card holder, a card reader, and a communication cable. The card holder is configured to receive at least a portion of the smartcard containing the electronic chip while enabling external electrical access to the electronic chip, and has a first alignment device. The card reader is removably connectable to the card holder. The card reader has first electrical contacts configured to communicate with the electronic chip on the smartcard and a second alignment device configured to cooperate with the first alignment device to align the first electrical contacts on the card reader for communication with the electronic chip. The communication cable is connected at one end to the card reader and is in electrical communication with the first electrical contacts for transmitting data between the smartcard electronic chip and an external device.

What is claimed is:

1. An identification system comprising:
   a smartcard unit having a length, a width and a thickness less than the length and the width,
   the smartcard unit having an internal compartment for receipt of a smartcard so that the smartcard is accessible for reading by an external reader; and
   a reader unit comprising a smartcard reader operative to engage the smartcard unit so as to interface communicatively with the smartcard and operative to interface with a computer to enable the computer to communicate with the smartcard;
   wherein the reader unit includes a reader unit alignment structure or a portion of the reader unit engages with a corresponding smartcard unit alignment structure to align the reader unit and the smartcard unit in an alignment for communicative interfacing;
   wherein the reader unit including a reader head with a plurality if contacts on an external surface of the reader head, the reader head having internal wiring connected to the contacts, the contacts defining a reader interface that is configured to contact with corresponding contacts on an external surface of the smartcard unit when the reader unit and the smartcard unit are in said alignment thereby effecting said communicative interfacing;
   the reader unit including a flexible cable with a first end attached to the reader head and a second end connectable to another component in the system for providing a path for communication between the internal wiring in the reader head and the other component, the flexible cable including a computer connector adapted to removably attach to the computer and;
   wherein at least one of the reader unit and the smartcard unit has a retainer operative to secure the reader unit to the smartcard unit with sufficient pressure that when the smartcard unit is being worn by a user the alignment for communicative interfacing is maintained, and
   wherein the retainer includes a magnet for attaching the reader head to the smartcard unit by a magnetic force such that the reader head is separable from the smartcard unit by application of a separation force acting along the flexible cable in one of a plurality of directions relative to the retainer, the separation force being greater than the magnetic force;
   wherein the retainer is configured to make the reader unit and the smartcard unit reversibly separable in a plurality of directions without damaging the reader head, the flexible cable and the smartcard unit.

2. The system according to claim 1, wherein the reader unit is operative to engage a surface of the smartcard unit, at least part of which surface extends in the length and width directions.

3. The system according to claim 1, wherein the smartcard unit comprises a smartcard holder that in use is operative to receive at least a portion of the smartcard.

4. The system according to claim 3, further comprising a card-in-position switch that when the smartcard is removed from the holder indicates that the smartcard has been removed, and a sensor that when the reader unit is separated from the smartcard unit returns to the computer a signal that emulates the card-in-position switch indicating that the smartcard has been removed.

5. The system according to claim 3, wherein the reader unit is operative to engage an external surface of the smartcard holder.

6. The system according to claim 3, wherein:
   the smartcard has card electrical contacts;
   the reader unit has reader electrical contacts; and
   the holder comprises first holder electrical contacts aligned to connect with the card electrical contacts when the smartcard is received in said the holder, second holder electrical contacts aligned to connect with the reader electrical contacts when the reader unit is retained on the holder, and circuitry connecting the first and second holder electrical contacts so as to transparently electrically connect the reader unit with the smartcard.

7. The system according to claim 1, wherein:
   the smartcard has card electrical contacts;
   the reader unit has reader electrical contacts;
   wherein the card electrical contacts are exposed; and
   wherein the reader unit is so configured that when the reader unit is retained on the smartcard unit the reader electrical contacts connect directly to the card electrical contacts.

8. The system of claim 1, wherein the alignment structure comprises an alignment guide on an outer surface of the smartcard unit to facilitate alignment of the reader unit.

9. The system according to claim 8, wherein one of the alignment guide and the reader unit comprises a recess, and the other of the alignment guide and the reader unit comprises a projection to seat in the recess.

10. The system according to claim 9, wherein the reader unit comprises external contacts on the projection or in the recess, and the smartcard unit has corresponding contacts in the recess or on the projection.

11. The system according to claim 1, wherein the smartcard is contactless, the smartcard reader has a wireless transceiver, and communication between the smartcard and the reader is established when the smartcard is located in sufficient proximity and correct alignment with the reader transceiver.

* * * * *